US009825358B2

(12) United States Patent
Chen et al.

(10) Patent No.: US 9,825,358 B2
(45) Date of Patent: Nov. 21, 2017

(54) SYSTEM WIRELESSLY TRANSFERRING POWER TO A TARGET DEVICE OVER A MODELED TRANSMISSION PATHWAY WITHOUT EXCEEDING A RADIATION LIMIT FOR HUMAN BEINGS

(71) Applicant: Elwha LLC, Bellevue, WA (US)

(72) Inventors: Pai-Yen Chen, Bellevue, WA (US); Tom Driscoll, San Diego, CA (US); Siamak Ebadi, Bellevue, WA (US); John Desmond Hunt, Knoxville, TN (US); Nathan Ingle Landy, Mercer Island, WA (US); Melroy Machado, Seattle, WA (US); Milton Perque, Jr., Seattle, WA (US); David R. Smith, Durham, NC (US); Yaroslav A. Urzhumov, Bellevue, WA (US)

(73) Assignee: Elwha LLC

( * ) Notice: Subject to any disclaimer, the term of this patent is extended or adjusted under 35 U.S.C. 154(b) by 885 days.

(21) Appl. No.: 14/257,415

(22) Filed: Apr. 21, 2014

(65) Prior Publication Data
US 2015/0171514 A1 Jun. 18, 2015

Related U.S. Application Data

(60) Provisional application No. 61/917,254, filed on Dec. 17, 2013.

(51) Int. Cl.
*H01F 27/42* (2006.01)
*H01F 37/00* (2006.01)
(Continued)

(52) U.S. Cl.
CPC ............... *H01Q 3/00* (2013.01); *H01Q 3/247* (2013.01); *H01Q 3/46* (2013.01); *H01Q 15/148* (2013.01)

(58) Field of Classification Search
CPC .......... H01Q 3/00; H01Q 15/148; H01Q 3/46; H01Q 3/247
See application file for complete search history.

(56) References Cited

U.S. PATENT DOCUMENTS 3,001,193 A  9/1961  Marie
3,388,396 A  6/1968  Rope et al.
(Continued)

FOREIGN PATENT DOCUMENTS

JP   52-13751 A    2/1977
JP   2007-081825 A  3/2007
(Continued)

OTHER PUBLICATIONS

European Patent Office, Supplementary European Search Report, pursuant to Rule 62 EPC; App. No. EP 11 83 2873; dated May 15, 2014 (received by our Agent on May 21, 2014); 7 pages.
(Continued)

*Primary Examiner* — Jared Fureman
*Assistant Examiner* — Esayas Yeshaw

(57) ABSTRACT

Described embodiments include a system, method, and apparatus. The system includes an antenna comprising a sub-Nyquist holographic aperture configured to define selectable arbitrary complex radiofrequency electromagnetic fields on a surface of the antenna. A mapping engine models an environment within a space radiateable by the antenna. The environment includes a target device and a human being. An optimization circuit selects responsive to the model of the environment a power transmission regime. The power transmission regime includes radiation pattern shaped to wirelessly transfer electromagnetic power from the antenna to the target device without exceeding a radiation exposure limit for humans. A gain definition circuit selects a complex radiofrequency electromagnetic field implementing the selected power transmission regime from
(Continued)

the at least two selectable arbitrary complex radiofrequency electromagnetic fields. An antenna controller defines the selected arbitrary complex radiofrequency electromagnetic field in the sub-Nyquist holographic aperture.

43 Claims, 26 Drawing Sheets

(51) Int. Cl.
*H01F 38/00* (2006.01)
*H01Q 3/00* (2006.01)
*H01Q 3/24* (2006.01)
*H01Q 3/46* (2006.01)
*H01Q 15/14* (2006.01)

(56) References Cited

U.S. PATENT DOCUMENTS

| | | |
|---|---|---|
| 3,714,608 A | 1/1973 | Barnes et al. |
| 3,757,332 A | 9/1973 | Tricoles |
| 3,887,923 A | 6/1975 | Hendrix |
| 4,195,262 A | 3/1980 | King |
| 4,291,312 A | 9/1981 | Kaloi |
| 4,305,153 A | 12/1981 | King |
| 4,489,325 A | 12/1984 | Bauck et al. |
| 4,509,209 A | 4/1985 | Itoh et al. |
| 4,672,378 A | 6/1987 | Drabowitch et al. |
| 4,701,762 A | 10/1987 | Apostolos |
| 4,780,724 A | 10/1988 | Sharma et al. |
| 4,832,429 A | 5/1989 | Nagler |
| 4,874,461 A | 10/1989 | Sato et al. |
| 4,920,350 A | 4/1990 | McGuire et al. |
| 4,947,176 A | 8/1990 | Inatsune et al. |
| 4,978,934 A | 12/1990 | Saad |
| 5,198,827 A | 3/1993 | Seaton |
| 5,455,590 A | 10/1995 | Collins et al. |
| 5,512,906 A | 4/1996 | Speciale |
| 5,734,347 A | 3/1998 | McEligot |
| 5,841,543 A | 11/1998 | Guldi et al. |
| 5,889,599 A | 3/1999 | Takemori |
| 6,031,506 A | 2/2000 | Cooley et al. |
| 6,061,023 A | 5/2000 | Daniel et al. |
| 6,061,025 A | 5/2000 | Jackson et al. |
| 6,075,483 A | 6/2000 | Gross |
| 6,084,540 A | 7/2000 | Yu |
| 6,114,834 A | 9/2000 | Parise |
| 6,166,690 A | 12/2000 | Lin et al. |
| 6,211,823 B1 | 4/2001 | Herring |
| 6,232,931 B1 | 5/2001 | Hart |
| 6,236,375 B1 | 5/2001 | Chandler et al. |
| 6,275,181 B1 | 8/2001 | Kitayoshi |
| 6,366,254 B1 | 4/2002 | Sievenpiper et al. |
| 6,384,797 B1 | 5/2002 | Schaffner et al. |
| 6,396,440 B1 | 5/2002 | Chen |
| 6,469,672 B1 | 10/2002 | Marti-Canales et al. |
| 6,545,645 B1 | 4/2003 | Wu |
| 6,552,696 B1 | 4/2003 | Sievenpiper et al. |
| 6,633,026 B2 | 10/2003 | Tuominen |
| 6,985,107 B2 | 1/2006 | Anson et al. |
| 7,068,234 B2 | 6/2006 | Sievenpiper |
| 7,151,499 B2 | 12/2006 | Avakian et al. |
| 7,154,451 B1 | 12/2006 | Sievenpiper |
| 7,253,780 B2 | 8/2007 | Sievenpiper |
| 7,295,146 B2 | 11/2007 | McMakin et al. |
| 7,307,596 B1 | 12/2007 | West |
| 7,339,521 B2 | 3/2008 | Scheidemann et al. |
| 7,428,230 B2 | 9/2008 | Park |
| 7,456,787 B2 | 11/2008 | Manasson et al. |
| 7,609,223 B2 | 10/2009 | Manasson et al. |
| 7,667,660 B2 | 2/2010 | Manasson et al. |
| 7,830,310 B1 | 11/2010 | Sievenpiper et al. |
| 7,834,795 B1 | 11/2010 | Dudgeon et al. |
| 7,864,112 B2 | 1/2011 | Manasson et al. |
| 7,911,407 B1 | 3/2011 | Fong et al. |
| 7,929,147 B1 | 4/2011 | Fong et al. |
| 7,995,000 B2 | 8/2011 | Manasson et al. |
| 8,009,116 B2 | 8/2011 | Peichl et al. |
| 8,014,050 B2 | 9/2011 | McGrew |
| 8,040,586 B2 | 10/2011 | Smith et al. |
| 8,059,051 B2 | 11/2011 | Manasson et al. |
| 8,134,521 B2 | 3/2012 | Herz et al. |
| 8,179,331 B1 | 5/2012 | Sievenpiper |
| 8,212,739 B2 | 7/2012 | Sievenpiper |
| 8,339,320 B2 | 12/2012 | Sievenpiper |
| 8,456,360 B2 | 6/2013 | Manasson et al. |
| 9,231,303 B2 | 1/2016 | Edelmann et al. |
| 9,268,016 B2 | 2/2016 | Smith et al. |
| 9,389,305 B2 | 7/2016 | Boufounos |
| 9,634,736 B2 | 4/2017 | Mukherjee et al. |
| 2002/0039083 A1 | 4/2002 | Taylor et al. |
| 2002/0167456 A1 | 11/2002 | McKinzie, III |
| 2003/0214443 A1 | 11/2003 | Bauregger et al. |
| 2004/0227668 A1 | 11/2004 | Sievenpiper |
| 2004/0263408 A1 | 12/2004 | Sievenpiper et al. |
| 2005/0031295 A1 | 2/2005 | Engheta et al. |
| 2005/0088338 A1 | 4/2005 | Masenten et al. |
| 2006/0065856 A1 | 3/2006 | Diaz et al. |
| 2006/0114170 A1 | 6/2006 | Sievenpiper |
| 2006/0116097 A1 | 6/2006 | Thompson |
| 2006/0132369 A1 | 6/2006 | Robertson et al. |
| 2007/0085757 A1 | 4/2007 | Sievenpiper |
| 2007/0103381 A1 | 5/2007 | Upton |
| 2007/0159395 A1 | 7/2007 | Sievenpiper et al. |
| 2007/0159396 A1 | 7/2007 | Sievenpiper et al. |
| 2007/0182639 A1 | 8/2007 | Sievenpiper et al. |
| 2007/0200781 A1 | 8/2007 | Ahn et al. |
| 2007/0229357 A1 | 10/2007 | Zhang et al. |
| 2008/0020231 A1 | 1/2008 | Yamada et al. |
| 2008/0165079 A1 | 7/2008 | Smith et al. |
| 2008/0180339 A1 | 7/2008 | Yagi |
| 2008/0224707 A1 | 9/2008 | Wisler et al. |
| 2008/0259826 A1 | 10/2008 | Struhsaker |
| 2008/0268790 A1 | 10/2008 | Shi et al. |
| 2008/0316088 A1 | 12/2008 | Pavlov et al. |
| 2009/0002240 A1 | 1/2009 | Sievenpiper et al. |
| 2009/0045772 A1 | 2/2009 | Cook et al. |
| 2009/0109121 A1 | 4/2009 | Herz et al. |
| 2009/0147653 A1 | 6/2009 | Waldman et al. |
| 2009/0195361 A1 | 8/2009 | Smith |
| 2009/0251385 A1 | 10/2009 | Xu et al. |
| 2010/0066629 A1 | 3/2010 | Sievenpiper |
| 2010/0073261 A1 | 3/2010 | Sievenpiper |
| 2010/0079010 A1 | 4/2010 | Hyde et al. |
| 2010/0109972 A2 | 5/2010 | Xu et al. |
| 2010/0134370 A1 | 6/2010 | Oh et al. |
| 2010/0156573 A1 | 6/2010 | Smith et al. |
| 2010/0157929 A1 | 6/2010 | Karabinis |
| 2010/0188171 A1 | 7/2010 | Mohajer-Iravani et al. |
| 2010/0279751 A1 | 11/2010 | Pourseyed et al. |
| 2010/0328142 A1 | 12/2010 | Zoughi et al. |
| 2011/0098033 A1 | 4/2011 | Britz et al. |
| 2011/0117836 A1 | 5/2011 | Zhang et al. |
| 2011/0128714 A1* | 6/2011 | Terao ............... H02J 7/025 361/807 |
| 2011/0151789 A1 | 6/2011 | Viglione et al. |
| 2011/0267664 A1 | 11/2011 | Kitamura et al. |
| 2012/0026068 A1 | 2/2012 | Sievenpiper |
| 2012/0038317 A1* | 2/2012 | Miyamoto ........... H02J 7/025 320/108 |
| 2012/0112543 A1* | 5/2012 | van Wageningen .... H02J 7/025 307/43 |
| 2012/0194399 A1 | 8/2012 | Bily et al. |
| 2012/0268340 A1 | 10/2012 | Capozzoli et al. |
| 2012/0274147 A1 | 11/2012 | Stecher et al. |
| 2012/0280770 A1 | 11/2012 | Abhari et al. |
| 2012/0326660 A1 | 12/2012 | Lu et al. |
| 2013/0069865 A1 | 3/2013 | Hart |
| 2013/0082890 A1 | 4/2013 | Wang et al. |
| 2013/0237272 A1* | 9/2013 | Prasad ............... H04B 7/0617 455/517 |
| 2013/0249310 A1 | 9/2013 | Hyde et al. |
| 2013/0278211 A1 | 10/2013 | Cook et al. |
| 2013/0288617 A1 | 10/2013 | Kim et al. |

(56) References Cited

U.S. PATENT DOCUMENTS

| | | |
|---|---|---|
| 2013/0343208 A1 | 12/2013 | Sexton et al. |
| 2014/0128006 A1 | 5/2014 | Hu |
| 2014/0266946 A1 | 9/2014 | Bily et al. |
| 2015/0280444 A1 | 10/2015 | Smith et al. |
| 2017/0098961 A1* | 4/2017 | Harpham ............... H02J 50/12 |

FOREIGN PATENT DOCUMENTS

| | | |
|---|---|---|
| JP | 2008-054146 A | 3/2008 |
| JP | 2010-187141 A | 8/2010 |
| KR | 10-1045585 B1 | 6/2011 |
| WO | WO 01/73891 A1 | 10/2001 |
| WO | WO 2008-007545 A1 | 1/2008 |
| WO | WO 2008/059292 A2 | 5/2008 |
| WO | WO 2009/103042 A2 | 8/2009 |
| WO | WO 2010/0021736 | 2/2010 |
| WO | WO 2013/147470 A1 | 10/2013 |

OTHER PUBLICATIONS

Soper, Taylor; "This startup figured out how to charge devices wirelessly through walls from 40 feet away"; GeekWire; bearing a date of Apr. 22, 2014 and printed on Apr. 24, 2014; pp. 1-12; located at http://www.geekwire.com/2014/ossia-wireless-charging/#disqus_thread.

PCT International Search Report; International App. No. PCT/US2014/070645; dated Mar. 16, 2015; pp. 1-3.

PCT International Search Report; International App. No. PCT/US2014/070650; dated Mar. 27, 2015; pp. 1-3.

The State Intellectual Property Office of P.R.C.; Application No. 201180055705.8; May 6, 2015; (received by our Agent on May 11, 2015); pp. 1-11.

Intellectual Property Office of Singapore Examination Report; Application No. 2013027842; dated Feb. 27, 2015; (received by our Agent on Apr. 28, 2015); pp. 1-12.

Fan, Guo-Xin et al.; "Scattering from a Cylindrically Conformal Slotted Waveguide Array Antenna"; IEEE Transactions on Antennas and Propagation; Jul. 1997; pp. 1150-1159; vol. 45, No. 7; IEEE.

Jiao, Yong-Chang et al.; A New Low-Side-Lobe Pattern Synthesis Technique for Conformal Arrays; IEEE Transactions on Antennas and Propagation; Jun. 1993; pp. 824-831, vol. 41, No. 6; IEEE.

PCT International Search Report; International App. No. PCT/US2015/028781; dated Jul. 27, 2015; pp. 1-3.

PCT International Search Report; International App. No. PCT/US2014/061485; dated Jul. 27, 2015; pp. 1-3.

PCT International Search Report; International App. No. PCT/US2015/036638; dated Oct. 19, 2015; pp. 1-4.

Patent Office of the Russian Federation (Rospatent) Office Action; Application No. 2013119332/28(028599); dated Oct. 13, 2015 (received by our agent on Oct. 23, 2015); machine translation; pp. 1-5.

The State Intellectual Property Office of P.R.C.; Application No. 201180055705.8; dated Nov. 4, 2015 (received by our Agent on Nov. 10, 2015; pp. 1-11.

PCT International Search Report; International App. No. PCT/US2014/069254; dated Nov. 27, 2015; pp. 1-4.

Definition from Merriam-Webster Online Dictionary; "Integral"; Merriam-Webster Dictionary; pp. 1-5; located at: http://www.merriam-webster.com/dictionary/integral.

Varlamos et al.; "Electronic Beam Steering Using Switched Parasitic Smart Antenna Arrays"; Progress in Electromagnetics Research; PIER 36; bearing a date of 2002; pp. 101-119.

IP Australia Patent Examination Report No. 1; Patent Application No. 2011314378; dated Mar. 4, 2016; pp. 1-4.

Chinese State Intellectual Property Office, Notification of Fourth Office Action, App. No. 2011/80055705.8 (Based on PCT Patent Application No. PCT/US2011/001755); dated May 20, 2016 (received by our Agent on May 30, 2016); pp. 1-4 (machine translation only).

PCT International Search Report; International App. No. PCT/US2016/037667; dated Sep. 7, 2016; pp. 1-3.

European Search Report; European App. No. EP 11 832 873.1; dated Sep. 21, 2016; pp. 1-6.

Extended European Search Report; European App. No. EP 14 77 0686; dated Oct. 14, 2016 (received by our Agent on Oct. 12, 2016); pp. 1-7.

The State Intellectual Property Office of P.R.C, Fifth Office Action, App. No. 2011/80055705.8 (Based on PCT Patent Application No. PCT/US2011/001755); dated Nov. 16, 2016 (received by our Agent on Nov. 23, 2016); pp. 1-3 (machine translation, as provided).

Canadian Intellectual Property Office, Canadian Examination Search Report, Pursuant to Subsection 30(2); App. No. 2,814,635; dated Dec. 1, 2016 (received by our Agent on Dec. 2016); pp. 1-3.

"Aperture", Definition of Aperture by Merriam-Webster; located at http://www.merriam-webster.com/dictionary/aperture; printed by Examiner on Nov. 30, 2016; pp. 1-9; Merriam-Webster, Incorporated.

PCT International Preliminary Report on Patentability; International App. No. PCT/US2014/070645; dated Jun. 21, 2016; pp. 1-12.

AYOB et al.; "A Survey of Surface Mount Device Placement Machine Optimisation: Machine Classification"; Computer Science Technical Report No. NOTTCS-TR-2005-8; Sep. 2005; pp. 1-34.

Abdalla et al.; "A Planar Electronically Steerable Patch Array Using Tunable PRI/NRI Phase Shifters"; IEEE Transactions on Microwave Theory and Techniques; Mar. 2009; p. 531-541; vol. 57, No. 3; IEEE.

Amineh et al.; "Three-Dimensional Near-Field Microwave Holography for Tissue Imaging"; International Journal of Biomedical Imaging; Bearing a date of Dec. 21, 2011; pp. 1-11; vol. 2012, Article ID 291494; Hindawi Publishing Corporation.

"Array Antenna with Controlled Radiation Pattern Envelope Manufacture Method"; ESA; Jan. 8, 2013; pp. 1-2; http://www.esa.int/Our_Activities/Technology/Array_antenna_with_controlled_radiaton_pattern_envelope_manufacture_method.

Belloni, Fabio; "Channel Sounding"; S-72.4210 PG Course in Radio Communications; Bearing a date of Feb. 7, 2006; pp. 1-25.

Chen, Robert; Liquid Crystal Displays, Wiley, New Jersey 2011 (not provided).

Chin J.Y. et al.; "An efficient broadband metamaterial wave retarder"; Optics Express; vol. 17, No. 9; p. 7640-7647; 2009.

Chu R.S. et al.; "Analytical Model of a Multilayered Meaner-Line Polarizer Plate with Normal and Oblique Plane-Wave Incidence"; IEEE Trans. Ant. Prop.; vol. AP-35, No. 6; p. 652-661; Jun. 1987.

Colburn et al.; "Adaptive Artificial Impedance Surface Conformal Antennas"; in Proc. IEEE Antennas and Propagation Society Int. Symp.; 2009; p. 1-4.

Courreges et al.; "Electronically Tunable Ferroelectric Devices for Microwave Applications"; *Microwave and Millimeter Wave Technologies from Photonic Bandgap Devices to Antenna and Applications*; ISBN 978-953-7619-66-4; Mar. 2010; p. 185-204; InTech.

Cristaldi et al., Chapter 3 "Passive LCDs and Their Addressing Techniques" and Chapter 4 "Drivers for Passive-Matrix LCDs"; *Liquid Crystal Display Drivers: Techniques and Circuits*; ISBN 9048122546; Apr. 8, 2009; p. 75-143; Springer.

Crosslink; Summer 2002; pp. 1-56 vol. 3; No. 2; The Aerospace Corporation.

Den Boer, Wilem; Active Matrix Liquid Crystal Displays; Elsevier, Burlington, MA, 2009 (not provided).

Diaz, Rudy; "Fundamentals of EM Waves"; Bearing a date of Apr. 4, 2013; 6 Total Pages; located at: http://www.microwaves101.com/encyclopedia/absorbingradar1.cfm.

Elliott, R.S.; "An Improved Design Procedure for Small Arrays of Shunt Slots"; Antennas and Propagation, IEEE Transaction on; Jan. 1983; p. 297-300; vol. 31, Issue: 1; IEEE.

Elliott, Robert S. and Kurtz, L.A.; "The Design of Small Slot Arrays"; Antennas and Propagation, IEEE Transactions on; Mar. 1978; p. 214-219; vol. AP-26, Issue 2; IEEE.

Evlyukhin, Andrey B. and Bozhevolnyi, Sergey I.; "Holographic evanescent-wave focusing with nanoparticle arrays"; Optics Express; Oct. 27, 2008; p. 17429-17440; vol. 16, No. 22; OSA.

(56) References Cited

OTHER PUBLICATIONS

Fan et al.; "Fast-response and scattering-free polymer network liquid crystals for infrared light modulators"; Applied Physics Letters; Feb. 23, 2004; pp. 1233-1235; vol. 84, No. 8; American Institute of Physics.
Fong, Bryan H. et al.; "Scalar and Tensor Holographic Artificial Impedance Surfaces" IEEE Transactions on Antennas and Propagation; Oct. 2010; p. 3212-3221; vol. 58, No. 10; IEEE.
Frenzel, Lou; "What's The Difference Between EM Near Field and Far Field?"; Electronic Design; Bearing a date of Jun. 8, 2012; 7 Total Pages; located at: http://electronicdesign.com/energy/what-s-difference-between-em-near-field-and-far-field.
Grbic, Anthony; "Electrical Engineering and Computer Science"; University of Michigan; Created on Mar. 18, 2014, printed on Jan. 27, 2014; pp. 1-2; located at: http://sitemaker.umich.edu/agrbic/projects.
Grbic et al.; "Metamaterial Surfaces for Near and Far-Field Applications"; $7^{th}$ European Conference on Antennas and Propagation (EUCAP 2013); Bearing a date of 2013, Created on Mar. 18, 2014; pp. 1-5.
Imani, et al.; "A Concentrically Corrugated Near-Field Plate"; Bearing a date of 2010, Created on Mar. 18, 2014; pp. 1-4; IEEE.
Imani, et al.; "Design of a Planar Near-Field Plate"; Bearing a date of 2012, Created on Mar. 18, 2014; pp. 1-2; IEEE.
Imani, et al.; "Planar Near-Field Plates"; Bearing a date of 2013, Created on Mar. 18, 2014; pp. 1-10; IEEE.
Islam et al.; "A Wireless Channel Sounding System for Rapid Propagation Measurements"; Bearing a date of Nov. 21, 2012; 7 Total Pages.
Kaufman, D.Y. et al.; "High-Dielectric-Constant Ferroelectric Thin Film and Bulk Ceramic Capacitors for Power Electronics"; Proceedings of the Power Systems World/Power Conversion and Intelligent Motion '99 Conference; Nov. 6-12, 1999; p. 1-9; PSW/PCIM; Chicago, IL.
Kim, David Y.; "A Design Procedure for Slot Arrays Fed by Single-Ridge Waveguide"; IEEE Transactions on Antennas and Propagation; Nov. 1988; p. 1531-1536; vol. 36, No. 11; IEEE.
Kirschbaum, H.S. et al.; "A Method of Producing Broad-Band Circular Polarization Employing an Anisotropic Dielectric"; IRE Trans. Micro. Theory. Tech.; vol. 5, No. 3; p. 199-203; 1957.
Kokkinos, Titos et al.; "Periodic FDTD Analysis of Leaky-Wave Structures and Applications to the Analysis of Negative-Refractive-Index Leaky-Wave Antennas"; IEEE Transactions on Microwave Theory and Techniques; 2006; p. 1-12; ; IEEE.
Konishi, Yohei; "Channel Sounding Technique Using MIMO Software Radio Architecture"; $12^{th}$ MCRG Joint Seminar; Bearing a date of Nov. 18, 2010; 28 Total Pages.
Kuki et al.; "Microwave Variable Delay Line using a Membrane Impregnated with Liquid Crystal"; IEEE MTT-S Digest; 2002; pp. 363-366; IEEE.
Leveau et al.; "Anti-Jam Protection by Antenna"; GPS World; Feb. 1, 2013; pp. 1-11; North Coast Media LLC; http://gpsworld.com/anti-jam-protection-by-antenna/.
Lipworth et al.; "Magnetic Metamaterial Superlens for Increased Range Wireless Power Transfer"; Scientific Reports; Bearing a date of Jan. 10, 2014; pp. 1-6; vol. 4, No. 3642.
Luo et al.; "High-directivity antenna with small antenna aperture"; Applied Physics Letters; 2009; pp. 193506-1-193506-3; vol. 95; American Institute of Physics.
Manasson et al.; "Electronically Reconfigurable Aperture (ERA): A New Approach for Beam-Steering Technology"; Bearing dates of Oct. 12-15, 2010; pp. 673-679; IEEE.
McLean et al.; "Interpreting Antenna Perfoiinance Parameters for EMC Applications: Part 2: Radiation Pattern, Gain, and Directivity"; Created on Apr. 1, 2014; pp. 7-17; TDK RF Solutions Inc.
Mitri, F.G.; "Quasi-Gaussian Electromagnetic Beams"; Physical Review A.; Bearing a date of Mar. 11, 2013; p. 1; vol. 87, No. 035804; (Abstract Only).

Poplavlo, Yuriy et al.; "Tunable Dielectric Microwave Devices with Electromechanical Control"; *Passive Microwave Components and Antennas*; ISBN 978-953-307-083-4; Apr. 2010; p. 367-382; InTech.
PCT International Search Report; International App. No. PCT/US2011/001755; Mar. 22, 2012; pp. 1-5.
Rengarajan, Sembiam R. et al.; "Design, Analysis, and Development of a Large Ka-Band Slot Array for Digital Beam-Forming Application"; IEEE Transactions on Antennas and Propagation; Oct. 2009; p. 3103-3109; vol. 57, No. 10; IEEE.
Sato, Kazuo et al.; "Electronically Scanned Left-Handed Leaky Wave Antenna for Millimeter-Wave Automotive Applications"; Antenna Technology Small Antennas and Novel Metamaterials; 2006; p. 420-423; IEEE.
Sakakibara, Kunio; "High-Gain Millimeter-Wave Planar Array Antennas with Traveling-Wave Excitation"; Radar Technology; Bearing a date of Dec. 2009; pp. 319-340.
Sandell et al.; "Joint Data Detection and Channel Sounding for TDD Systems with Antenna Selection"; Bearing a date of 2011, Created on Mar. 18, 2014; pp. 1-5; IEEE.
Siciliano et al.; "25. Multisensor Data Fusion"; Springer Handbook of Robotics; Bearing a date of 2008, Created on Mar. 18, 2014; 27 Total Pages; Springer.
Sievenpiper, Dan et al.; "Holographic Artificial Impedance Surfaces for Conformal Antennas"; Antennas and Propagation Society International Symposium; 2005; p. 256-259; vol. 1B; IEEE, Washington D.C.
Sievenpiper, Daniel F. et al.; "Two-Dimensional Beam Steering Using an Electrically Tunable Impedance Surface"; IEEE Transactions on Antennas and Propagation; Oct. 2003; p. 2713-2722; vol. 51, No. 10; IEEE.
Smith, David R.; "Recent Progress in Metamaterial and Transformation Optical Design"; NAVAIR Nano/Meta Workshop; Feb. 2-3, 2011; pp. 1-32.
"Spectrum Analyzer"; Printed on Aug. 12, 2013; pp. 1-2; http://www.gpssource.com/faqs/15; GPS Source.
Sun et al.; "Maximum Signal-to-Noise Ratio GPS Anti-Jam Receiver with Subspace Tracking"; ICASSP; 2005; pp. IV-1085-IV-1088; IEEE.
Thoma et al.; "MIMO Vector Channel Sounder Measurement for Smart Antenna System Evaluation"; Created on Mar. 18, 2014; pp. 1-12.
Umenei, A.E.; "Understanding Low Frequency Non-Radiative Power Transfer"; Bearing a date of Jun. 2011; 7 Total Pages; Fulton Innovation, LLC.
Utsumi, Yozo et al.; "Increasing the Speed of Microstrip-Line-Type Polymer-Dispersed Liquid-Crystal Loaded Variable Phase Shifter"; IEEE Transactions on Microwave Theory and Techniques; Nov. 2005, p. 3345-3353; vol. 53, No. 11; IEEE.
Wallace, John; "Flat 'Metasurface' Becomes Aberration-Free Lens"; Bearing a date of Aug. 28, 2012; 4 Total Pages; located at: http://www.laserfocusworld.com/articles/2012/08/flat-metasurface-becomes-aberration-free-lens.html.
"Wavenumber"; Microwave Encyclopedia; Bearing a date of Jan. 12, 2008; pp. 1-2; P-N Designs, Inc.
Weil, Carsten et al.; "Tunable Inverted-Microstrip Phase Shifter Device Using Nematic Liquid Crystals"; IEEE MTT-S Digest; 2002; p. 367-370; IEEE.
Yan, Dunbao et al.; "A Novel Polarization Convert Surface Based on Artificial Magnetic Conductor"; Asia-Pacific Microwave Conference Proceedings, 2005.
Yee, Hung Y.; "Impedance of a Narrow Longitudinal Shunt Slot in a Slotted Waveguide Array"; IEEE Transactions on Antennas and Propagation; Jul. 1974; p. 589-592; IEEE.
Young et al.; "Meander-Line Polarizer"; IEEE Trans. Ant. Prop.; p. 376-378; May 1973.
Yoon et al.; "Realizing Efficient Wireless Power Transfer in the Near-Field Region Using Electrically Small Antennas"; Wireless Power Transfer; Principles and Engineering Explorations; Bearing a date of Jan. 25, 2012; pp. 151-172.
Zhong, S.S. et al.; "Compact ridge waveguide slot antenna array fed by convex waveguide divider"; Electronics Letters; Oct. 13, 2005; p. 1-2; vol. 41, No. 21; IEEE.

(56) References Cited

OTHER PUBLICATIONS

Ovi et al.; "Symmetrical Slot Loading in Elliptical Microstrip Patch Antennas Partially Filled with Mue Negative Metamaterials"; PIERS Proceedings, Moscow, Russia; Aug. 19-23, 2012; pp. 542-545.
PCT International Search Report; International App. No. PCT/US2014/017454; dated Aug. 28, 2014; pp. 1-4.
Supplementary European Search Report, Pursuant to Rule 62 EPC; App. No. EP 14 87 2595; dated Jul. 3, 2017 (received by our Agent on Jul. 7, 2017); pp. 1-16.
Supplementary European Search Report, Pursuant to Rule 62 EPC; App. No. EP 14 87 2874; dated Jul. 3, 2017 (received by our Agent on Jul. 7, 2017); pp. 1-15.
European Patent Office, Supplementary European Search Report, Pursuant to Rule 62 EPC; App. No. EP 14891152; dated Jul. 20, 2017 (received by our Agent on Jul. 26, 2017); pp. 1-4.

\* cited by examiner

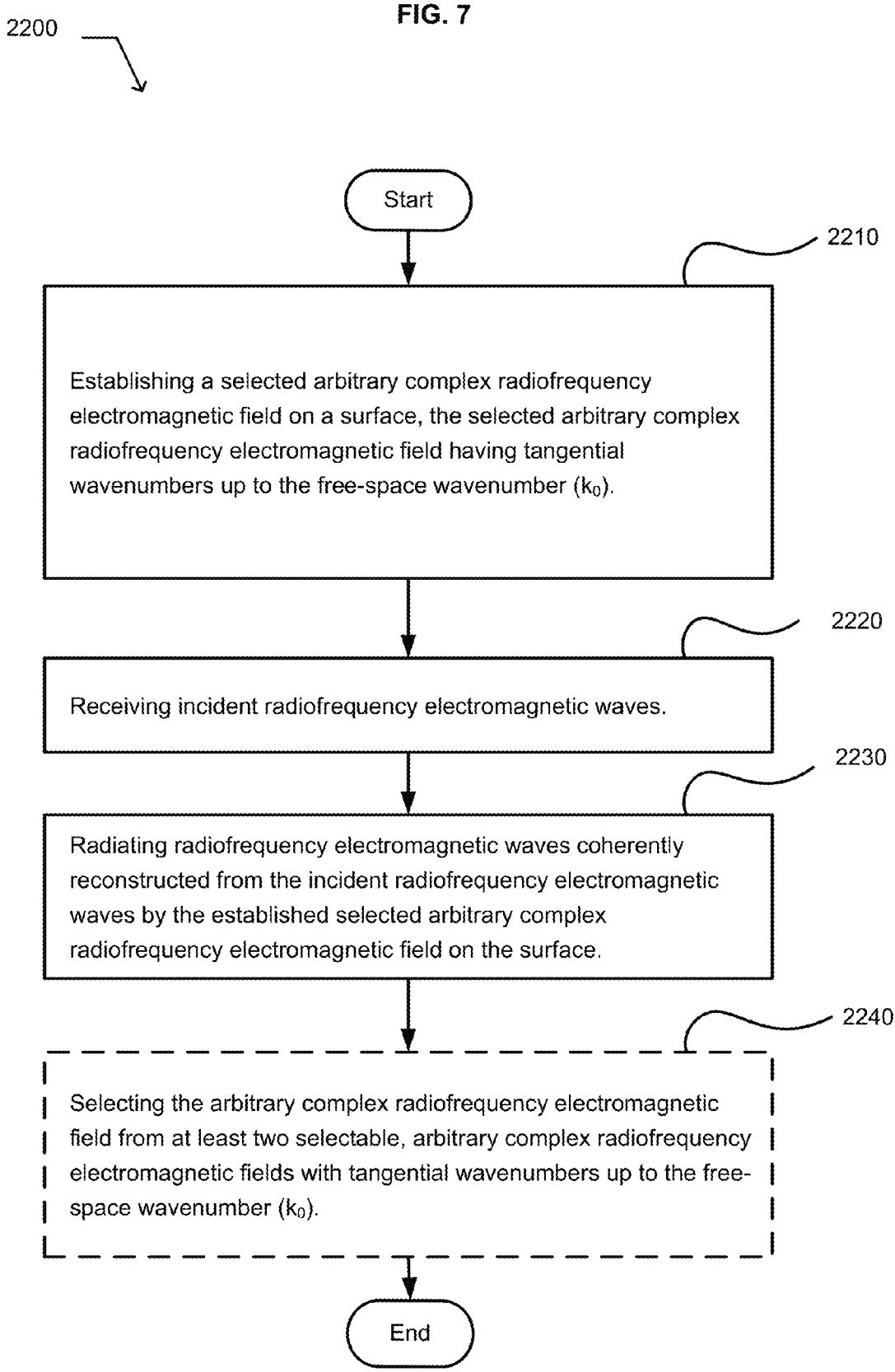

FIG. 8

2300

2310 Means for selecting an arbitrary complex radiofrequency electromagnetic field from at least two selectable, arbitrary complex radiofrequency electromagnetic fields having tangential wavenumbers up to the free-space wavenumber ($k_0$).

2320 Means for establishing the selected arbitrary complex radiofrequency electromagnetic field on a surface of an antenna.

2330 Means for receiving incident radiofrequency electromagnetic waves.

2340 Means for radiating radiofrequency electromagnetic waves coherently reconstructed from the incident radiofrequency electromagnetic waves by the selected arbitrary complex radiofrequency electromagnetic field established on the surface.

2510 Means for receiving incident radiofrequency electromagnetic waves at first surface of a generally planar structure having the first surface and a second surface.

2520 Means for establishing a selected arbitrary complex radiofrequency electromagnetic field on the second surface, the selected arbitrary complex radiofrequency electromagnetic field having tangential wavenumbers up to the free-space wavenumber ($k_0$).

2530 Means for radiating radiofrequency electromagnetic waves coherently reconstructed from the incident radiofrequency electromagnetic waves by the selected arbitrary complex radiofrequency electromagnetic field established on the second surface.

2540 Means for selecting the arbitrary complex radiofrequency electromagnetic field from at least two selectable, arbitrary complex radiofrequency electromagnetic fields.

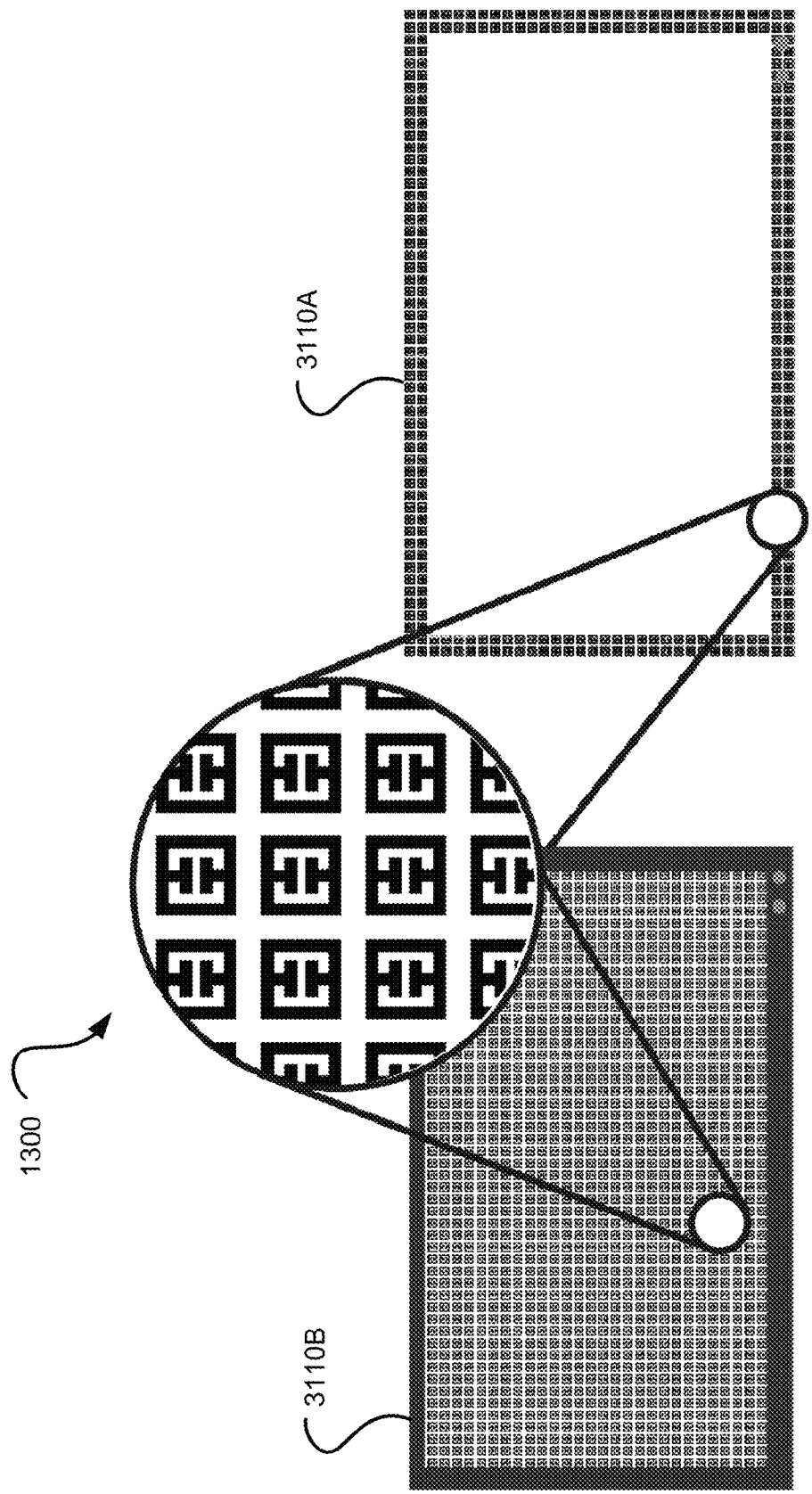

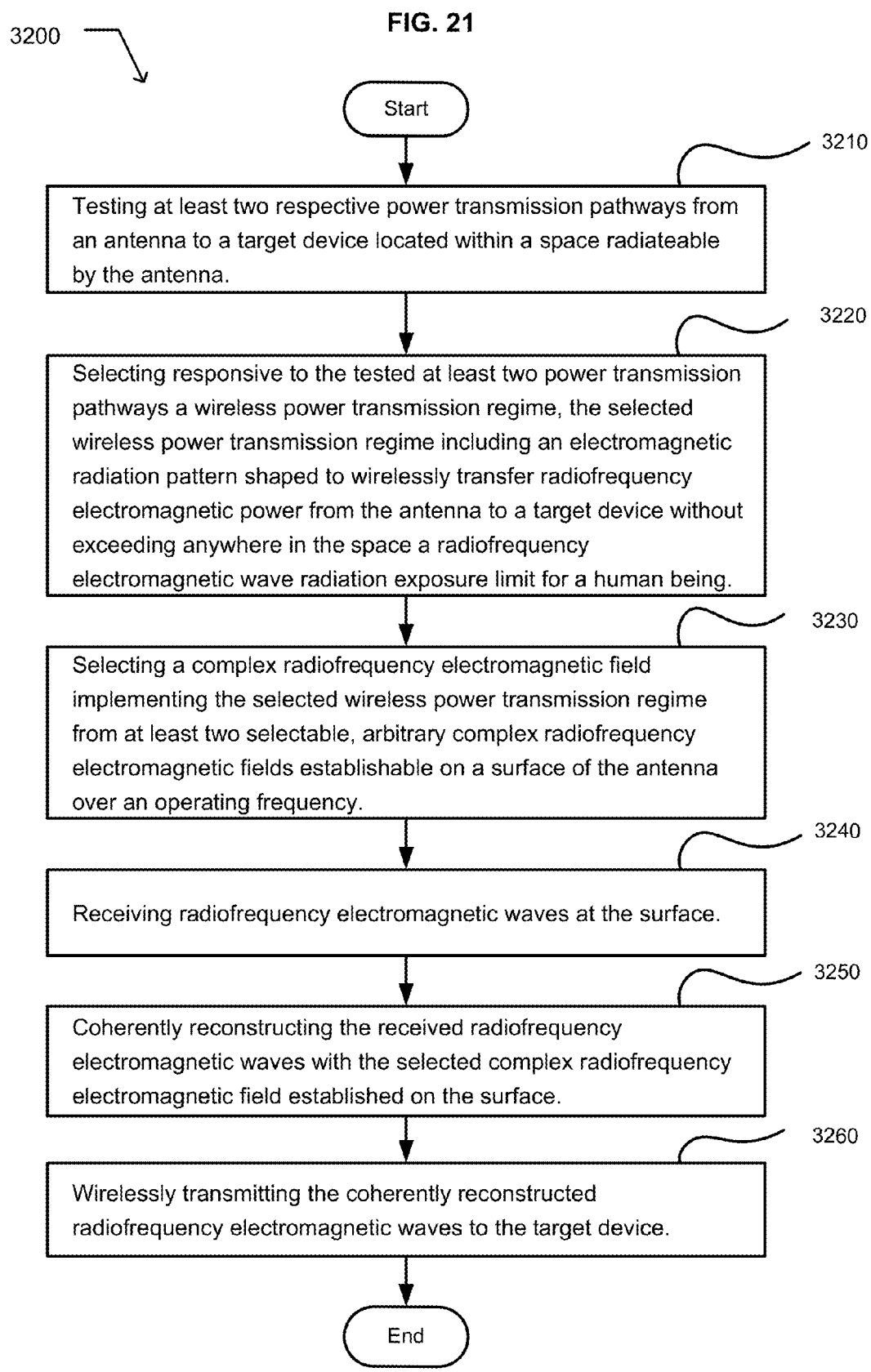

3352 Means for testing at least two respective power transmission pathways from an antenna to a target device located within a space radiateable by the antenna.

3354 Means for selecting responsive to the tested at least two power transmission pathways a wireless power transmission regime, the wireless power transmission regime including an electromagnetic radiation pattern shaped to wirelessly transfer radiofrequency electromagnetic power from the antenna to a target device without exceeding a radiofrequency electromagnetic wave radiation exposure limit for a human being.

3356 Means for selecting a complex radiofrequency electromagnetic field implementing the selected wireless power transmission regime from at least two selectable, arbitrary complex radiofrequency electromagnetic fields establishable on a surface of the antenna over an operating frequency.

3358 Means for receiving radiofrequency electromagnetic waves incident to the surface.

3362 Means for establishing the selected complex radiofrequency electromagnetic field on the surface.

3364 Means for coherently reconstructing the received radiofrequency electromagnetic waves with the selected complex radiofrequency electromagnetic field established on the surface.

3366 Means for wirelessly transmitting the coherently reconstructed radiofrequency electromagnetic waves.

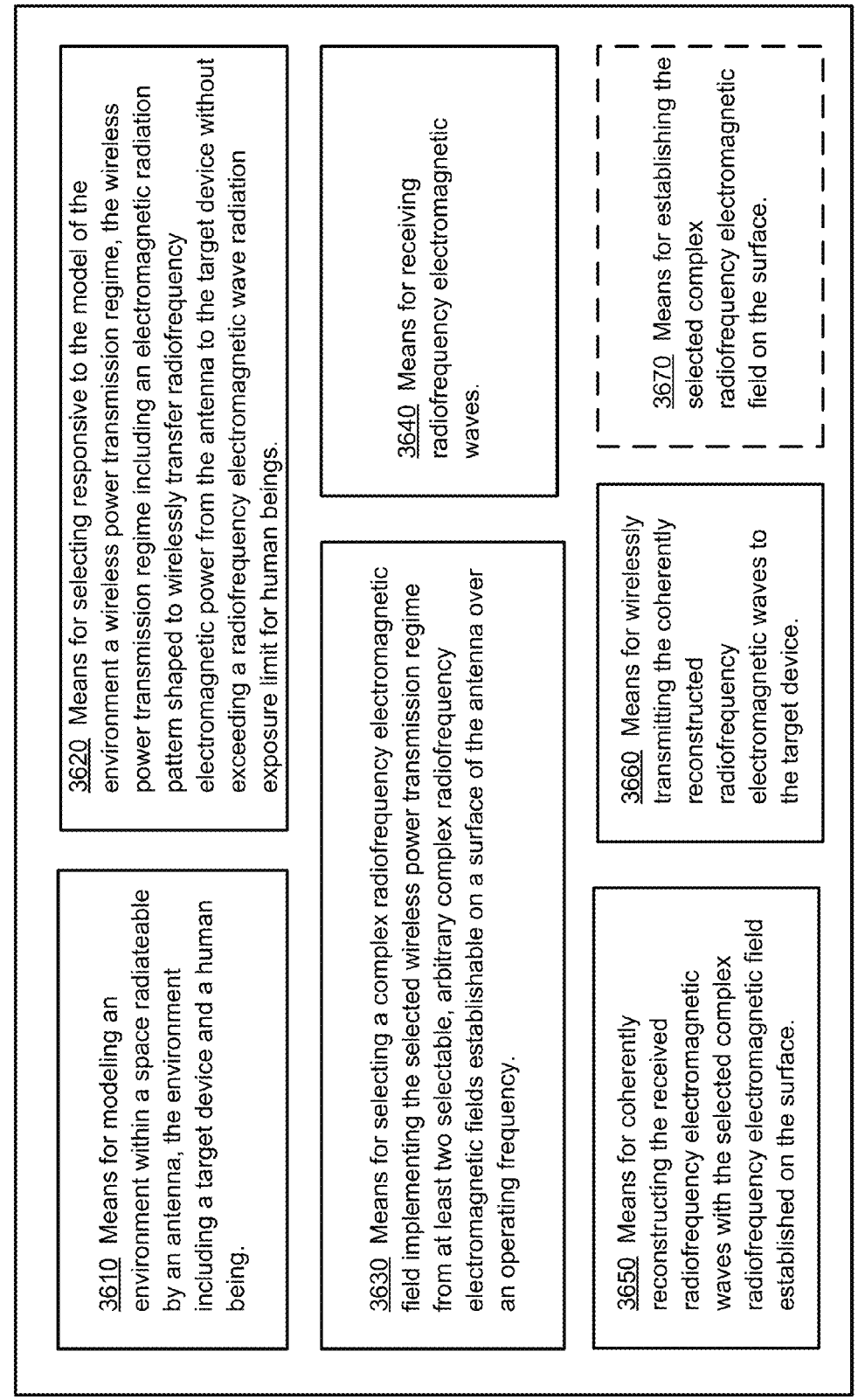

SYSTEM WIRELESSLY TRANSFERRING POWER TO A TARGET DEVICE OVER A MODELED TRANSMISSION PATHWAY WITHOUT EXCEEDING A RADIATION LIMIT FOR HUMAN BEINGS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

The present application claims benefit of priority of U.S. Provisional Patent Application No. 61/917,254, entitled METHODS AND DEVICES FOR WIRELESS POWER BEAMING, naming Tom Driscoll, David R. Smith and Yaroslav A. Urzhumov as inventors, filed 17 Dec. 2013, which was filed within the twelve months preceding the filing date of the present application or is an application of which a currently priority application is entitled to the benefit of the filing date.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

For example, and without limitation, an embodiment of the subject matter described herein includes a system. The system includes an antenna comprising a sub-Nyquist holographic aperture configured to define at least two selectable, arbitrary complex radiofrequency electromagnetic fields on a surface of the antenna over an operating frequency. The system includes a mapping engine configured to model an environment within a space radiateable by the antenna. The environment including a target device and a human being. The system includes an optimization circuit configured to select responsive to the model of the environment a wireless power transmission regime. The wireless power transmission regime including an electromagnetic radiation pattern shaped to wirelessly transfer radiofrequency electromagnetic power from the antenna to the target device without exceeding a radiofrequency electromagnetic wave radiation exposure limit for human beings. The system includes a gain definition circuit configured to select a complex radiofrequency electromagnetic field implementing the selected wireless power transmission regime from the at least two selectable, arbitrary complex radiofrequency electromagnetic fields. The system includes an antenna controller configured to define the selected, arbitrary complex radiofrequency electromagnetic field in the sub-Nyquist holographic aperture.

In an embodiment, the sub-Nyquist holographic aperture and the surface are cooperatively structured so that radiofrequency electromagnetic waves incident upon the surface are coherently reconstructed by the selected arbitrary complex radiofrequency electromagnetic field and transmitted to the target device. In an embodiment, the sub-Nyquist holographic aperture and the surface are structured to cooperatively transmit electromagnetic waves into free space. The transmitted electromagnetic waves are coherently reconstructed by the sub-Nyquist holographic aperture from received incident waves and have a radiation pattern defined by the selected arbitrary complex radiofrequency electromagnetic field. In an embodiment, the system includes a radiofrequency electromagnetic wave generating apparatus configured to generate and deliver radiofrequency electromagnetic waves to the surface of the antenna. The frequency of the radiofrequency electromagnetic waves is within at least a portion of the operating frequency of the antenna.

In an embodiment, the system includes a path analysis engine configured to test the selected wireless power transmission regime. In an embodiment, the system includes at least one device configured to detect or measure a characteristic or parameter of the environment. In an embodiment, the system includes a power transfer manager configured to initiate, modify, or terminate a transfer of radiofrequency electromagnetic energy from the antenna to the target device. In an embodiment, the system includes a communications module configured to communicate with the target device. In an embodiment, the system includes an update manager configured to initiate an update of the selected wireless power transmission regime.

For example, and without limitation, an embodiment of the subject matter described herein includes a method. The method includes modeling an environment within a space radiateable by an antenna, the environment including a target device and a human being. The method includes selecting responsive to the model of the environment a wireless power transmission regime. The wireless power transmission regime including an electromagnetic radiation pattern shaped to wirelessly transfer radiofrequency electromagnetic power from the antenna to the target device without exceeding a radiofrequency electromagnetic wave radiation exposure limit for human beings. The method includes selecting a complex radiofrequency electromagnetic field implementing the selected wireless power transmission regime from at least two selectable, arbitrary complex radiofrequency electromagnetic fields definable on a surface of the antenna over an operating frequency. The method includes receiving radiofrequency electromagnetic waves. The method includes coherently reconstructing the received radiofrequency electromagnetic waves with the selected arbitrary complex radiofrequency electromagnetic field defined on the surface. The method includes wirelessly transmitting the coherently reconstructed radiofrequency electromagnetic waves to the target device.

In an embodiment, the at least two selectable, arbitrary complex radiofrequency electromagnetic fields are definable on a surface of the antenna by a sub-Nyquist holographic aperture over an operating frequency. In an embodiment, the method includes defining the selected arbitrary complex radiofrequency electromagnetic field on the surface. In an embodiment, the method includes testing the respective at least two power transmission pathways at least partially in response to sensor-acquired data indicative of a characteristic or parameter of the environment. In an embodiment, the method includes acquiring data indicative of a characteristic or parameter of the environment. In an embodiment, the method includes generating an estimate of a characteristic or parameter of the environment by multisensor data fusion responsive to data indicative of a characteristic or parameter of the environment respectively received from at least two sensors. In an embodiment, the method includes initiating an update of the selected wireless power transmission regime. In an embodiment, the method includes initiating, modifying, or terminating a transfer of radiofrequency electromagnetic energy from the antenna to the target device in response to a request originated by the target device or in response to a schedule.

For example, and without limitation, an embodiment of the subject matter described herein includes an apparatus. The apparatus includes means for modeling an environment within a space radiateable by an antenna, the environment including a target device and a human being. The apparatus includes means for selecting responsive to the model of the environment a wireless power transmission regime. The wireless power transmission regime including an electromagnetic radiation pattern shaped to wirelessly transfer radiofrequency electromagnetic power from the antenna to the target device without exceeding a radiofrequency electromagnetic wave radiation exposure limit for human beings. The apparatus includes means for selecting a complex radiofrequency electromagnetic field implementing the selected wireless power transmission regime from at least two selectable, arbitrary complex radiofrequency electromagnetic fields definable on a surface of the antenna over an operating frequency. The apparatus includes means for receiving radiofrequency electromagnetic waves. The apparatus includes means for coherently reconstructing the received radiofrequency electromagnetic waves with the selected arbitrary complex radiofrequency electromagnetic field defined on the surface. The apparatus includes means for wirelessly transmitting the coherently reconstructed radiofrequency electromagnetic waves to the target device.

In an embodiment, the apparatus includes means for testing the respectively at least two power transmission pathways at least partially in response to data indicative of a characteristic or parameter of the environment acquired by a sensor. In an embodiment, the apparatus includes means for acquiring data indicative of a characteristic or parameter of the environment. In an embodiment, the apparatus includes means for the selected arbitrary complex radiofrequency electromagnetic field on the surface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 illustrates an example operational flow 2200;

FIG. 8 illustrates an example apparatus 2300;

FIG. 10 illustrates an example apparatus 2500;

FIG. 20 illustrates alternative embodiments 3110A and 3110 B of the antenna 3110 illustrated in conjunction with FIGS. 18-19;

FIG. 21 illustrates an example operational flow 3200;

FIG. 22 illustrates an example apparatus 3300;

FIG. 26 illustrates an example apparatus 3600.

DETAILED DESCRIPTION

Figure 1:
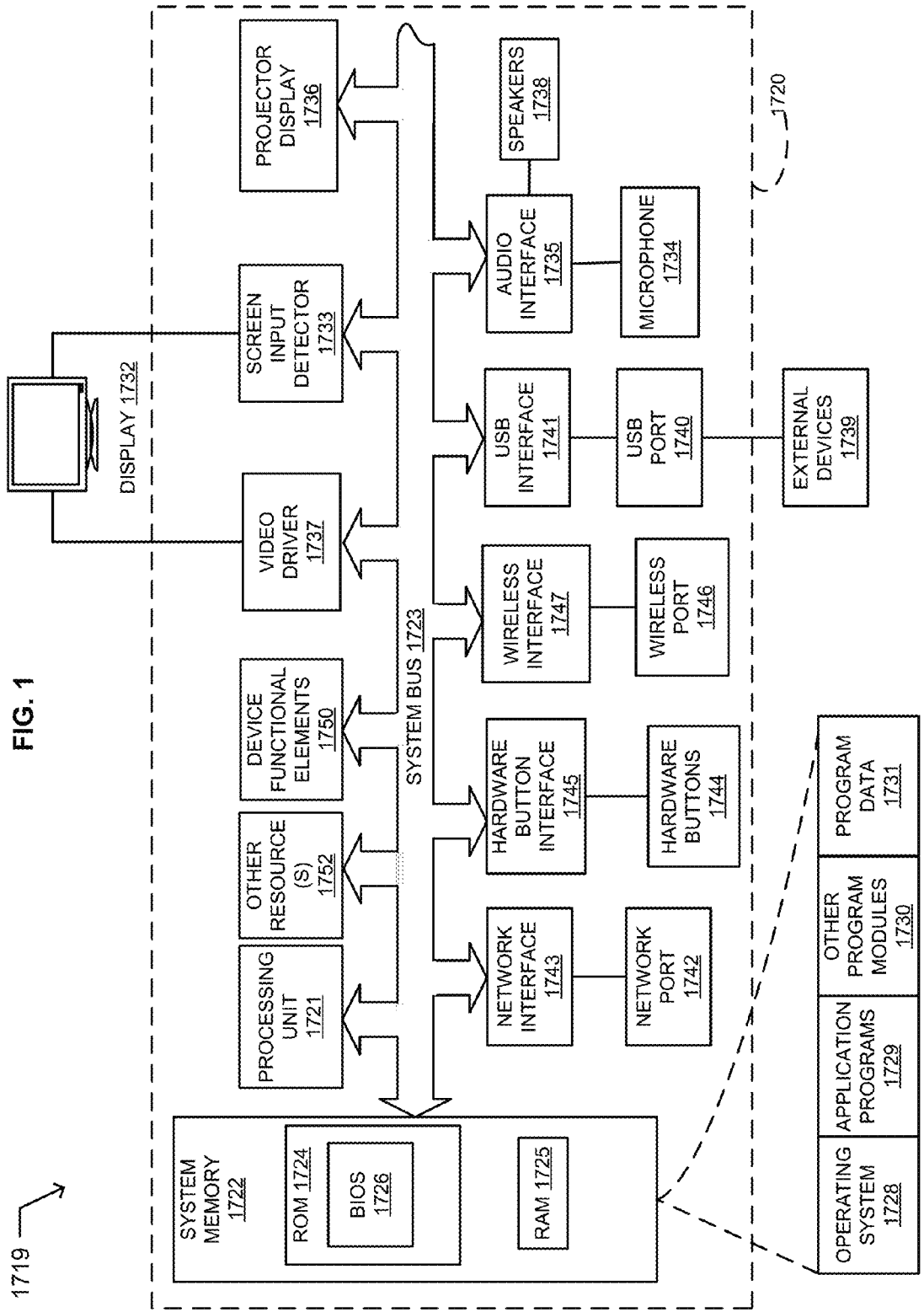
FIG. 1 illustrates an example embodiment of an environment 1719 that includes a thin computing device 1720 in which embodiments may be implemented.

This application makes reference to technologies described more fully in U.S. patent application Ser. No. 12/286,740, entitled BEAM POWER FOR LOCAL RECEIVERS, naming Roderick A. Hyde et al. as inventors, filed on Sep. 30, 2008, is related to the present application. That application is incorporated by reference herein, including any subject matter included by reference in that application.

This application makes reference to technologies described more fully in U.S. patent application Ser. No. 12/286,737, entitled BEAM POWER WITH MULTIPOINT BROADCAST, naming Roderick A. Hyde et al. as inventors, filed on Sep. 30, 2008, is related to the present application. That application is incorporated by reference herein, including any subject matter included by reference in that application.

This application makes reference to technologies described more fully in U.S. patent application Ser. No. 12/286,755, entitled BEAM POWER WITH MULTIPOINT RECEPTION, naming Roderick A. Hyde et al. as inventors, filed on Sep. 30, 2008, is related to the present application. That application is incorporated by reference herein, including any subject matter included by reference in that application.

This application makes reference to technologies described more fully in U.S. patent application Ser. No. 12/286,741, entitled BEAM POWER WITH BEAM REDIRECTION, naming Roderick A. Hyde et al. as inventors, filed on Sep. 30, 2008, is related to the present application. That application is incorporated by reference herein, including any subject matter included by reference in that application.

This application makes reference to technologies described more fully in U.S. Patent Application No. 61/455,171, entitled SURFACE SCATTERING ANTENNAS, naming Nathan Kundtz as inventor, filed Oct. 15, 2010, is related to the present application. That application is incorporated by reference herein, including any subject matter included by reference in that application.

This application makes reference to technologies described more fully in U.S. patent application Ser. No. 13/317,338, entitled SURFACE SCATTERING ANTENNAS, naming Adam Bily et al. as inventors, filed Oct. 14, 2011, is related to the present application. That application is incorporated by reference herein, including any subject matter included by reference in that application.

This application makes reference to technologies described more fully in U.S. patent application Ser. No. 13/838,934, entitled SURFACE SCATTERING ANTENNA IMPROVEMENTS, naming Adam Bily et al. as inventors, filed Mar. 15, 2013, is related to the present application. That application is incorporated by reference herein, including any subject matter included by reference in that application.

This application makes reference to technologies described more fully in U.S. patent application Ser. No. 14/102,253, entitled SURFACE SCATTERING REFLECTOR ANTENNA, naming Jeffrey A. Bowers et al. as inventors, filed Dec. 10, 2013, is related to the present application. That application is incorporated by reference herein, including any subject matter included by reference in that application.

This application makes reference to technologies described more fully in U.S. patent application Ser. No. 14/226,213, entitled SURFACE SCATTERING ANTENNA ARRAY, naming Jesse R. Cheatham, III et al. as inventors, filed Mar. 26, 2014, is related to the present application. That application is incorporated by reference herein, including any subject matter included by reference in that application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2:
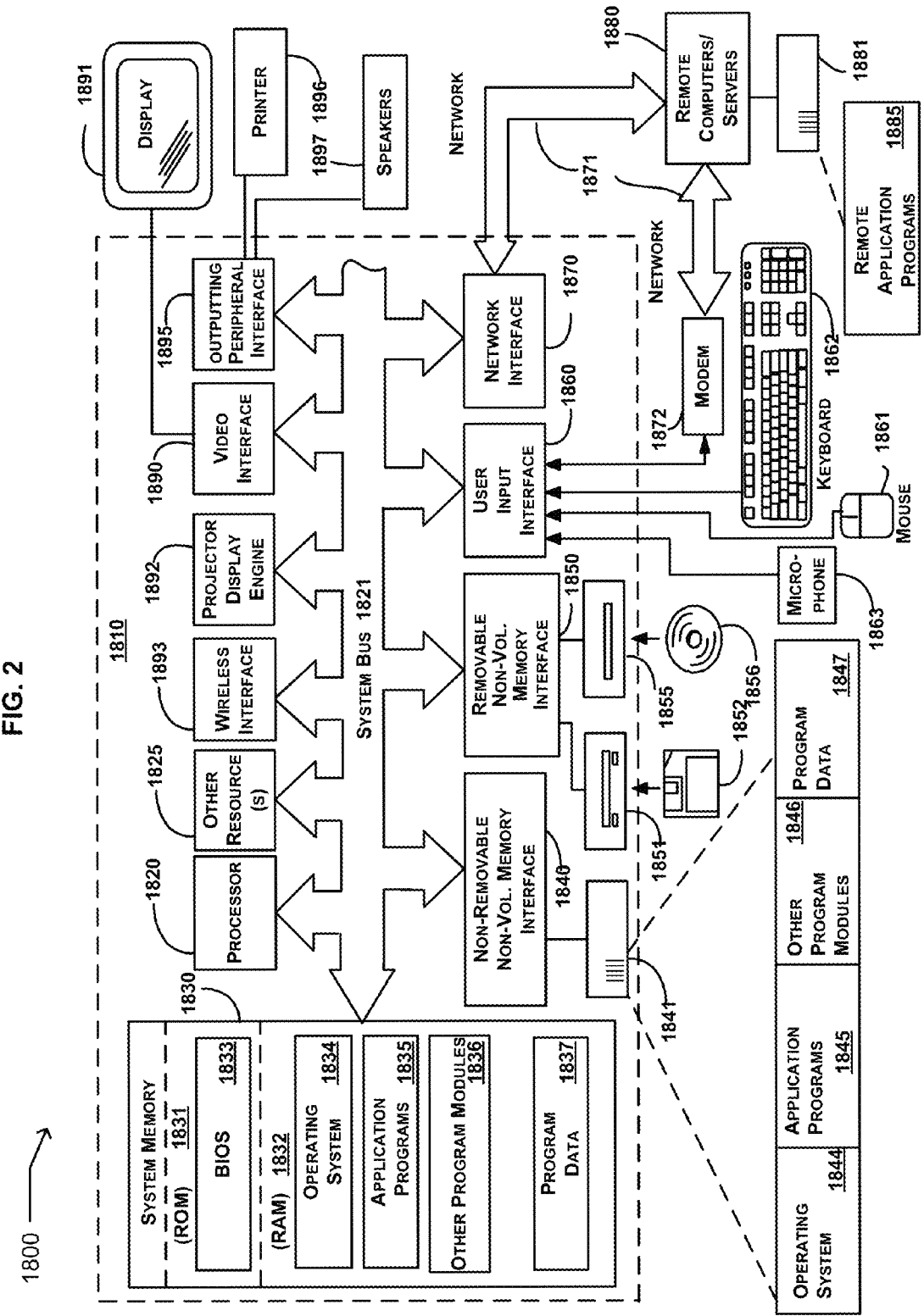
FIG. 2 illustrates an example embodiment of an environment 1800 that includes a general-purpose computing system 1810 in which embodiments may be implemented.

FIGS. 1 and 2 provide respective general descriptions of several environments in which implementations may be implemented. FIG. 1 is generally directed toward a thin computing environment 1719 having a thin computing device 1720, and FIG. 2 is generally directed toward a general purpose computing environment 1800 having general purpose computing device 1810. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 1719 in which embodiments may be implemented. FIG. 1 illustrates an example system that includes a thin computing device 1720, which may be included or embedded in an electronic device that also includes a device functional element 1750. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 1720 includes a processing unit 1721, a system memory 1722, and a system bus 1723 that couples various system components including the system memory 1722 to the processing unit 1721. The system bus 1723 may be any of several types of bus structures including a memory bus or memory controller, a peripheral bus, and a local bus using any of a variety of bus architectures. The system memory includes read-only memory (ROM) 1724 and random access memory (RAM) 1725. A basic input/output system (BIOS) 1726, containing the basic routines that help to transfer information between subcomponents within the thin computing device 1720, such as during start-up, is stored in the ROM 1724. A number of program modules may be stored in the ROM 1724 or RAM 1725, including an operating system 1728, one or more application programs 1729, other program modules 1730 and program data 1731.

A user may enter commands and information into the computing device 1720 through one or more input interfaces. An input interface may include a touch-sensitive screen or display surface, or one or more switches or buttons with suitable input detection circuitry. A touch-sensitive screen or display surface is illustrated as a touch-sensitive display 1732 and screen input detector 1733. One or more switches or buttons are illustrated as hardware buttons 1744 connected to the system via a hardware button interface 1745. The output circuitry of the touch-sensitive display 1732 is connected to the system bus 1723 via a video driver 1737. Other input devices may include a microphone 1734 connected through a suitable audio interface 1735, or a physical hardware keyboard (not shown). Output devices may include the display 1732, or a projector display 1736.

In addition to the display 1732, the computing device 1720 may include other peripheral output devices, such as at least one speaker 1738. Other external input or output devices 1739, such as a joystick, game pad, satellite dish, scanner or the like may be connected to the processing unit 1721 through a USB port 1740 and USB port interface 1741, to the system bus 1723. Alternatively, the other external input and output devices 1739 may be connected by other interfaces, such as a parallel port, game port or other port. The computing device 1720 may further include or be capable of connecting to a flash card memory (not shown) through an appropriate connection port (not shown). The computing device 1720 may further include or be capable of connecting with a network through a network port 1742 and network interface 1743, and through wireless port 1746 and corresponding wireless interface 1747 may be provided to facilitate communication with other peripheral devices, including other computers, printers, and so on (not shown). It will be appreciated that the various components and connections shown are examples and other components and means of defining communication links may be used.

The computing device 1720 may be primarily designed to include a user interface. The user interface may include a character, a key-based, or another user data input via the touch sensitive display 1732. The user interface may include using a stylus (not shown). Moreover, the user interface is not limited to an actual touch-sensitive panel arranged for directly receiving input, but may alternatively or in addition respond to another input device such as the microphone 1734. For example, spoken words may be received at the microphone 1734 and recognized. Alternatively, the computing device 1720 may be designed to include a user interface having a physical keyboard (not shown).

The device functional elements 1750 are typically application specific and related to a function of the electronic device, and are coupled with the system bus 1723 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 1720 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 1800. Components of the computing system environment 1800 may include, but are not limited to, a general purpose computing device 1810 having a processor 1820, a system memory 1830, and a system bus 1821 that couples various system components including the system memory to the processor 1820. The system bus 1821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 1800 typically includes a variety of computer-readable media products. Computer-readable media may include any media that can be accessed by the computing device 1810 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 1810. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media. Computer storage media is a non-transitory computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media. Communication media is a transitory computer-readable media.

The system memory 1830 includes computer storage media in the form of volatile and nonvolatile memory such as ROM 1831 and RAM 1832. A RAM may include at least one of a DRAM, an EDO DRAM, a SDRAM, a RDRAM, a VRAM, or a DDR DRAM. A basic input/output system (BIOS) 1833, containing the basic routines that help to transfer information between elements within the computing device 1810, such as during start-up, is typically stored in ROM 1831. RAM 1832 typically contains data and program modules that are immediately accessible to or presently being operated on by the processor 1820. By way of example, and not limitation, FIG. 2 illustrates an operating system 1834, application programs 1835, other program modules 1836, and program data 1837. Often, the operating system 1834 offers services to applications programs 1835 by way of one or more application programming interfaces (APIs) (not shown). Because the operating system 1834 incorporates these services, developers of applications programs 1835 need not redevelop code to use the services. Examples of APIs provided by operating systems such as Microsoft's "WINDOWS" ® are well known in the art.

The computing device 1810 may also include other removable/non-removable, volatile/nonvolatile computer storage media products. By way of example only, FIG. 2 illustrates a non-removable non-volatile memory interface (hard disk interface) 1840 that reads from and writes for example to non-removable, non-volatile magnetic media. FIG. 2 also illustrates a removable non-volatile memory interface 1850 that, for example, is coupled to a magnetic disk drive 1851 that reads from and writes to a removable, non-volatile magnetic disk 1852, or is coupled to an optical disk drive 1855 that reads from and writes to a removable, non-volatile optical disk 1856, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 1841 is typically connected to the system bus 1821 through a non-removable memory interface, such as the interface 1840, and magnetic disk drive 1851 and optical disk drive 1855 are typically connected to the system bus 1821 by a removable non-volatile memory interface, such as interface 1850.

The drives and their associated computer storage media discussed above and illustrated in FIG. 2 provide storage of computer-readable instructions, data structures, program modules, and other data for the computing device 1810. In FIG. 2, for example, hard disk drive 1841 is illustrated as storing an operating system 1844, application programs 1845, other program modules 1846, and program data 1847. Note that these components can either be the same as or different from the operating system 1834, application programs 1835, other program modules 1836, and program data 1837. The operating system 1844, application programs 1845, other program modules 1846, and program data 1847 are given different numbers here to illustrate that, at a minimum, they are different copies.

A user may enter commands and information into the computing device 1810 through input devices such as a microphone 1863, keyboard 1862, and pointing device 1861, commonly referred to as a mouse, trackball, or touch pad. Other input devices (not shown) may include at least one of a touch-sensitive screen or display surface, joystick, game pad, satellite dish, and scanner. These and other input devices are often connected to the processor 1820 through a user input interface 1860 that is coupled to the system bus, but may be connected by other interface and bus structures, such as a parallel port, game port, or a universal serial bus (USB).

A display 1891, such as a monitor or other type of display device or surface may be connected to the system bus 1821 via an interface, such as a video interface 1890. A projector display engine 1892 that includes a projecting element may be coupled to the system bus. In addition to the display, the computing device 1810 may also include other peripheral output devices such as speakers 1897 and printer 1896, which may be connected through an output peripheral interface 1895.

The computing system environment 1800 may operate in a networked environment using logical connections to one or more remote computers, such as a remote computer 1880. The remote computer 1880 may be a personal computer, a server, a router, a network PC, a peer device, or other common network node, and typically includes many or all of the elements described above relative to the computing device 1810, although only a memory storage device 1881 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 1800 is connected to the network 1871 through a network interface, such as the network interface 1870, the modem 1872, or the wireless interface 1893. The network may include a LAN network environment, or a WAN network environment, such as the Internet. In a networked environment, program modules depicted relative to the computing device 1810, or portions thereof, may be stored in a remote memory storage device. By way of example, and not limitation, FIG. 2 illustrates remote application programs 1885 as residing on memory storage device 1881. It will be appreciated that the network connections shown are examples and other means of defining a communication link between the computers may be used.

In certain instances, one or more elements of the computing device 1810 may be deemed not necessary and omitted. In other instances, one or more other elements may be deemed necessary and added to the computing device.

Figure 3:
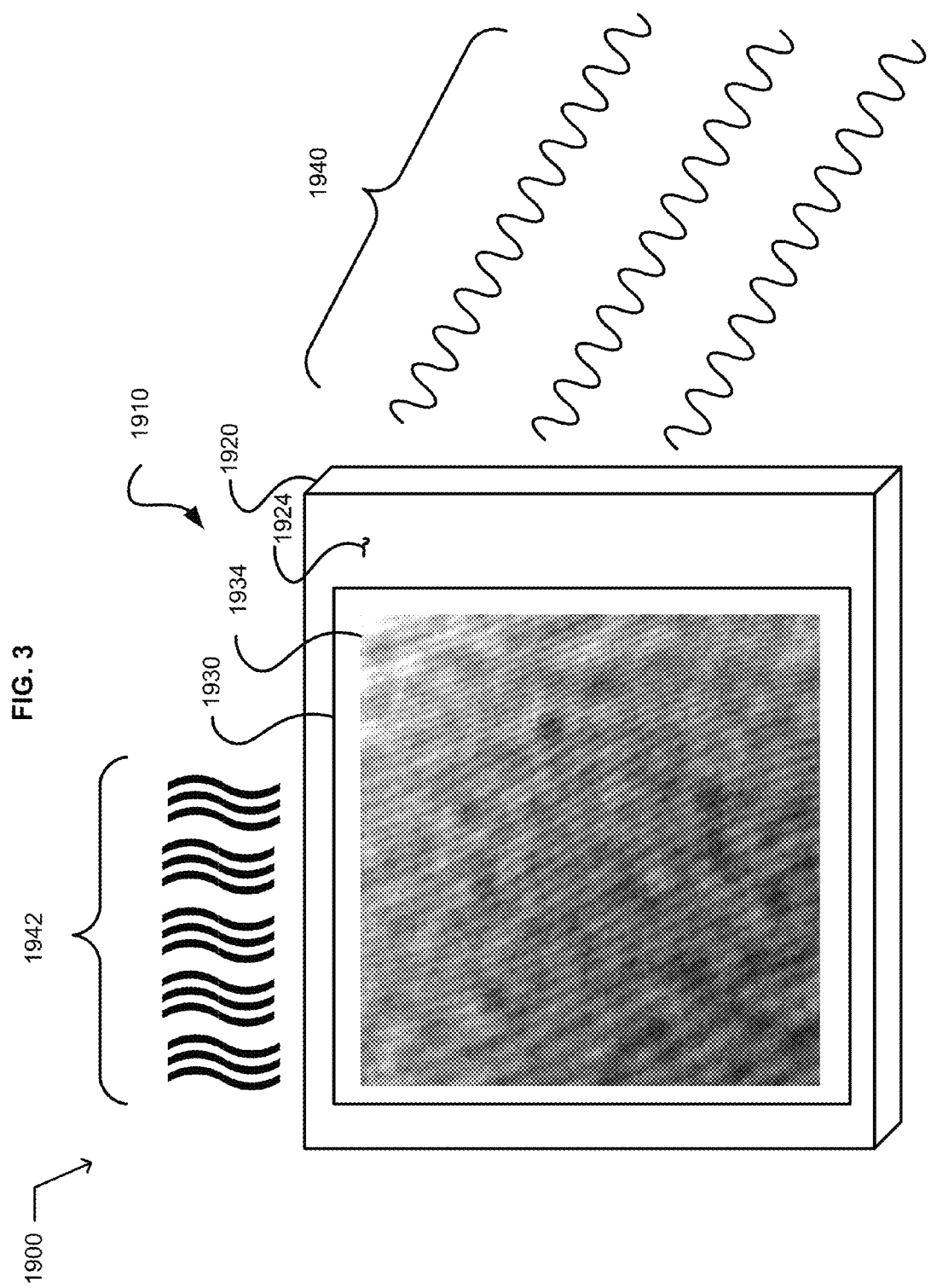
FIG. 3 illustrates an environment 1900 in which embodiments may be implemented.

FIG. 3 illustrates an example environment 1900 that includes an antenna 1910. The antenna includes a sub-Nyquist holographic aperture 1930 configured to define at least two selectable, arbitrary complex radiofrequency electromagnetic fields on a surface 1924 with tangential wavenumbers up to the free-space wavenumber ($k_0$). The free-space wavenumber ($k_0$), sometimes written as $k_0$ without the parenthesis or as k0, is employed in Fourier optics or Fourier domain theory. The free-space wavenumber can be expressed as a function of frequency and velocity, or just the wavelength:

$$k_0 = 2\pi/\lambda$$

An arbitrary complex radiofrequency electromagnetic field of the at least two selectable, arbitrary complex radiofrequency electromagnetic fields is illustrated by arbitrary complex radiofrequency electromagnetic field 1934. In an embodiment, the aperture is physically or structurally associated with the surface. For example, a sub-Nyquist holographic aperture may include an aperture with aperture elements spaced more closely than the Nyquist sampling rate for the operating frequency. The surface is configured to receive an incident radiofrequency electromagnetic wave 1940. The surface is also configured to transmit or radiate the radiofrequency electromagnetic wave 1942.

In an embodiment, the holographic aperture 1930 includes a sub-Nyquist transmission hologram-defined aperture. In an embodiment, the holographic aperture includes a sub-Nyquist reflection hologram-defined aperture. In an embodiment, the holographic aperture includes a sub-Nyquist scalar holographic aperture. For example, the sub-Nyquist scalar holographic aperture may provide amplitude or phase control without polarization. For example, a sub-Nyquist scalar holographic aperture may be based on scalar Huygens-Fresnel principles. In an embodiment, the holographic aperture includes an amplitude modulation hologram-defined aperture. In an embodiment, the amplitude modulation includes amplitude modulation by non-negative numbers. In an embodiment, the amplitude modulation includes amplitude modulation by both positive and negative numbers, and zero. In an embodiment, the holographic aperture includes a sub-Nyquist vector holographic aperture. For example, polarization control is expected to provide increased accuracy in the near field. For example, the sub-Nyquist vector holographic aperture may be based on vector diffraction theory, such as the Stratton-Chu (a.k.a. Schelkunoff) vector integral transformation. Furthermore, vector diffraction theory ultimately derives from dyadic (tensor) Green's function (propagator) for electromagnetic fields. In an embodiment, the holographic aperture includes a phase modulation holographic aperture. For example, phase modulation may be defined as the use of at least two phases that are different modulo π (not modulo 2π). In an embodiment, the holographic aperture includes an amplitude and a phase modulation holographic aperture. For example, a classical radiofrequency example of simultaneous amplitude and phase modulation is QAM—Quadratic Amplitude Modulation, where two amplitudes and two phases are combined to form a 4-star constellation in the complex plane. This example includes phase shifts of less than π, such as π/2. In an embodiment, the holographic aperture includes a holographic aperture configured to dynamically define a series of at least two arbitrary complex radiofrequency electromagnetic fields on the surface 1924.

In an embodiment, the antenna 1910 has an operating frequency between approximately 300 GHz and approximately 3 THz. This is generally referred to as terahertz or submillimeter radiofrequency electromagnetic waves. In an embodiment, the antenna has an operating frequency less than approximately 300 GHz. This is generally referred to as below or less than infrared and Terahertz radiofrequency electromagnetic waves. In an embodiment, the antenna has an operating frequency between approximately 300 MHz and approximately 300 GHz. This is generally referred to as millimeter or microwave radiofrequency electromagnetic waves. In an embodiment, the antenna has an operating frequency between approximately 3 Hz and approximately 300 MHz. This is generally referred to as radio electromagnetic waves.

In an embodiment, the antenna 1910 has an operating frequency that includes the 60 GHz band. The 60 GHz band is generally considered between 57 and 65 GHz, and may be described as WiGigg communications band. In an embodiment, the antenna has an operating frequency that includes at least one of the 70 GHz band, the 80 GHz, or the 90 GHz band. The 70 GHz band is generally considered between 71 and 76 GHz. The 80 GHz band is generally considered between 81 and 86 GHz. The 90 GHz band is generally considered between 92 and 95 GHz.

In an embodiment, the antenna 1910 is configured to beam radiofrequency electromagnetic power. In an embodiment, the antenna is configured to transfer radiofrequency electromagnetic power. In an embodiment, the antenna is configured to receive a radiofrequency electromagnetic wave. In an embodiment, the sub-Nyquist holographic aperture 1930 is configured to define a selected arbitrary complex radiofrequency electromagnetic field in response to respective electrical control signals.

Figure 4:
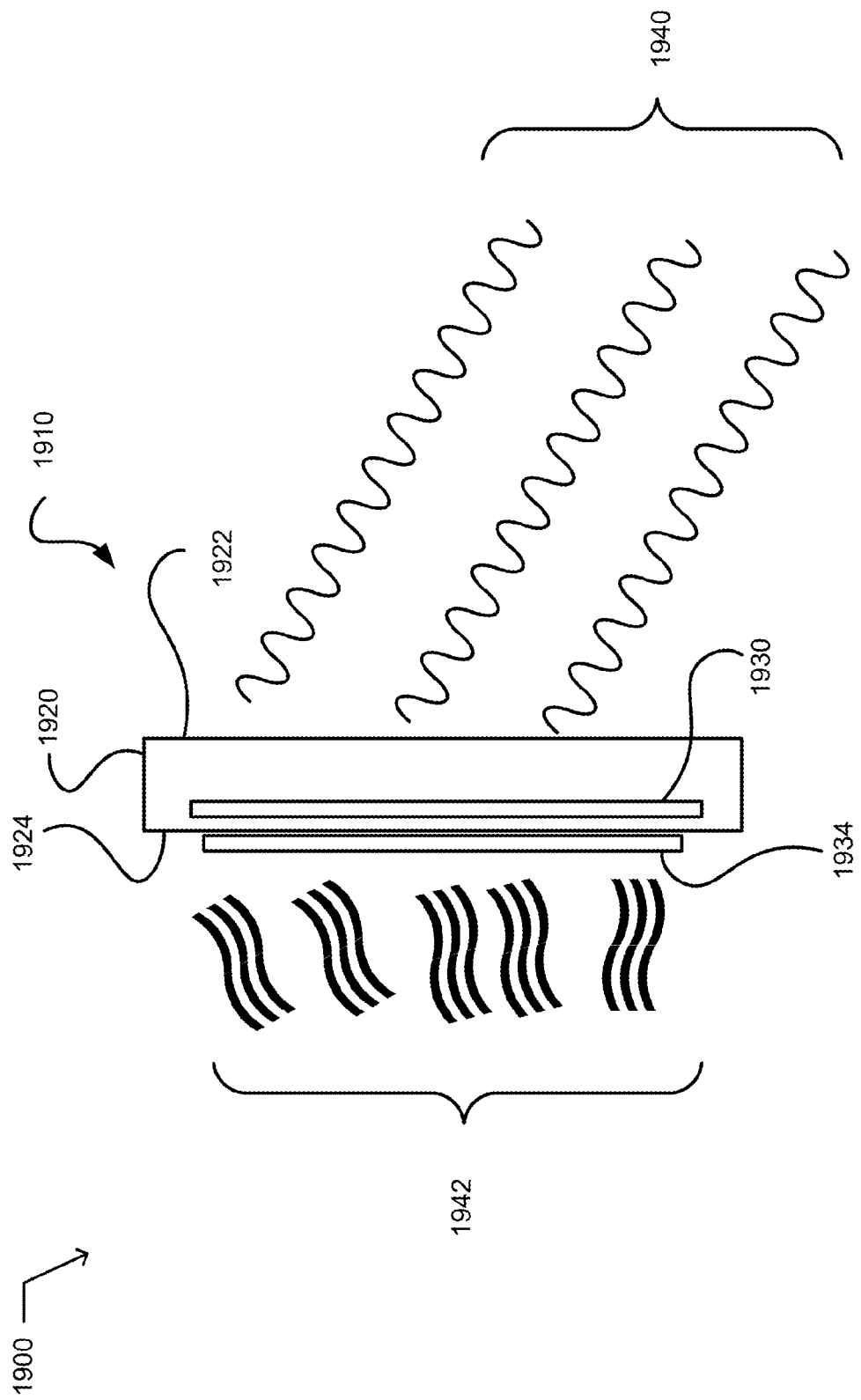
FIG. 4 illustrates an alternative embodiment of the antenna 1910.

FIG. 4 illustrates an alternative embodiment of the antenna 1910. In the alternative embodiment, the surface 1924 includes a second surface of a generally planar structure 1920. The planar structure includes a first surface 1922 configured to receive incident radiofrequency electromagnetic waves 1940. The sub-Nyquist holographic aperture 1930 is configured to coherently reconstruct the incident radiofrequency electromagnetic waves responsive to a definition on the second surface of a selected one 1934 of the at least two selectable, arbitrary complex radiofrequency electromagnetic fields. The second surface is configured to transmit the coherent reconstruction of the incident radiofrequency electromagnetic waves 1942. For example, in an embodiment, the sub-Nyquist holographic aperture functions as a modifying element or as a lens. In an embodiment, the coherent reconstruction includes formation of an antenna gain pattern defined by the selected 1934 selectable, arbitrary complex radiofrequency electromagnetic field. In an embodiment, the antenna gain pattern includes an antenna radiation or transmission gain pattern. In an embodiment, the antenna gain pattern includes an antenna reception gain pattern.

In an embodiment, the incident radiofrequency electromagnetic wave 1940 includes a free space propagating radiofrequency electromagnetic wave. For example, a free space propagating radiofrequency electromagnetic wave may include a wave propagating in clear air. In an embodiment, the incident radiofrequency electromagnetic waves include incident waveguide-propagated radiofrequency electromagnetic waves. In an embodiment, the wavenumber inside the waveguide exceeds the free space wavenumber ($k_o$). In an embodiment, the incident radiofrequency electromagnetic waves include radiofrequency electromagnetic waves leaking from a waveguide. For example, the waveguide may include a planar waveguide. In an embodiment, the incident radiofrequency electromagnetic waves include incident conductor-propagated radiofrequency electromagnetic waves. In an embodiment, the incident radiofrequency electromagnetic waves include non-normal incident radiofrequency electromagnetic waves. For example, a non-normal incident electromagnetic wave may be up to 90 degrees off normal, such as parallel to the first surface 1922. For example, clear air may include clear air within a room, build, warehouse, or stadium. In an embodiment, the incident radiofrequency electromagnetic waves include radiofrequency electromagnetic waves propagating oblique to the surface. In an embodiment, the transmitted radiofrequency electromagnetic wave 1942 includes a free space propagating radiofrequency electromagnetic wave.

In an embodiment, the generally planar structure 1920 includes a generally planar curved structure. For example, the generally planar structure may include a locally flat surface whose principal radii of curvature are much larger than the aperture element spacing. For an example, see aperture element spacing 2018 described in conjunction with FIG. 5 infra. In an embodiment, the generally planar structure includes a generally planar structure having a first surface 1922 and second surface 1924 spaced apart from and generally parallel to the first surface. In an embodiment, the first surface is spaced apart from the second surface by a distance equal to or less than twice a free-space wavelength corresponding to an operating frequency of the antenna. In an embodiment, the operating frequency includes the highest frequency of an operating frequency band or bandwidth, or an operating frequency range. In an embodiment, the first surface is spaced apart from the second surface by a distance less than four times a free-space wavelength corresponding to an operating frequency of the antenna.

In another alternative embodiment of the antenna 1910, the surface is a second surface 1924 of a generally planar structure. The planar structure includes a first surface 1922. The second surface is configured to receive an incident free-space propagating radiofrequency electromagnetic wave 1942. The sub-Nyquist holographic aperture 1930 is configured to coherently reconstruct the incident free-space radiofrequency electromagnetic wave responsive to a definition on the second surface of a selected one 1934 of the at least two selectable, arbitrary complex radiofrequency electromagnetic fields. The first surface is configured to transmit the coherent reconstruction 1940 of the incident free-space radiofrequency electromagnetic wave 1942.

In an embodiment, the coherent reconstruction 1940 includes formation of an antenna gain radiation defined by the selected 1934 selectable, arbitrary complex radiofrequency electromagnetic field. In an embodiment, the antenna radiation pattern includes an antenna transmission pattern. In an embodiment, the antenna radiation pattern includes an antenna reception pattern. In an embodiment, the transmitted coherent reconstruction includes waveguide-propagated transmission of the coherent reconstruction of the incident radiofrequency electromagnetic wave. In an embodiment, the transmitted coherent reconstruction includes conductor-propagated transmission of the coherent reconstruction of the incident radiofrequency electromagnetic wave. In an embodiment, the at least two selectable, arbitrary complex radiofrequency electromagnetic fields are respectively configured for reception of radiofrequency electromagnetic waves. In an embodiment, the at least two selectable, arbitrary complex radiofrequency electromagnetic fields are respectively configured for transmission of a radiofrequency electromagnetic waves. In an embodiment, the at least two selectable, arbitrary complex radiofrequency electromagnetic fields are respectively configured for transmission or reception of radiofrequency electromagnetic waves.

Figure 5:
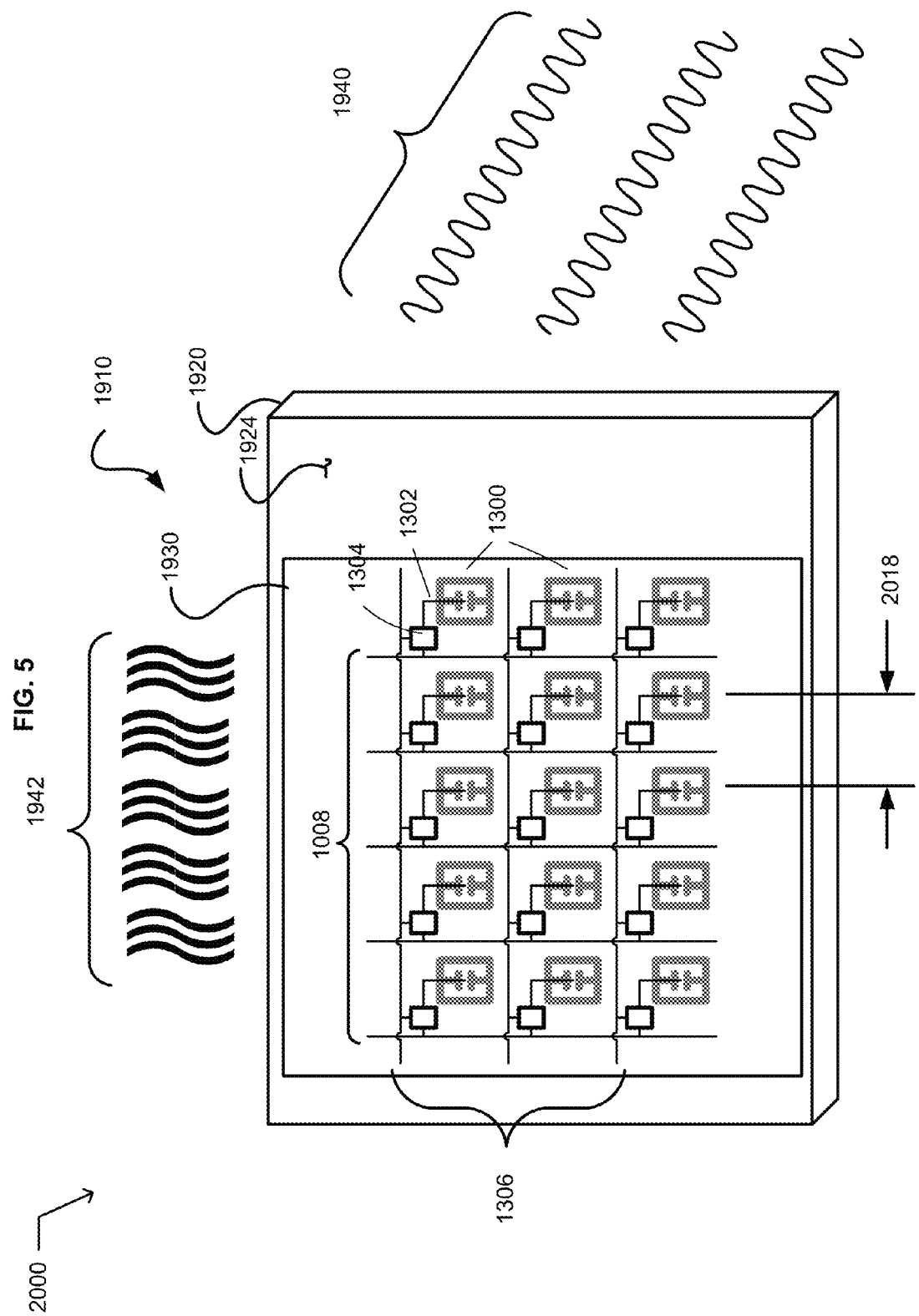
FIG. 5 illustrates an alternative embodiment 2000 of the antenna 1910.

FIG. 5 illustrates an alternative embodiment 2000 of the antenna 1910. In the alternative embodiment, the sub-Nyquist holographic aperture 1930 includes a plurality of individual electromagnetic wave scattering elements 1300 distributed on or proximate to the surface 1924. Each scattering element is connected by a bias voltage line 1302 to a biasing circuit 1304 addressable by row inputs 1306 and column inputs 1308. Each electromagnetic wave scattering element has a respective electronically controllable or activatable electromagnetic response to an incident radiofrequency electromagnetic wave, such as the incident radiofrequency electromagnetic wave 1940. The plurality of individual electromagnetic wave scattering elements are electronically controllable in combination to define the at least two selectable, arbitrary complex radiofrequency electromagnetic fields on the surface 1924. Additional description of the plurality of the individual electromagnetic wave scattering elements 1300 is provided in U.S. patent application Ser. No. 13/317,388, entitled SURFACE SCATTERING ANTENNAS, naming NATHAN KUNDTZ ET AL. as inventors, filed Oct. 15, 2010, including the technologies described in conjunction with FIG. 13 therein.

In an embodiment, the antenna 1910 includes an electromagnetic waveguide structure. The plurality of individual electromagnetic wave scattering elements 1300 are distributed along the waveguide structure with an inter-element spacing substantially less than a free-space wavelength of a highest operating frequency of the antenna. Each electromagnetic wave scattering element has a respective activatable electromagnetic response to a guided wave propagating in the waveguide structure, such as the incident radiofrequency electromagnetic wave 1940. The plurality of electromagnetic wave scattering elements operable in combination to define the at least two selectable, arbitrary complex radiofrequency electromagnetic fields on the surface.

In an embodiment of the antenna 1910, the plurality of individual electromagnetic wave scattering elements 1300 are periodically distributed on the surface 1924. In an embodiment, the plurality of individual electromagnetic wave scattering elements includes a plurality of identical electromagnetic scattering elements. In an embodiment, the plurality of individual electromagnetic wave scattering elements includes a plurality of adjustable electromagnetic scattering elements. In an embodiment, the adjustable electromagnetic scattering elements are continuously adjustable. In an embodiment, the adjustable electromagnetic response are discretely adjustable. In an embodiment, the plurality of individual electromagnetic wave scattering elements includes a plurality of metamaterial electromagnetic wave scattering elements. In an embodiment, the plurality of individual electromagnetic wave scattering elements include a plurality of individual complementary metamaterial elements having at least two magnetic dipole responses to incident radiofrequency electromagnetic waves. In an embodiment, the plurality of individual complementary metamaterial electromagnetic wave scattering elements includes a plurality of individual complementary electric LC metamaterial elements. In an embodiment, the plurality of individual electromagnetic wave scattering elements have a transmissibility controllable by an electronically controllable layer of liquid crystal respectively disposed on each of the plurality of individual electromagnetic wave scattering elements. In an embodiment, the plurality of individual electromagnetic wave scattering elements are embedded within, located on, or located within an evanescent proximity of the surface. In an embodiment, the plurality of individual electromagnetic wave scattering elements is configured to receive an incident wave from a waveguide. In an embodiment, at least one the plurality of individual electromagnetic wave scattering elements is configured to receive an incident wave from a conductor.

In an embodiment, the plurality of individual electromagnetic wave scattering elements 1300 have an inter-element spacing 2018 less than one-half of a free-space wavelength corresponding to an operating frequency of the antenna 1910. In this embodiment, the plurality of individual electromagnetic wave scattering elements are spaced more closely than Nyquist sampling frequency. In an embodiment, the plurality of individual electromagnetic wave scattering elements have a periodic inter-element spacing less than one-third of a free-space wavelength corresponding to an operating frequency of the antenna. In this embodiment, the spacing of plurality of individual electromagnetic wave scattering elements may be described as deeply sub-wavelength. In an embodiment, the plurality of individual electromagnetic wave scattering elements have a periodic inter-element spacing less than one-quarter of a free-space wavelength corresponding to an operating frequency of the antenna.

In an embodiment, the sub-Nyquist holographic aperture 1930 includes a wave-propagating structure, and a plurality of subwavelength patch elements. The plurality of subwavelength patch elements are distributed along the wave-propagating structure and have inter-element spacing substantially less than a free-space wavelength of a highest operating frequency of the antenna. Each subwavelength patch element has a respective activatable electromagnetic response to a guided wave propagating in the wave-propagating structure. The plurality of subwavelength patch elements are operable in combination to define the at least two selectable, arbitrary complex radiofrequency electromagnetic fields on the surface 1924. Additional description and embodiments of the subwavelength patch elements is provided in U.S. patent application Ser. No. 13/317,388, entitled SURFACE SCATTERING ANTENNAS, naming NATHAN KUNDTZ et al. as inventors, filed Oct. 15, 2010, including the technologies described in conjunction with FIGS. 5-6 therein.

In an embodiment, the sub-Nyquist holographic aperture 1930 includes a first sub-Nyquist holographic aperture and a second sub-Nyquist holographic aperture. The first and second sub-Nyquist holographic apertures are configured in combination to define at least two selectable, arbitrary complex radiofrequency electromagnetic fields on the surface 1924.

Figure 6:
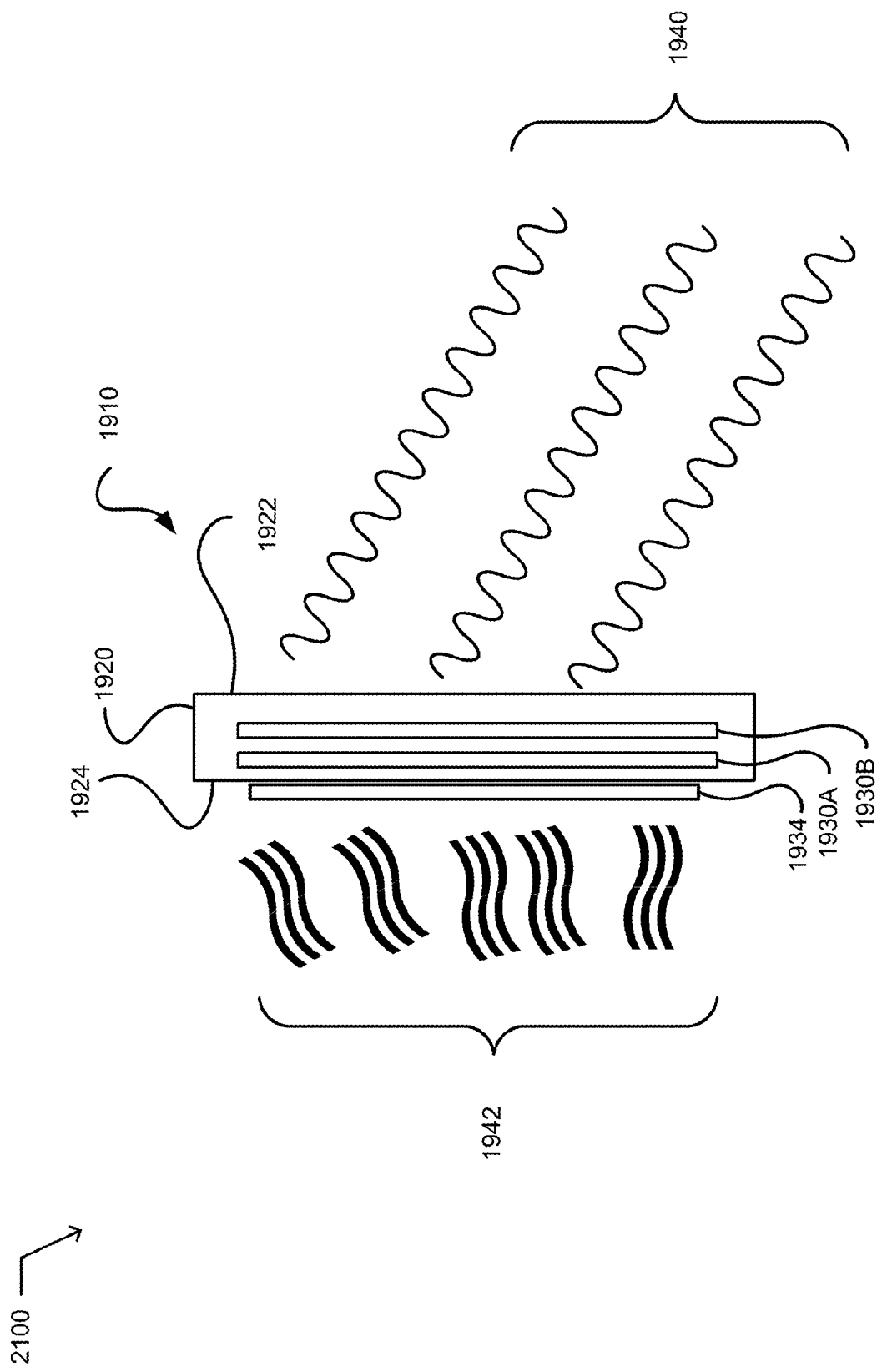
FIG. 6 illustrates an embodiment 2100 of the antenna 1910.

FIG. 6 illustrates an embodiment 2100 of the antenna 1910 wherein a first sub-Nyquist holographic aperture 1930A and a second sub-Nyquist holographic aperture 1930B are arranged in series to an incident radiofrequency electromagnetic wave, illustrated by the incident radiofrequency electromagnetic wave 1940. In an embodiment, the first sub-Nyquist holographic aperture 1910A is configured to control an amplitude of a radiofrequency electromagnetic wave radiated by the defined at least two selectable, arbitrary complex radiofrequency electromagnetic fields on the surface. The second sub-Nyquist holographic aperture 1910B is configured to control a phase of an electromagnetic wave radiated by the defined at least two selectable, arbitrary complex radiofrequency electromagnetic fields on the surface. In an embodiment, the first sub-Nyquist holographic aperture includes a plurality of individual electromagnetic wave scattering elements distributed on the surface, and the second sub-Nyquist holographic aperture includes a plurality of liquid crystal phase control elements distributed on the surface. For example, the plurality of individual electromagnetic wave scattering elements may include the plurality of individual electromagnetic wave scattering elements 1300 described in conjunction with FIG. 5. For example, a plurality of liquid crystal phase control elements may provide a variable refractive index biased by array of quasi-dc electrodes.

Returning to FIGS. 3 and 4, in an embodiment, the holographic aperture 1930 and the surface 1924 are configured to receive an incident radiofrequency electromagnetic wave 1942. In an embodiment, the incident radiofrequency electromagnetic waves include incident guided electromagnetic waves. In an embodiment, the incident radiofrequency electromagnetic waves include incident radiofrequency electromagnetic waves propagated or conveyed toward the holographic aperture by a waveguide. In an embodiment, the holographic aperture and the surface are configured to transmit a radiofrequency electromagnetic wave 1942 into a free space. The transmitted radiofrequency electromagnetic wave coherently reconstructed by the sub-Nyquist holographic aperture from a received incident wave and has a radiation pattern defined by a selected one of the at least two selectable, arbitrary complex radiofrequency electromagnetic fields.

In an embodiment, the reactive near-field region can be defined as the volume of free space consisting of all points located closer than one half-wavelength to the nearest point on the field-emitting aperture. In other words, this is the region where evanescent waves generated by elements spaced less than one-half wavelength apart may be significant. Evanescent waves necessarily become exponentially small beyond that distance. In an embodiment, the reactive near-field region can be defined as the volume of free space consisting of all points located closer than two wavelengths to the nearest point on the field-emitting aperture. In an alternative embodiment, the reactive near-field region can be defined as the volume of free space consisting of all points located closer than five wavelengths to the nearest point on the field-emitting aperture.

In an embodiment, a far-field radiation pattern is defined as the exterior of the sphere of radius $R\_Fr=2D^2/\text{lambda}$ (where D is the diameter of the aperture, centered at the centroid of the aperture. In an embodiment, in strongly scattering environments, such as indoor antennas, the diameter of the aperture D should be taken equal to the diameter of the room. Consequently, generally there are no far-field regions inside a room or office; it exists only outside of it. In such an environment inside the room, the space is divided between reactive and radiative near-field. In an embodiment, the far-field radiation pattern includes a lobe providing a high gain region optimized to transfer radiofrequency electromagnetic power. The term "diameter" for non-circular objects is understood as the largest dimension of the object; for a rectangle, the diameter is equal to its diagonal. In an embodiment, a radiative near-field is defined as all volume that is neither far-field nor reactive near-field.

In an embodiment, the sub-Nyquist holographic aperture 1930 is configured to define at least two selectable, arbitrary complex radiofrequency electromagnetic fields on the surface 1924. Each electromagnetic field respectively describes a far-field electromagnetic radiation pattern. In an embodiment, a far-field radiation pattern includes a Fraunhofer region radiation pattern. In an embodiment, each arbitrary complex radiofrequency electromagnetic field respectively produces a radiofrequency electromagnetic radiation pattern. In an embodiment, an antenna radiation pattern includes a representation of the angular distribution of the power density produced in the far-field region. In an embodiment, an antenna radiation pattern includes electromagnetic radiation or electromagnetic peaks in directions other than normal to the surface. In an embodiment, an antenna radiation pattern includes steerable beam. In an embodiment, an antenna radiation pattern includes near-field focusing. In an embodiment, each arbitrary complex radiofrequency electromagnetic field respectively produces a radiofrequency electromagnetic antenna transmission pattern. In an embodiment, each arbitrary complex radiofrequency electromagnetic field respectively produces a radiofrequency electromagnetic antenna reception pattern. In an embodiment, the each arbitrary complex radiofrequency electromagnetic field respectively describes a high gain region configured to transfer electromagnetic power to a target device. In an embodiment, each arbitrary complex radiofrequency electromagnetic field respectively describes a far-field radiation pattern having a lobe providing a high radiofrequency electromagnetic radiation pattern configured to transfer electromagnetic power to a target device in the far-field region. In an embodiment, the radiofrequency electromagnetic radiation pattern is configured to transfer electromagnetic power having a maximum density to a target device in the far-field region. In an embodiment, the radiofrequency electromagnetic radiation pattern is configured to transfer electromagnetic power to the target device in the far-field region with a maximum efficiency. In an embodiment, the radiofrequency electromagnetic radiation pattern is optimized to transfer electromagnetic power having a maximum density to the target device in the far-field region while subject to a constraint minimizing or limiting a transfer of electromagnetic radiation power transferred to another portion of the far-field region. In an embodiment, the radiofrequency electromagnetic radiation pattern is optimized to transfer electromagnetic power to the target device in the far-field region, the optimization responsive to a set of configurable rules. In an embodiment, the set of configurable rules is responsive to criteria to minimize or limit a transfer of electromagnetic radiation power transferred to another far-field region. In an embodiment, the radiofrequency electromagnetic radiation pattern is optimized to transfer electromagnetic power to the target device in the far-field region. The optimization is responsive to a comparison of electromagnetic radiation power transferred to the target device against electromagnetic radiation power transferred to another region where electromagnetic radiation power is subjected to limit or constraint.

In an embodiment, the holographic aperture 1930 includes a sub-Nyquist holographic aperture configured to define at least two selectable, arbitrary complex radiofrequency electromagnetic fields on the surface 1924. Each electromagnetic field of the at least two radiofrequency electromagnetic fields respectively describes a radiative near-field electromagnetic radiation pattern. In an embodiment, each arbitrary complex radiofrequency electromagnetic field respectively describes a radiofrequency electromagnetic radiation pattern configured to transfer electromagnetic power to a target device. In an embodiment, each arbitrary complex radiofrequency electromagnetic field respectively describes a quasi-Gaussian electromagnetic beam having a radiative near-field distribution configured to transfer electromagnetic power to a target device in the radiative near-field. In an embodiment, each arbitrary complex radiofrequency electromagnetic field respectively describes a radiofrequency electromagnetic radiation pattern configured to transfer electromagnetic power to a target device by a localization of the electromagnetic field to the target device. For example, each arbitrary complex radiofrequency electromagnetic field may respectively describe a radiofrequency electromagnetic radiation pattern configured to transfer electromagnetic power to a target device by transverse localization of the electromagnetic field to an antenna aperture of the target device.

In an embodiment, the holographic aperture 1930 includes a sub-Nyquist holographic aperture configured to define at least two selectable, arbitrary complex radiofrequency electromagnetic fields on the surface 1924. Each electromagnetic field of the at least two radiofrequency electromagnetic fields respectively describes a reactive near-field electromagnetic radiation pattern. The reactive near-field electromagnetic radiation pattern may be a two or a three dimensional radiation pattern. In an embodiment, each arbitrary complex radiofrequency electromagnetic field respectively describes a radiofrequency electromagnetic radiation pattern transversely localized to transfer electromagnetic power to a target device. For example, a dimension of the holographic aperture may be tailored and positioned to coincide with a dimensions or a location of a target device. In an embodiment, each arbitrary complex radiofrequency electromagnetic field describes a reactive near-field electromagnetic radiation pattern generally defined at the surface and configured to electromagnetically couple with a target device located within one-half of the wavelength of the surface. In an embodiment, each arbitrary complex radiofrequency electromagnetic field respectively describing a reactive near-field sub-wavelength electromagnetic field pattern having a predominantly magneto-inductive nature. For example, magneto-inductive power transfer includes a transfer of power generated by a metamaterial aperture operating near the frequency of magnetic dipole resonances for the majority of the unit cells. In an embodiment, each arbitrary complex radiofrequency electromagnetic field includes tangential wavenumbers beyond the free-space wavenumber ($k_0$). In an embodiment, each arbitrary complex radiofrequency electromagnetic field respectively describing a reactive near-field sub-wavelength electromagnetic field pattern optimized to transfer electromagnetic power to a target device present in the reactive near-field. In an embodiment, the holographic aperture includes a sub-Nyquist vector holographic aperture configured to define at least two selectable, arbitrary complex radiofrequency electromagnetic fields on the surface.

In an embodiment, the holographic aperture 1930 includes at least two independently operable sub-Nyquist holographic apertures. Each sub-Nyquist holographic aperture is respectively configured to define the at least two selectable, arbitrary complex radiofrequency electromagnetic fields on a portion of the surface 1924. In an embodiment, the antenna 1910 includes a radiofrequency beamforming sub-Nyquist holographic aperture configured to define at least two selectable, arbitrary complex radiofrequency electromagnetic fields on the surface. In an embodiment, the at least two independently operable sub-Nyquist holographic apertures are interlaced. In an embodiment, the at least two independently operable sub-Nyquist holographic apertures are dynamically reconfigurable areas of holographic aperture.

FIG. 7 illustrates an example operational flow 2200. After a start operation, the operational flow includes an antenna gain operation 2210. The antenna gain operation includes defining a selected arbitrary complex radiofrequency electromagnetic field on a surface, the selected arbitrary complex radiofrequency electromagnetic field having tangential wavenumbers up to the free-space wavenumber ($k_0$). The arbitrary complex radiofrequency electromagnetic field is selected from at least two selectable, arbitrary complex radiofrequency electromagnetic fields. In an embodiment, the antenna gain operation may be implemented using the sub-Nyquist holographic aperture 1930 described in conjunction with FIGS. 3-4. A reception operation 2220 includes receiving incident radiofrequency electromagnetic waves. In an embodiment, the reception operation may be implemented using the first surface 1922 of the antenna 1910 to receive the incident radiofrequency electromagnetic wave 1940 as described in conjunction with FIGS. 3-4. A transmission operation 2230 includes radiating radiofrequency electromagnetic waves coherently reconstructed from the incident radiofrequency electromagnetic waves by the selected arbitrary complex radiofrequency electromagnetic field defined on the surface. In an embodiment, the transmission operation may be implemented using second surface 1924 of the antenna to transmit the radiofrequency electromagnetic wave 1942 as described in conjunction with FIGS. 3-4. The operational flow includes an end operation.

In an embodiment, the antenna gain operation 2210 includes defining a selected arbitrary complex radiofrequency electromagnetic field on the surface using a sub-Nyquist holographic aperture. The sub-Nyquist holographic aperture is configured to define at least two selectable, arbitrary complex radiofrequency electromagnetic fields on the surface. In an embodiment, the sub-Nyquist holographic aperture includes a metamaterial sub-Nyquist holographic aperture.

In an embodiment, the reception operation 2220 includes receiving incident radiofrequency electromagnetic waves on the surface. In an embodiment, the transmission operation 2230 includes radiating the coherently reconstructed electromagnetic waves from the surface. In an embodiment, the incident radiofrequency electromagnetic waves include encoded incident radiofrequency electromagnetic waves.

For example, the incident radiofrequency electromagnetic wave may be encoded by modulation, time division, frequency division, multiplexing, time division multiple access, or code division multiple access.

In an embodiment, the operational flow 2200 further includes selecting the arbitrary complex radiofrequency electromagnetic field from at least two selectable, arbitrary complex radiofrequency electromagnetic fields with tangential wavenumbers up to the free-space wavenumber ($k_0$). In an embodiment, the operational flow includes selecting the arbitrary complex radiofrequency electromagnetic field in response to a location of a particular field of view. In an embodiment, the operational flow includes selecting the arbitrary complex radiofrequency electromagnetic field in response to a location of an undesired field of view. In an embodiment, each arbitrary complex radiofrequency electromagnetic field respectively describes a desired far-field radiofrequency electromagnetic radiation pattern. In an embodiment, each arbitrary complex radiofrequency electromagnetic field respectively describes a radiative near-field electromagnetic radiation pattern. In an embodiment, each arbitrary complex radiofrequency electromagnetic field respectively describes a reactive near-field radiofrequency electromagnetic radiation pattern.

In an embodiment, the incident radiofrequency electromagnetic waves include encoded incident radiofrequency electromagnetic waves. In an embodiment, the incident radiofrequency electromagnetic waves include incident free space propagating radiofrequency electromagnetic waves. In an embodiment, the incident radiofrequency electromagnetic waves include incident waveguide-propagated radiofrequency electromagnetic waves. In an embodiment, the incident radiofrequency electromagnetic waves include incident conductor-propagated radiofrequency electromagnetic waves. In an embodiment, the incident radiofrequency electromagnetic waves include non-normal incident radiofrequency electromagnetic waves. In an embodiment, the radiated electromagnetic waves include free space propagating radiofrequency electromagnetic waves. In an embodiment, the radiated electromagnetic waves include waveguide-propagated radiofrequency electromagnetic waves. In an embodiment, the radiated radiofrequency electromagnetic waves include conductor-propagated radiofrequency electromagnetic waves.

In an embodiment, the operational flow 2200 includes defining another selected arbitrary complex radiofrequency electromagnetic field on the surface. The other arbitrary complex radiofrequency electromagnetic field is selected from the at least two selectable, arbitrary complex radiofrequency electromagnetic fields. This embodiment also includes radiating additional radiofrequency electromagnetic waves coherently reconstructed from the incident radiofrequency electromagnetic waves by the other selected arbitrary complex radiofrequency electromagnetic field defined on the surface.

FIG. 8 illustrates an example apparatus 2300. The apparatus includes means 2310 for selecting an arbitrary complex radiofrequency electromagnetic field from the at least two selectable, arbitrary complex radiofrequency electromagnetic fields having tangential wavenumbers up to the free-space wavenumber ($k_0$). The apparatus includes means 2320 for defining the selected arbitrary complex radiofrequency electromagnetic field on a surface of an antenna. The apparatus includes means 2330 for receiving incident radiofrequency electromagnetic waves. The apparatus includes means 2340 for radiating radiofrequency electromagnetic waves coherently reconstructed from the incident radiofrequency electromagnetic waves by the selected arbitrary complex radiofrequency electromagnetic field defined on the surface.

Figure 9:
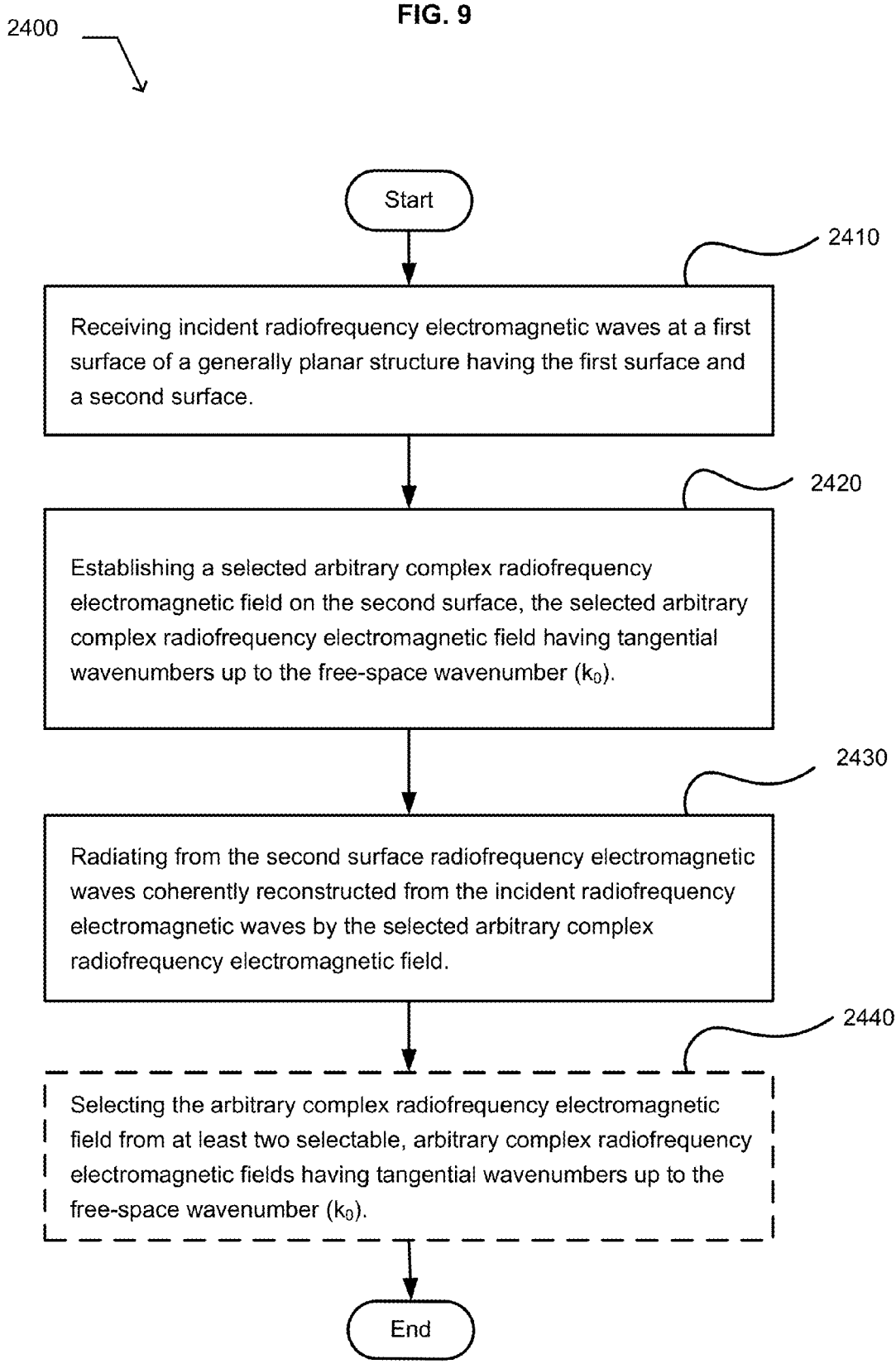
FIG. 9 illustrates an example operational flow 2400.

FIG. 9 illustrates an example operational flow 2400. After a start operation, the example operational flow includes a reception operation 2410. The reception operation includes receiving incident radiofrequency electromagnetic waves at a first surface of a generally planar structure that includes the first surface and a second surface. In an embodiment, the reception operation may be implemented using the first surface 1922 of the antenna 1910 to receive the incident radiofrequency electromagnetic wave 1940 as described in conjunction with FIG. 4. An antenna gain operation 2420 includes defining a selected arbitrary complex radiofrequency electromagnetic field on the second surface. The selected arbitrary complex radiofrequency electromagnetic field having tangential wavenumbers up to the free-space wavenumber ($k_0$). In an embodiment, the antenna gain operation may be implemented using the sub-Nyquist holographic aperture 1930 and the second surface 1934 described in conjunction with FIG. 4. A transmission operation 2430 includes radiating from the second surface radiofrequency electromagnetic waves coherently reconstructed from the incident radiofrequency electromagnetic waves by the selected arbitrary complex radiofrequency electromagnetic field. In an embodiment, the transmission operation may be implemented using second surface 1924 of the antenna to transmit the radiofrequency electromagnetic wave 1942. The operational flow includes an end operation.

In an embodiment of the antenna gain operation 2420, the defining includes defining the selected arbitrary complex radiofrequency electromagnetic field on the second surface using a sub-Nyquist holographic aperture. In an embodiment, the sub-Nyquist holographic aperture includes a metamaterial sub-Nyquist holographic aperture. In an alternative embodiment, the operational flow further includes selecting the arbitrary complex radiofrequency electromagnetic field from the at least two selectable, arbitrary complex radiofrequency electromagnetic fields having tangential wavenumbers up to the free-space wavenumber ($k_0$).

FIG. 10 illustrates an example apparatus 2500. The apparatus includes means 2510 for receiving incident radiofrequency electromagnetic waves at a first surface of a generally planar structure having the first surface and a second surface. The apparatus includes means 2520 for defining a selected arbitrary complex radiofrequency electromagnetic field on the second surface. The selected arbitrary complex radiofrequency electromagnetic field having tangential wavenumbers up to the free-space wavenumber ($k_0$). The apparatus includes means 2530 for radiating radiofrequency electromagnetic waves coherently reconstructed from the incident radiofrequency electromagnetic waves by the selected arbitrary complex radiofrequency electromagnetic field defined on the second surface. In an embodiment, the apparatus includes means for selecting the arbitrary complex radiofrequency electromagnetic field from the at least two selectable, arbitrary complex radiofrequency electromagnetic fields having tangential wavenumbers up to the free-space wavenumber ($k_0$).

Figure 11:
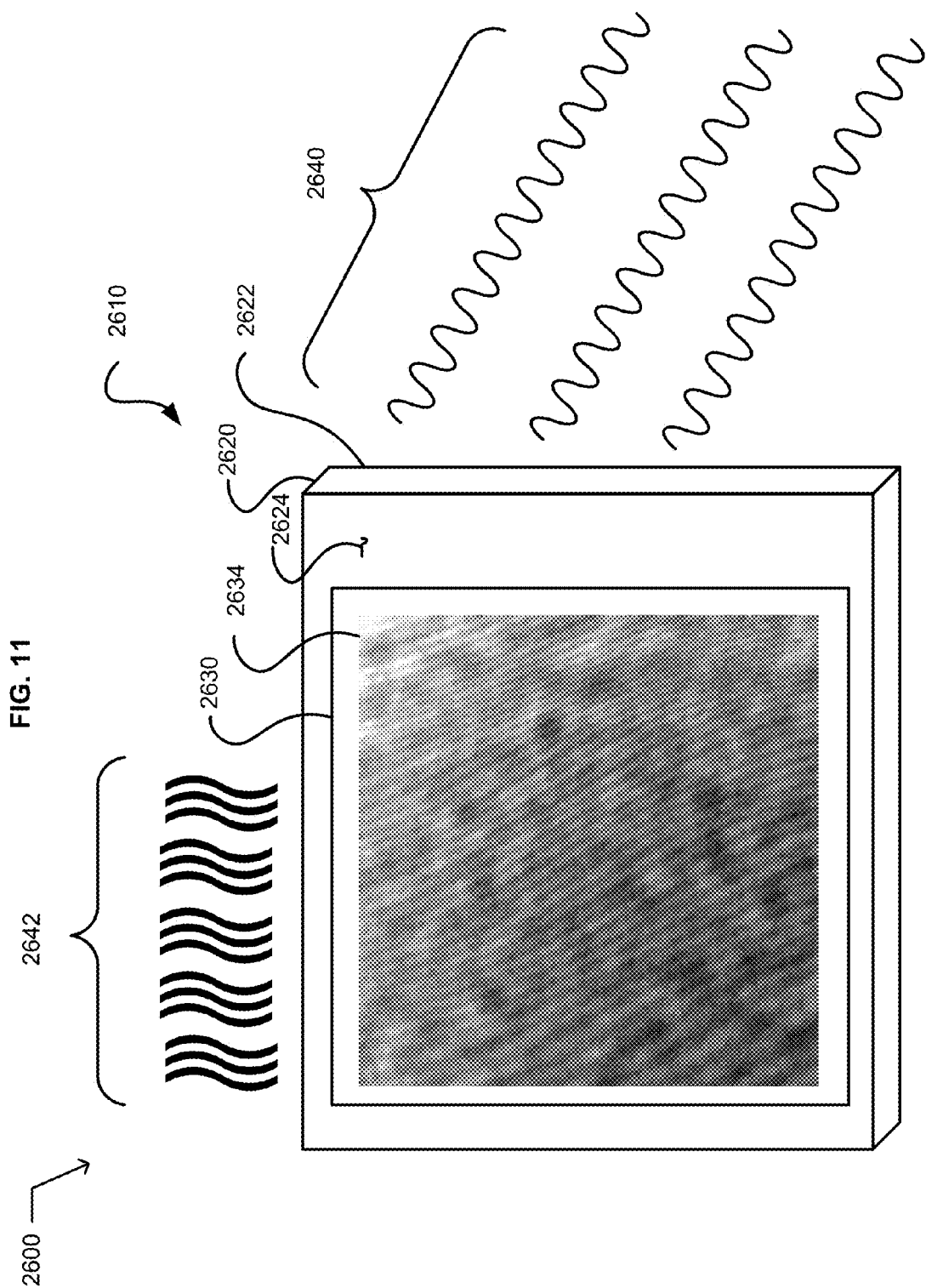
FIG. 11 illustrates an example environment 2600 that includes an antenna 2610.

FIG. 11 illustrates an example environment 2600 that includes an antenna 2610. The antenna includes a sub-Nyquist complex-holographic aperture 2630 configured to define at least two selectable, arbitrary complex radiofrequency electromagnetic fields with tangential wavenumbers up to $2\pi$ over the aperture element spacing (k_apt=$2\pi/a$) on a surface 2624. For example, see an illustration of an aperture element spacing 2718 described in conjunction with FIG. 12 infra. The sub-Nyquist complex-holographic aperture 2630 address both cases where the antenna aperture D>>lambda and where D<<lambda. When D>>lambda, reactive and radiative near-field are controlled. When D<<lambda, field profiles in the reactive near-field are controlled, which provides evanescent wave control and evanescent waves optimized for reactive near-field.

In an embodiment, the sub-Nyquist complex-holographic aperture 2600 includes a sub-Nyquist transmission complex-holographic aperture. In an embodiment, the sub-Nyquist complex-holographic aperture includes a sub-Nyquist reflective complex-holographic aperture. In an embodiment, the sub-Nyquist complex-holographic aperture includes a sub-Nyquist amplitude and phase modulation holographic aperture.

Figure 12:
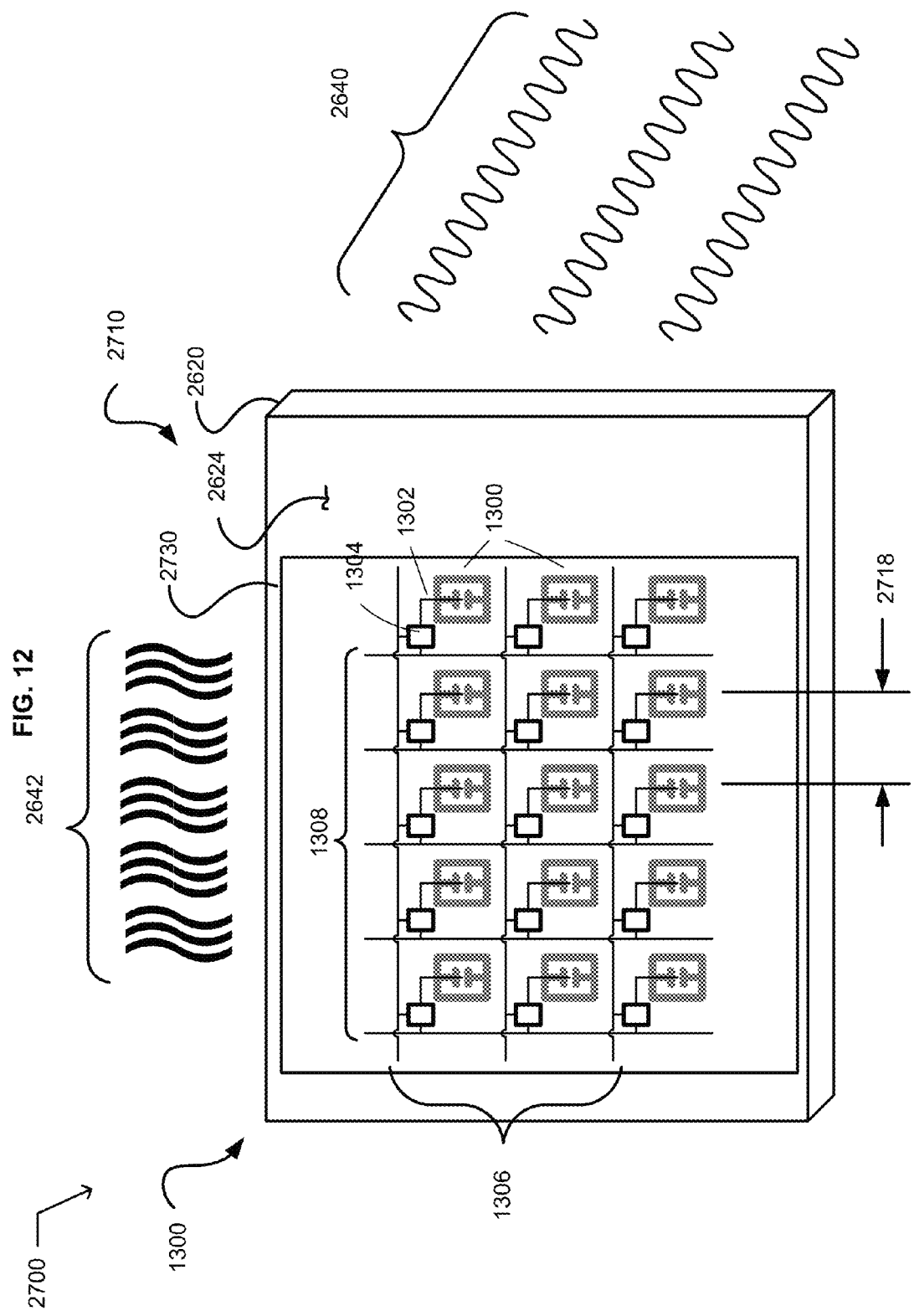
FIG. 12 illustrates an alternative embodiment of the environment 2700 that includes an antenna 2710.

FIG. 12 illustrates an alternative embodiment of the environment 2700 that includes an antenna 2710. The sub-Nyquist complex-holographic aperture 2730 includes the plurality of individual electromagnetic wave scattering elements 1300 distributed on the surface 2624. An example of the plurality of individual electromagnetic wave scattering elements is described in conjunction with FIG. 5, including where each scattering element is connected by a bias voltage line 1302 to a biasing circuit 1304 addressable by row inputs 1306 and column inputs 1308. Each electromagnetic wave scattering element has a respective electronically controllable electromagnetic response to an incident radiofrequency electromagnetic wave 2640. The plurality of individual electromagnetic wave scattering elements are electronically controllable in combination to define the at least two selectable, arbitrary complex radiofrequency electromagnetic fields on the surface.

The plurality of individual electromagnetic wave scattering elements 1300 are illustrated as each having an aperture spacing "a," illustrated as inter-element spacing 2718. In an embodiment, the aperture spacing is a center-to-center spacing distance between at least two individual electromagnetic scattering elements of the plurality of individual electromagnetic wave scattering elements. In this alternative embodiment, the wavenumber is the inverse of the aperture spacing (k_apt=2π/a).

In an embodiment, the antenna 2710 includes at least two electromagnetic wave conducting structures respectively coupled to at least two individual electromagnetic wave scattering elements of the plurality of individual electromagnetic wave scattering elements 1300. In an embodiment, the incident radiofrequency electromagnetic waves 2640 include incident wave guide-propagated electromagnetic waves. In an embodiment, the incident radiofrequency electromagnetic waves include incident conductor-propagated electromagnetic waves.

In an embodiment, the surface includes a second surface 2624 of a generally planar structure 2620. The planar structure including a first surface 2622 configured to receive incident radiofrequency electromagnetic waves 2640. The sub-Nyquist holographic aperture 2630 is configured to coherently reconstruct the incident radiofrequency electromagnetic waves responsive to a definition on the second surface of a selected one 2364 (see FIG. 11) of the at least two selectable, arbitrary complex radiofrequency electromagnetic fields. The second surface is configured to transmit the coherent reconstruction 2642 of the incident radiofrequency electromagnetic waves. In an embodiment, the incident radiofrequency electromagnetic waves 2640 include radiofrequency electromagnetic waves leaking from a planar waveguide. In an embodiment, the radiated electromagnetic waves includes free space propagating electromagnetic waves. In an embodiment, the transmitted coherent reconstruction 2642 of the incident radiofrequency electromagnetic waves includes free space propagating radiofrequency electromagnetic waves. In an embodiment, the transmitted coherent reconstruction of the incident radiofrequency electromagnetic waves includes waveguide-propagating radiofrequency electromagnetic waves. In an embodiment, the transmitted coherent reconstruction of the incident radiofrequency electromagnetic waves includes conductor-propagating radiofrequency electromagnetic waves.

Returning to FIG. 11, in an embodiment, the generally planar surface 2624 includes a generally planar curved surface. In an embodiment, the generally planar surface includes a generally planar structure having a first surface and second surface spaced apart from and generally parallel to the first surface.

In an embodiment, the sub-Nyquist complex-holographic aperture 2630 includes a plurality of individual electromagnetic wave scattering elements distributed on the surface 2624. Each electromagnetic wave scattering element has a respective electronically controllable electromagnetic response to an incident radiofrequency electromagnetic wave 2640. The plurality of individual electromagnetic wave scattering elements are electronically controllable in combination to define the at least two selectable, arbitrary complex radiofrequency electromagnetic fields on the surface. In an embodiment, the plurality of individual electromagnetic wave scattering elements are embedded within, located on, or located within an evanescent proximity of the surface 2624.

In an embodiment, the sub-Nyquist complex-holographic aperture 2630 includes a first sub-Nyquist complex-holographic aperture and a second sub-Nyquist complex-holographic aperture. The first and second sub-Nyquist complex holographic apertures are configured in combination to define at least two selectable, arbitrary complex radiofrequency electromagnetic fields on the surface 2624 with tangential wavenumbers up to 2π over the aperture element spacing (k_apt=2π/a). In an embodiment, the first sub-Nyquist complex-holographic aperture and the second sub-Nyquist complex-holographic aperture are configured to be encountered in series by incident radiofrequency electromagnetic waves 2640. For example, see FIG. 6. In an embodiment, the first sub-Nyquist complex-holographic is further configured to control an amplitude of electromagnetic waves 2642 radiated in response to an arbitrary complex radiofrequency electromagnetic field defined on the surface. The second sub-Nyquist complex-holographic aperture is further configured to control a phase of electromagnetic radiofrequency waves radiated in response to an arbitrary complex radiofrequency electromagnetic fields defined on the surface. In an embodiment, the first sub-Nyquist complex-holographic is includes a plurality of individual electromagnetic wave scattering elements distributed on the surface. The second sub-Nyquist complex-holographic aperture includes a plurality of liquid crystal phase control elements distributed on the surface.

In an embodiment, each electromagnetic field respectively describes a near-field radiative electromagnetic radiation pattern. In an embodiment, each near-field radiative radiofrequency electromagnetic radiation pattern is respectively configured to transmit radiofrequency electromagnetic power to a target device. In an embodiment, each near-field radiative radiofrequency electromagnetic radiation pattern respectively describes a quasi-Gaussian electromagnetic beam having a radiative near-field distribution configured to transmit radiofrequency electromagnetic power to a target device. In an embodiment, each radiofrequency electromagnetic field describes a near-field reactive radiofrequency electromagnetic radiation pattern. In an embodiment, each near-field reactive radiofrequency electromagnetic radiation pattern respectively describes a reactive near-field sub-wavelength radiofrequency electromagnetic field pattern having a predominantly magneto-inductive nature. In an embodiment, each near-field reactive radiofrequency electromagnetic radiation pattern is respectively configured to transfer radiofrequency electromagnetic power to a target device.

In an embodiment, the sub-Nyquist complex-holographic aperture 2630 and the surface 2624 are configured to transmit electromagnetic waves 2642 into free space. The transmitted electromagnetic waves are coherently reconstructed by the sub-Nyquist complex-holographic aperture from the received incident waves 2640 and have a radiation pattern defined by the selected one 2634 of the at least two selectable, arbitrary complex radiofrequency electromagnetic fields.

Figure 13:
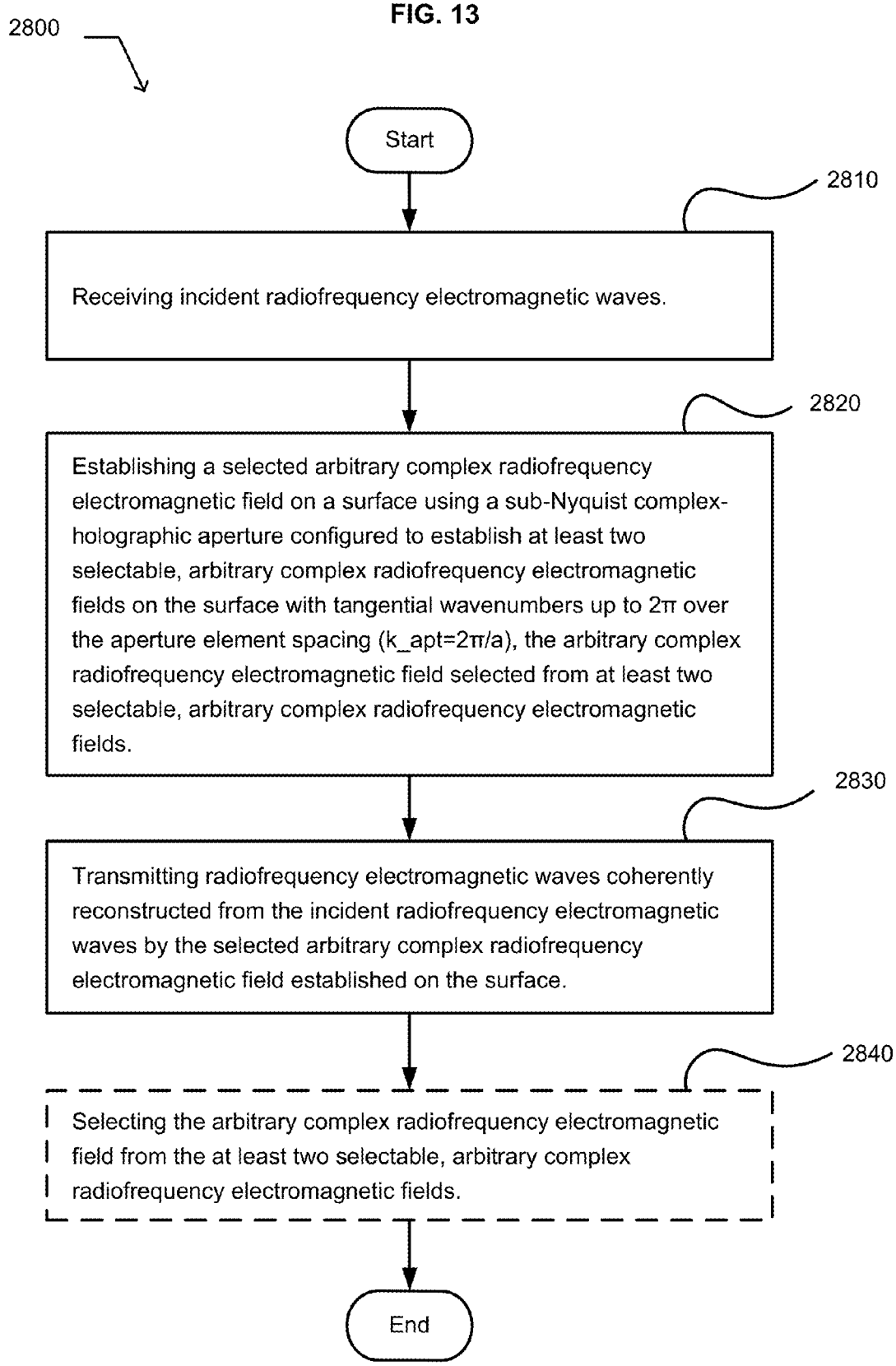
FIG. 13 illustrates an example operational flow 2800.

FIG. 13 illustrates an example operational flow 2800. After a start operation, the operational flow includes a reception operation 2810. The reception operation includes receiving incident radiofrequency electromagnetic waves. In an embodiment, the reception operation may be implemented using the surface 2624 described in conjunction with FIG. 11, or the surface 1922 described in conjunction with FIG. 4. An antenna gain operation 2820 includes defining a selected arbitrary complex radiofrequency electromagnetic field on a surface using a sub-Nyquist complex-holographic aperture. The sub-Nyquist complex-holographic aperture is configured to define at least two selectable, arbitrary complex radiofrequency electromagnetic fields on the surface with tangential wavenumbers up to $2\pi$ over the aperture element spacing (k_apt=$2\pi$/a). The arbitrary complex radiofrequency electromagnetic field is selected from at least two selectable, arbitrary complex radiofrequency electromagnetic fields. In an embodiment, the antenna gain operation may be implemented using the sub-Nyquist holographic aperture 2630 described in conjunction with FIG. 11. A transmission operation 2830 includes transmitting a radiofrequency electromagnetic wave coherently reconstructed from the incident radiofrequency electromagnetic wave by the selected arbitrary complex radiofrequency electromagnetic field defined on the surface. In an embodiment, the transmission operation may be implemented using the second surface 2624 of the antenna 2610 to radiate the radiofrequency electromagnetic wave 2642 described in conjunction with FIG. 11. The operational flow includes an end operation.

In an embodiment, each radiofrequency electromagnetic field respectively describes a radiative near-field electromagnetic radiation pattern. In an embodiment, each radiofrequency electromagnetic field respectively describes a reactive near-field electromagnetic radiation pattern. In an embodiment, the sub-Nyquist complex-holographic aperture includes a metamaterial sub-Nyquist complex-holographic aperture.

In an embodiment, the operational flow 2800 further includes selecting 2840 the arbitrary complex radiofrequency electromagnetic field from the at least two selectable, arbitrary complex radiofrequency electromagnetic fields. In an embodiment, the operational flow further includes defining another selected arbitrary complex radiofrequency electromagnetic field on the surface using the sub-Nyquist complex-holographic aperture. The other arbitrary complex radiofrequency electromagnetic field is selected from the at least two selectable, arbitrary complex radiofrequency electromagnetic fields. In this embodiment, the operational flow also includes transmitting additional radiofrequency electromagnetic waves coherently reconstructed from the incident radiofrequency electromagnetic waves by the other selected arbitrary complex radiofrequency electromagnetic field defined on the surface.

Figure 14:
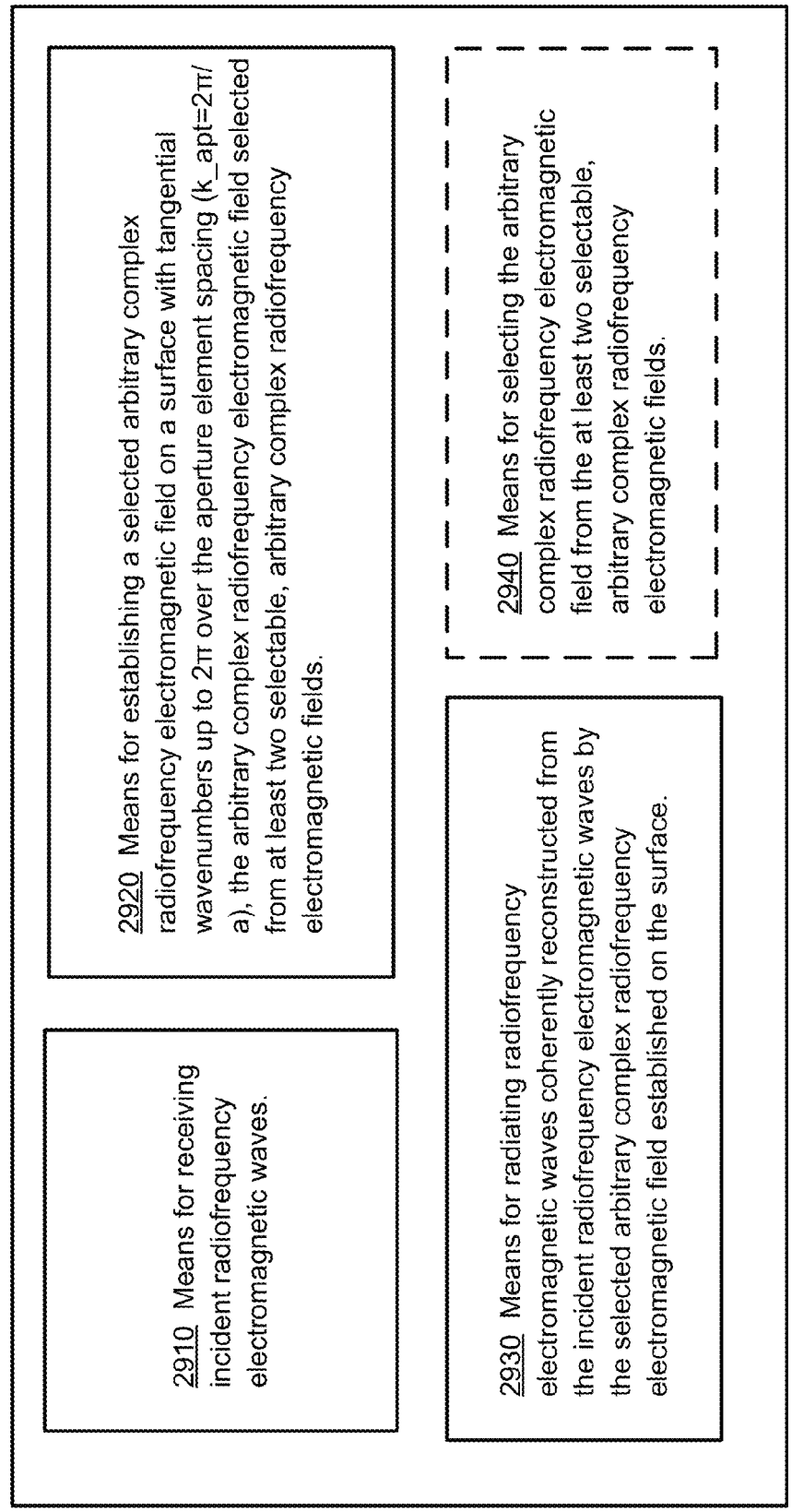
FIG. 14 illustrates an example apparatus 2900.

FIG. 14 illustrates an example apparatus 2900. The apparatus includes means 2910 for receiving incident radiofrequency electromagnetic waves. The apparatus includes means 2920 for defining a selected arbitrary complex radiofrequency electromagnetic field on a surface with tangential wavenumbers up to $2\pi$ over the aperture element spacing (k_apt=$2\pi$/a). The arbitrary complex radiofrequency electromagnetic field is selected from at least two selectable, arbitrary complex radiofrequency electromagnetic fields. The apparatus includes means 2930 for transmitting radiofrequency electromagnetic waves coherently reconstructed from the incident radiofrequency electromagnetic waves by the selected arbitrary complex radiofrequency electromagnetic field defined on the surface. In an embodiment, the apparatus includes means 2940 for selecting the arbitrary complex radiofrequency electromagnetic field from the at least two selectable, arbitrary complex radiofrequency electromagnetic fields.

Figure 15:
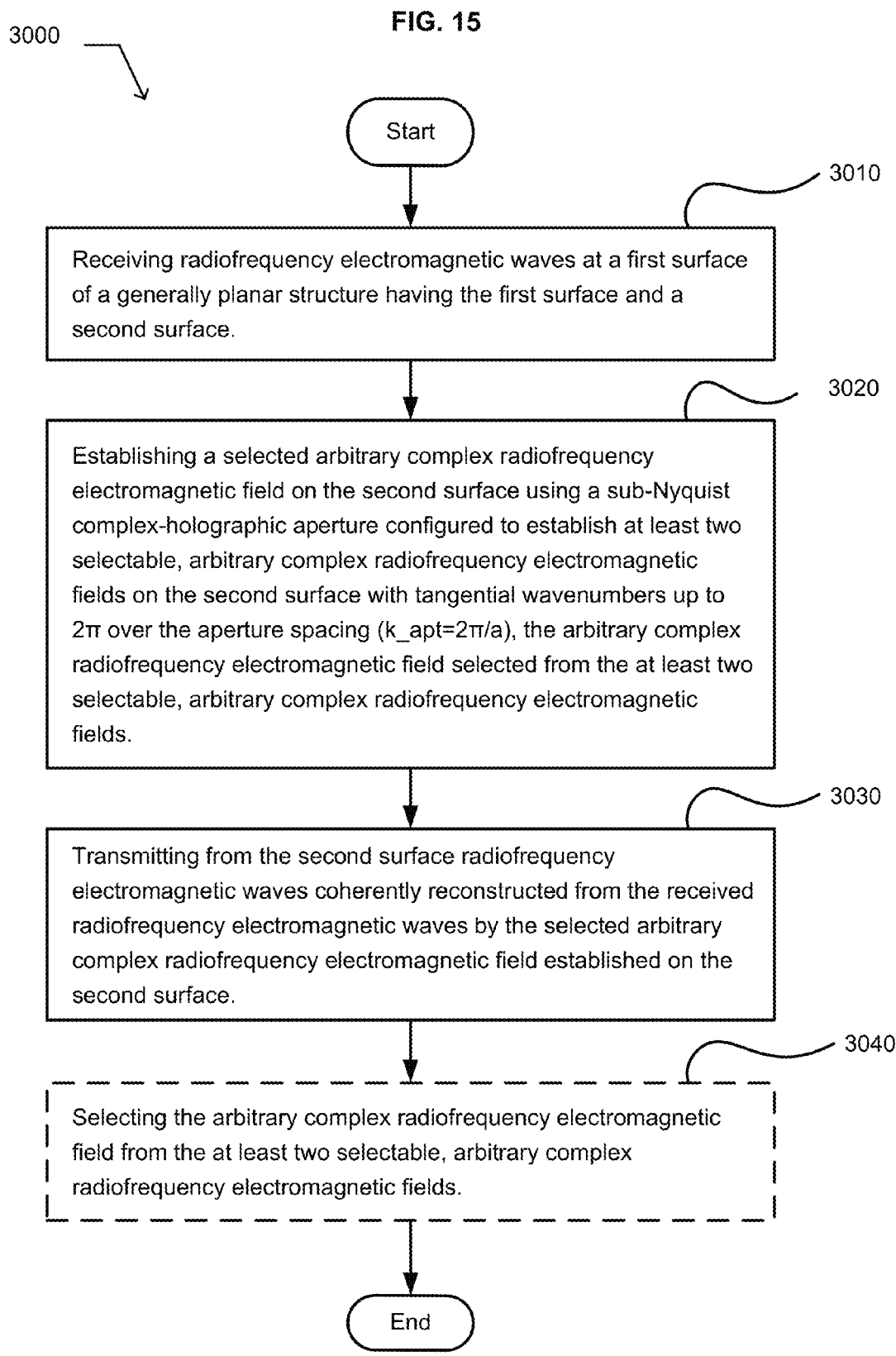
FIG. 15 includes an example operational flow 3000.

FIG. 15 includes an example operational flow 3000. After a start operation, the example operational flow includes a reception operation 3010. The reception operation includes receiving radiofrequency electromagnetic waves at a first surface of a generally planar structure having the first surface and a second surface. In an embodiment, the reception operation may be implemented using the first surface 2622 of the antenna 2610 to receive the incident radiofrequency electromagnetic wave 2640 as described in conjunction with FIG. 11. An antenna gain operation 3020 includes defining a selected arbitrary complex radiofrequency electromagnetic field on the second surface using a sub-Nyquist complex-holographic aperture. The sub-Nyquist complex-holographic aperture is configured to define at least two selectable, arbitrary complex radiofrequency electromagnetic fields on the second surface with tangential wavenumbers up to $2\pi$ over the aperture element spacing (k_apt=$2\pi$/a). The arbitrary complex radiofrequency electromagnetic field is selected from at least two selectable, arbitrary complex radiofrequency electromagnetic fields. In an embodiment, the antenna gain operation may be implemented using the sub-Nyquist holographic aperture 2630 and the second surface 2634 described in conjunction with FIG. 11. A transmission operation 3030 includes transmitting from the second surface radiofrequency electromagnetic waves coherently reconstructed from the received radiofrequency electromagnetic waves by the selected arbitrary complex radiofrequency electromagnetic field defined by the sub-Nyquist complex holographic aperture on the second surface. In an embodiment, the transmission operation may be implemented using second surface 2624 of the antenna 2610 to transmit the radiofrequency electromagnetic wave 2642. The operational flow includes an end operation.

In an embodiment, the operational flow 3000 further includes selecting 3040 the arbitrary complex radiofrequency electromagnetic field from the at least two selectable, arbitrary complex radiofrequency electromagnetic fields.

Figure 16:
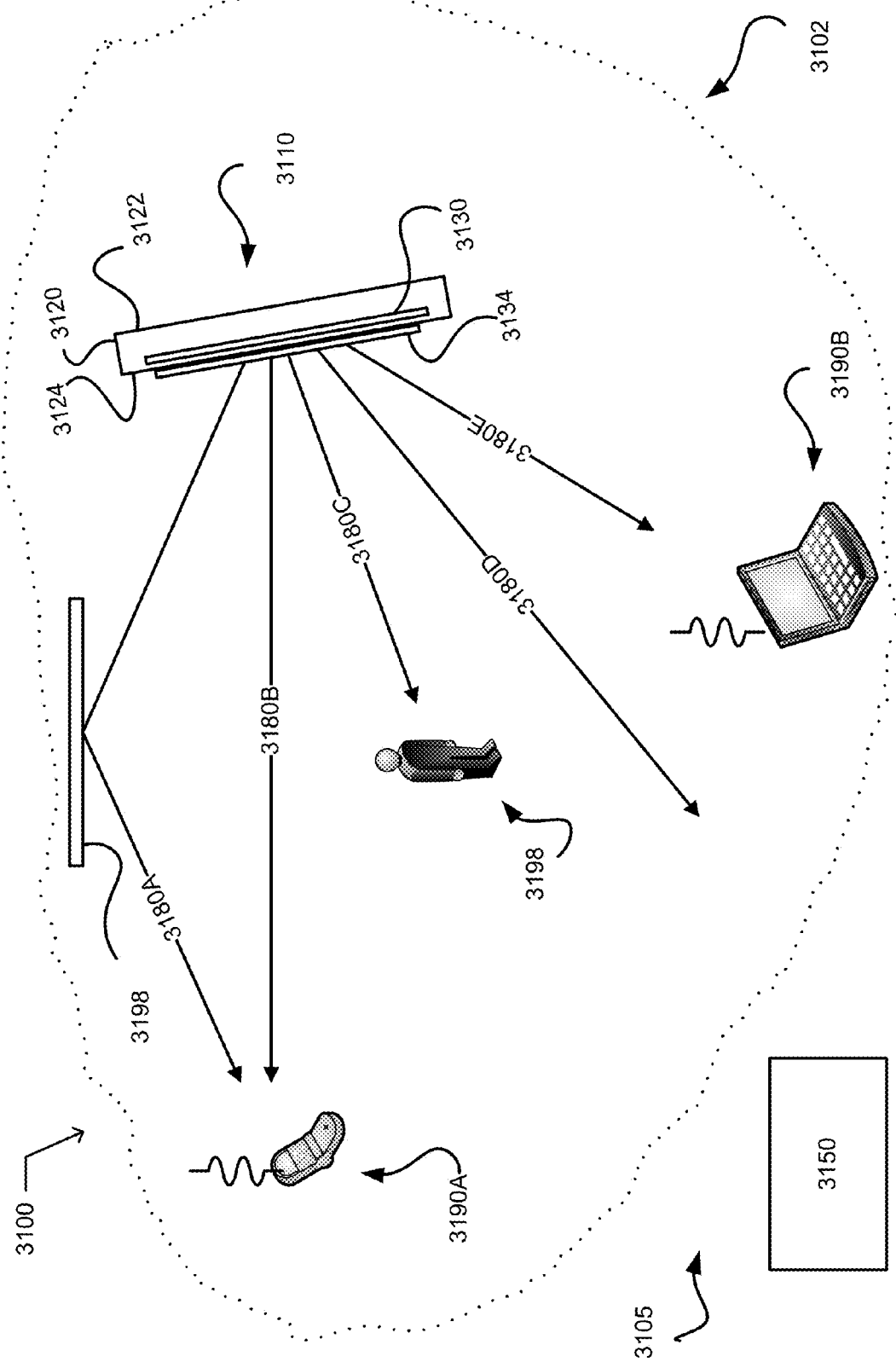
FIG. 16 illustrates certain aspects of an environment 3100, and a system 3105.
Figure 17:
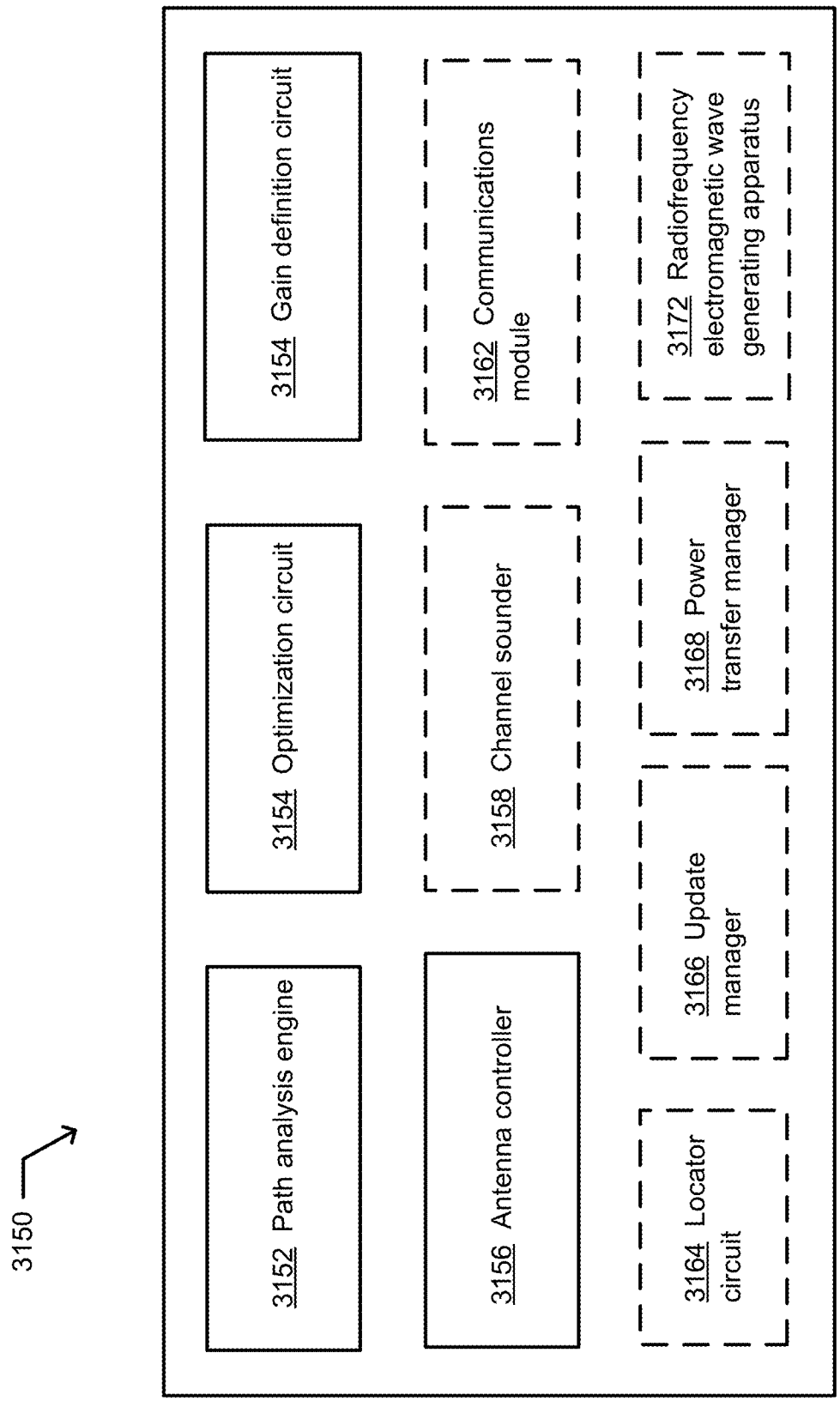
FIG. 17 illustrates an embodiment of the associated system apparatus 3150 described in conjunction with FIG. 16.

FIGS. 16 and 17 illustrate an embodiment. FIG. 16 illustrates certain aspects of an environment 3100, and a system 3105. The system includes an antenna 3110 and associated apparatus 3150. The environment includes at least one target device configured to receive wirelessly transferred radiofrequency electromagnetic waves or power. The at least one target device is illustrated by a mobile or handheld smart phone 3190A, and a laptop or tablet or similar device 3190B, and will generically referred to herein as the target device 3190. The environment includes a human being 3198. The environment includes a radiateable space 3102. For example, a radiateable space includes any space into which the antenna is capable of radiating radiofrequency electromagnetic waves. In an embodiment, the radiateable space may include any environment in which the target device and the human being have a presence. The radiateable space may include a bounded environment. For example and without limitation, in certain embodiments, the radiateable space may include a portion of a residential premises or the entire residential premises. The premises may be under control of one or more persons, such as an individual or a family. In other embodiments, the radiateable space may include a portion of a business premises, an entire business premises, or a public space. For example, a public space may include an airport, or sports stadium. The radiateable space includes at least two possible radiofrequency electromagnetic wave radiation or transmission pathways 3180. The at least two pathways are illustrated by pathways 3180A-3180E. Pathway 3180A includes a reflection off a surface 3196.

The antenna 3110 includes a sub-Nyquist holographic aperture 3130 configured to define at least two selectable, arbitrary complex radiofrequency electromagnetic fields on a surface of the antenna, illustrated as a second surface 3124, over an operating frequency. In an embodiment, the antenna includes a generally planar structure 3120 having a first surface 3122, the second surface 3124, and the sub-Nyquist holographic aperture.

FIG. 17 illustrates an embodiment of the associated apparatus 3150. The associated apparatus includes a path analysis engine 3152 configured to respectively test at least two power transmission pathways 3180, illustrated as the pathways 3180A-3180E, from the antenna 3110 to a target device 3190 located in the environment 3100 and within the radiateable space 3102 by the antenna 3110. The environment includes the human being 3198. In an embodiment, an engine, such as the path analysis engine, may include a circuit or apparatus that performs a fundamental function, and often a repetitive function, especially as part of a larger system or apparatus. In an embodiment, an engine may coordinate or operate other components or elements of a system or apparatus, such as the system 3105. In an embodiment, an engine may include one or more components interacting with other elements or devices in operation of a system or apparatus.

The associated apparatus 3150 includes an optimization circuit 3154 configured to select responsive to the tested at least two power transmission pathways a wireless power transmission regime. The wireless power transmission regime includes an electromagnetic radiation pattern shaped to wirelessly transfer radiofrequency electromagnetic power from the antenna to the target device without exceeding a radiofrequency electromagnetic wave radiation exposure limit for human beings. For example, compliance with the radiofrequency electromagnetic wave radiation exposure limit may be by avoiding or mostly avoiding the human being so that the limit is not exceeded at the human being 3198. For example, compliance with the radiofrequency electromagnetic wave radiation exposure limit may be met by not exceeding the limit anywhere in the radiateable space 3102. The system apparatus include a gain definition circuit 3154 configured to select a complex radiofrequency electromagnetic field implementing the selected wireless power transmission regime from the at least two selectable, arbitrary complex radiofrequency electromagnetic fields. The system apparatus include an antenna controller 3156 configured to define the selected arbitrary complex electromagnetic field 3134 in the sub-Nyquist holographic aperture 3130. In an embodiment, the sub-Nyquist holographic aperture and the surface are cooperatively structured so that radiofrequency electromagnetic waves incident upon the surface are coherently reconstructed by the selected arbitrary, complex radiofrequency electromagnetic field and transmitted to the target device by the aperture. In an embodiment, the sub-Nyquist holographic aperture and the surface are structured to cooperatively transmit electromagnetic waves into free space. The transmitted electromagnetic waves are coherently reconstructed by the sub-Nyquist holographic aperture from received incident waves and have a radiation pattern defined by the selected arbitrary complex radiofrequency electromagnetic field.

In an embodiment, the associated apparatus 3150 further includes a radiofrequency electromagnetic wave generating apparatus 3172 configured to generate and deliver radiofrequency electromagnetic waves to the surface 3124 of the antenna 3110. The frequency of the radiofrequency electromagnetic waves are within at least a portion of the operating frequency of the antenna.

In an embodiment, the sub-Nyquist holographic aperture 3130 is configured to define at least two selectable, arbitrary complex radiofrequency electromagnetic fields on a surface 3124 with tangential wavenumbers up to the free-space wavenumber ($k_0$). In an embodiment, the sub-Nyquist holographic aperture is configured to define at least two selectable, arbitrary complex radiofrequency electromagnetic fields on the surface 3124 with tangential wavenumbers up to $2\pi$ over the aperture spacing (k_apt=$2\pi/a$). In an embodiment, the sub-Nyquist holographic aperture includes an electronically reconfigurable sub-Nyquist holographic aperture configured to dynamically define at least two selectable, arbitrary complex radiofrequency electromagnetic fields on a surface over an operating frequency. In an embodiment, the sub-Nyquist holographic aperture is configured to define an amplitude of an electromagnetic wave transmitted by at least two selectable, arbitrary complex radiofrequency electromagnetic fields. In an embodiment, the sub-Nyquist holographic aperture is configured to define a phase of an electromagnetic wave transmitted by at least two selectable, arbitrary complex radiofrequency electromagnetic fields.

In an embodiment, the surface 3134 includes a second surface of a generally planar structure 3120 having a first surface 3122 configured to receive incident radiofrequency electromagnetic waves. The sub-Nyquist holographic aperture 3130 is configured to coherently reconstruct the incident radiofrequency electromagnetic waves responsive to a definition on the second surface of a selected 3134 arbitrary complex radiofrequency electromagnetic field. The second surface is configured to transmit the coherent reconstruction of the incident radiofrequency electromagnetic waves.

In an embodiment, the antenna 3110 includes at least two independently operable sub-Nyquist holographic apertures 3130. Each sub-Nyquist holographic aperture is respectively configured to define at least two selectable, arbitrary complex radiofrequency electromagnetic fields on a respective portion of the surface 3124 over an operating frequency. In an embodiment, a second sub-Nyquist holographic aperture of the at the at least two independently operable sub-Nyquist holographic apertures is configured to receive a signal from a target device on a frequency being transmitted on by a first sub-Nyquist holographic aperture of the at least two independently operable sub-Nyquist holographic apertures.

In an embodiment, the antenna 3110 includes at least two orthogonal sub-Nyquist holographic apertures 3130. Each sub-Nyquist holographic aperture respectively configured to define at least two selectable, arbitrary complex radiofrequency electromagnetic fields on a respective portion of the surface 3124 over an operating frequency. In an embodiment, each of the at least two orthogonal sub-Nyquist holographic apertures have a respective distinct input. In an embodiment, the at least two orthogonal sub-Nyquist holographic apertures have a respective distinct output.

In an embodiment, the sub-Nyquist holographic aperture 3130 and the associated apparatus 3150 are configured to (i) define at least two selectable, arbitrary complex radiofrequency electromagnetic fields on a surface 3124 over an operating frequency and (ii) operate in a single channel, full-duplex mode. In an embodiment, the sub-Nyquist holographic aperture 3130 includes a sub-Nyquist holographic aperture configured to define at least two selectable, arbitrary complex radiofrequency electromagnetic fields on the surface 3124. Each arbitrary complex radiofrequency electromagnetic field respectively describing a far-field electromagnetic radiation pattern over an operating frequency. In an embodiment, the sub-Nyquist holographic aperture includes a sub-Nyquist holographic aperture configured to define at least two selectable, arbitrary complex radiofrequency electromagnetic fields on the surface. Each arbitrary complex radiofrequency electromagnetic field respectively describing a near-field electromagnetic radiation pattern over an operating frequency. In an embodiment, the sub-Nyquist holographic aperture includes a sub-Nyquist holographic aperture configured to define at least two selectable, arbitrary complex radiofrequency electromagnetic fields on the surface. Each arbitrary complex radiofrequency electromagnetic field respectively describing a reactive near-field electromagnetic radiation pattern over an operating frequency.

In an embodiment, the path analysis engine 3152 is configured to test a respective characteristic of the at least two power transmission pathways 3180. In an embodiment, the characteristic includes a respective propagation characteristic. In an embodiment, the propagation characteristic includes an estimated or measured respective radiofrequency channel characteristic. In an embodiment, the propagation characteristic includes an estimated or measured respective propagation characteristic. In an embodiment, the propagation characteristic includes a pathway loss. For example, a pathway loss may include a pathway loss responsive to distance, absorption, or obstructions. In an embodiment, the propagation characteristic includes a reflection characteristic. For example a reflection characteristic may include a reflection characteristic of the surface 3196. For example a reflection characteristic may include a reflection characteristic of an obstruction or a surface irregularity. In an embodiment, the propagation characteristic includes a refraction or diffraction characteristic. In an embodiment, the propagation characteristic includes a phase change characteristic. In an embodiment, the propagation characteristic includes a time delay characteristic. In an embodiment, the propagation characteristic includes a time varying characteristic. In an embodiment, the propagation characteristic includes overall transmission efficiency characteristic. In an embodiment, the propagation characteristic includes a multipath interference characteristic.

In an embodiment, the path analysis engine 3152 is configured to test a characteristic or parameter of the at least two power transmission pathways 3180. In an embodiment, the path analysis engine is configured to test a line of sight transmission pathway between the sub-Nyquist holographic aperture 3130 and the target device 3190. In an embodiment, the path analysis engine is configured to test a transmission pathway between the sub-Nyquist holographic aperture and the target device that includes a reflection off a radiofrequency electromagnetic wave reflecting surface. For example, a reflection pathway may help avoid the human being 3198. In an embodiment, the path analysis engine is configured to test a multipath transmission pathway between the sub-Nyquist holographic aperture and the target device. In an embodiment, a first transmission pathway of the at least two power transmission pathways has an initial first directional orientation relative to the surface 3124 and a second transmission pathway of the at least two power transmission pathways has a second and different initial directional orientation relative to the surface from the first directional orientation. In an embodiment, the radiateable space 3102 includes a free space radiateable by the antenna 3110.

In an embodiment, the path analysis engine 3152 is further configured to respectively test the at least two power transmission pathways 3180 using a channel sounding technique. In an embodiment, the path analysis engine is further configured to respectively test a respective propagation characteristic of the at least two power transmission pathways using a channel sounding technique. In an embodiment, the path analysis engine is further configured to respectively test a respective propagation characteristic or parameter of the at least two power transmission pathways using a channel sounding technique. In an embodiment, the path analysis engine includes a path analysis engine configured to evaluate or simulate at least two power transmission pathways from the antenna 3110 to the target device 3190 located within the radiateable space 3102.

In an embodiment, the optimization circuit 3154 is configured to select a best available wireless power transmission regime from at least two available wireless power transmission regimes. In an embodiment, the optimization circuit is configured to select a wireless power transmission regime maximizing a wireless transfer of radiofrequency electromagnetic power from the antenna to a target device, the selection constrained by a radiofrequency electromagnetic wave radiation exposure limit placed on a human being. In an embodiment, the maximizing includes maximizing a density of electromagnetic power transferred from the antenna to the target device. In an embodiment, the maximizing includes maximizing an efficiency of electromagnetic power transferred from the antenna to the target device. In an embodiment, the maximizing includes maximizing a transfer of electromagnetic power from the antenna to the target device, the maximizing responsive to a set of configurable rules. In an embodiment, the optimization circuit is configured to select a wireless power transmission regime that includes a multipath wireless power transmission regime. In an embodiment, the optimization circuit is configured to select a wireless power transmission regime that includes a reflection off a surface power transmission pathway. For example, the reflection may be a specular or a diffuse reflection. In an embodiment, the optimization circuit is configured to select a wireless power transmission regime that includes a line of sight power transmission pathway. In an embodiment, the wireless power transmission regime includes a wireless power transmission regime facilitating a wireless transfer of electromagnetic power in the radiative far-field region. In an embodiment, the wireless power transmission regime includes a wireless power transmission regime facilitating a wireless transfer of electromagnetic power in the radiative near-field. In an embodiment, the wireless power transmission regime includes a wireless power transmission regime facilitating a wireless transfer of electromagnetic power in the reactive near-field.

In an embodiment, the optimization circuit 3154 is configured to select a wireless power transmission regime in response to a matrix factorization, or a matrix decomposition based optimization technique. In an embodiment, the optimization circuit is configured to select a wireless power transmission regime in response to a gradient descent based optimization technique. For example, the gradient descent based optimization technique may include a local maximization optimization, or global maximization optimization technique. In an embodiment, the optimization circuit is configured to select a wireless power transmission regime in response to a singular value decomposition based optimization technique. In an embodiment, the optimization circuit is configured to select a wireless power transmission regime in response to a principle component analysis based optimization technique. In an embodiment, the optimization circuit is configured to select a wireless power transmission regime optimized utilizing coherent superposition of radiofrequency electromagnetic waves transmitted by the antenna. In an embodiment, the optimization circuit is configured to select a wireless power transmission regime in response to a trial and error, or a brute force based optimization technique. In an embodiment, the optimization circuit includes a graphics processing unit.

In an embodiment, the gain definition circuit 3154 is configured to a select a best available complex radiofrequency electromagnetic field from the at least two selectable, arbitrary complex radiofrequency electromagnetic fields implementing the selected wireless power transmission regime. In an embodiment, the gain definition circuit is configured to select a complex radiofrequency electromagnetic field configured to wirelessly transfer a focused electromagnetic power in the radiative far-field from the at least two selectable, arbitrary complex radiofrequency electromagnetic fields. In an embodiment, the selected arbitrary complex radiofrequency electromagnetic field is configured to form a focused electromagnetic power beam. In an embodiment, the gain definition circuit is configured to select a complex radiofrequency electromagnetic field configured to wirelessly transfer a focused electromagnetic power in the radiative near-field from the at least two selectable, arbitrary complex radiofrequency electromagnetic fields. In an embodiment, the selected arbitrary complex radiofrequency electromagnetic field is configured to form a focused electromagnetic power beam. In an embodiment, the selected arbitrary complex radiofrequency electromagnetic field is configured to form a quasi-Gaussian electromagnetic beam having a radiative near-field distribution. In an embodiment, the selected arbitrary complex radiofrequency electromagnetic field is configured to produce a focused transversely localized complex radiofrequency electromagnetic field. For example, the transversely localized may include in a direction transverse to a line of sight between the surface and the target device. In an embodiment, the focused transversely localized complex radiofrequency electromagnetic field is formed by a coherent superposition of at least two electromagnetic fields. For example, the focused transversely localized complex radiofrequency electromagnetic field may be determined in response to Green's function or the fundamental solution technique. In an embodiment, the selected arbitrary complex radiofrequency electromagnetic field is configured to form a focused electromagnetic power beam and a focused transversely localized complex radiofrequency electromagnetic field. In an embodiment, the gain definition circuit is configured to select a complex radiofrequency electromagnetic field configured to wirelessly transfer focused electromagnetic power in the reactive near-field from the at least two selectable, arbitrary complex radiofrequency electromagnetic fields. In an embodiment, the selected arbitrary complex radiofrequency electromagnetic field is configured to produce a focused transversely localized complex radiofrequency electromagnetic field. In an embodiment, the focused transversely localized complex radiofrequency electromagnetic field is formed by a coherent superposition of at least two electromagnetic fields. In an embodiment, the gain definition circuit is configured to select a complex radiofrequency electromagnetic field best implementing the selected wireless power transmission regime from the at least two selectable, arbitrary complex radiofrequency electromagnetic fields.

In an embodiment, the gain definition circuit 3154 is configured to determine a matrix representation of a transfer function responsive to the selected wireless power transmission regime. The gain definition circuit is also configured to select a complex electromagnetic field implementing the matrix representation of the transfer function from the at least two selectable arbitrary complex electromagnetic fields. For example, the matrix representation may be responsive to an amplitude or phase requirement. For example, the matrix representation may represent an adjustment pattern. For example, the transfer function may be a total transfer function. For example, the selected arbitrary complex electromagnetic field may include a selected arbitrary complex electromagnetic field representing the holographic transfer function. In an embodiment, the gain definition circuit is configured to determine a matrix representation of a transfer function calculated to produce the selected wireless power transmission regime. In an embodiment, the gain definition circuit 3154 is configured to determine a holographic transmission function responsive to the selected wireless power transmission regime. For example, a holographic transmission function may be described as a holographic transfer function. The gain definition circuit is also configured to select a complex electromagnetic field implementing the holographic transmission function from the at least two selectable arbitrary complex electromagnetic fields. For example, the gain definition circuit may be configured to selected a complex electromagnetic field best implementing the holographic transmission function from the at least two selectable arbitrary complex electromagnetic fields. In an embodiment, the gain definition circuit is configured to determine a holographic transmission function calculated to produce the selected wireless power transmission regime. In an embodiment, the gain definition circuit is configured to determine holographic transmission function providing an antenna radiation pattern descriptive of the selected wireless power transmission regime. In an embodiment, the gain definition circuit is configured to determine an amplitude-and-phase-controlled holographic transmission function responsive to the selected wireless power transmission regime. The gain definition circuit is also configured to select a complex electromagnetic field implementing the amplitude-and-phase-controlled holographic transmission function from the at least two selectable arbitrary complex electromagnetic fields. For example, the gain definition circuit may be configured to select a complex electromagnetic field best implementing the amplitude-and-phase-controlled holographic transmission function. In an embodiment, the gain definition circuit is configured to determine an amplitude-and-phase-controlled holographic transmission function responsive to the selected wireless power transmission regime and responsive to a presence of the target device in a reactive near-field of the antenna.

The following description includes an example of how a holographic transmission function may be calculated or estimated. Beginning first with an amplitude-controlled (scalar) transmission hologram, suppose one wants to create a monochromatic, stationary field distribution $E_o(x,y)$ on an (x,y) plane. The function $E_o(x,y)$ is complex-valued. The field is generated by an illumination function $E_{ref}(x,y)$. In this example, the stationary field distribution $E_o$ may be illustrated by the transmitted radiofrequency electromagnetic wave 1942 and the illumination function $E_{ref}$ represented by incident radiofrequency electromagnetic wave 1940 of FIG. 3. In a holographic design method, the transmission function is taken proportional to the positive, real-valued expression $|E_o(x,y)+E_{ref}(x,y)|_2$, so that the transmission function $$T(x,y)=b|E_o(x,y)+E_{ref}(x,y)|^2 = bE_o(x,y)E_{ref}(x,y)+\ldots \quad (1)$$

where b is a coefficient of proportionality chosen such that T does not exceed unity. When this transmission coefficient is applied to the illumination function, the transmitted field $E_T(x,y)=T(x,y)E_{ref}(x,y)$ is produced. This field consists of four terms, one of which corresponds to the first term in the r.h.s. of (1):

$$E_{T1}(x,y)=bE_o(x,y)|E_{ref}(x,y)|^2. \quad (2)$$

This term is directly proportional to the complex-valued amplitude $E_o(x,y)$. If the reference field further has the form $$E_{ref}(x,y)=Ae^{i(K_x x+K_y y)}, \quad (3)$$

the field $E_{T1}(x,y)$ reproduces the desired field E, (x,y) precisely with both its amplitude and phase, up to an overall constant coefficient of proportionality. The plane-wave-like reference field of the form (3) could be produced by an obliquely incident plane wave, or by radiation leaking from a planar waveguide, in which case $\vec{K}=(K_x, K_y)$ is the wave vector of a propagating mode in that waveguide. For the following, we assume that the wavenumber inside the waveguide exceeds the free space wavenumber, $k_0$. This, among other things, ensures that the waveguide modes are fully confined (non-radiating), even if one of its walls is partially transparent to EM radiation.

When a hologram is generated by an amplitude-controlled metamaterial aperture, the full generated field is different from the desired field $E_o(x,y)$ due to the terms neglected in the expansion of the r.h.s. of (1). However, when the illumination field is generated by a waveguide, this difference exists only in the reactive near-field zone, defined as the region of existence of the evanescent fields. The other three terms, which were neglected in the r.h.s of (1), correspond to non-propagating, evanescent fields. It is easy to understand that from the following example. Assume that the desired field $E_o(x,y)$ is an aperture cross-section of a propagating plane wave, i.e. $E_o(x,y)=Ae^{i(k_x x+k_y y)}$, where the wave vector $\vec{k}=(k_x,k_y)$ is shorter than the free space wavenumber, $k_0$. Then, all four terms in Eq. (1) are certain plane waves. The first one is a plane wave with transverse wave vector $(k_x, k_y)$, same as the desired object field. This is a propagating plane wave. The second term, $E^*_o(x,y) E_{ref}(x,y) E_{ref}(x,y)$, is a plane wave with transverse wave vector $2\vec{K}-\vec{k}$; this wave is evanescent because its transverse wavenumber exceeds the free-space wavenumber. Since it is evanescent, it does not essentially exist outside the reactive near-field. This is true whenever $\beta=|\vec{K}|$, the wavenumber in the waveguide, is greater than the free-space wavenumber, and $|\vec{k}|$ is less than $k_0$. Similarly, the third and the fourth terms in Eq. 1, $E_{ref}(x,y)|E_o(x,y)|^2$ and $E_{ref}(x,y)|E_{ref}(x,y)|^2$, are evanescent waves with transverse wave vector $\vec{K}$.

For a general field distribution, one may consider $E_o(x,y)$ to be a sum of plane waves, each with a transverse wave number no greater than $k_0$. By applying the argument above, we conclude that a general (scalar) field distribution absent of evanescent waves can be generated precisely by an amplitude-controlled transmission hologram. A vector field distribution is generated similarly using a superposition of polarization-selective transmission holograms and a polarization-diverse source field.

In an amplitude- and phase-controlled transmission hologram, one may choose the transfer function to be a complex-valued function of the form $$T(x,y)=bE_o(x,y)E^*_{ref}(x,y), \quad (1')$$

that is, the transmission function that produces only the exact term given by Eq. 2. Phase control therefore introduces the extra degrees of freedom that can be used for a more accurate field-forming in the reactive near field. Outside of the reactive near-field, i.e. in the radiative near-field and the far field, amplitude-only holographic method is self-sufficient, provided that the spatial sampling of the transmission function (1) is sufficiently high $$\left(\text{at least higher than Nyquist sampling, } a = \frac{\lambda_0}{2} = \pi/k_0\right).$$

In an embodiment, the gain definition circuit 3154 is configured to select a complex electromagnetic field from the at least two selectable arbitrary complex electromagnetic fields defined in advance. In an embodiment, the gain definition circuit is configured to select a complex electromagnetic field from the at least two selectable arbitrary complex electromagnetic fields defined on the fly. In an embodiment, the gain definition circuit is configured to select a complex electromagnetic field from the at least two selectable arbitrary complex electromagnetic fields defined based on trial and error. In an embodiment, the gain definition circuit is configured to select a complex electromagnetic field from the at least two selectable arbitrary complex electromagnetic fields from a library of potential complex electromagnetic fields.

In an embodiment, the gain definition circuit 3154 includes an adaptive gain definition circuit configured to select a second complex electromagnetic field of the at least two complex electromagnetic field. The selection of the second complex electromagnetic field is responsive to electromagnetic radiation received by the target device 3190 and electromagnetic radiation received by the human being 3198 with the antenna configured in a first complex electromagnetic field of the at least two complex electromagnetic fields. In an embodiment, the adaptive gain definition circuit is configured to select the second complex electromagnetic field by modifying a previously implemented first complex electromagnetic field. In an embodiment, the adaptive gain definition circuit is configured to select the at least two complex electromagnetic fields from a library of at least three complex electromagnetic fields.

In an embodiment, the antenna controller 3156 is configured to electronically define the selected arbitrary complex electromagnetic field 3134 in the sub-Nyquist holographic aperture 3130. In an embodiment, the antenna controller is configured to control a transmission mode and reception mode by the antenna. In an embodiment, the antenna controller is configured to control transmission and reception by the antenna in a duplex mode. In an embodiment, the antenna controller is configured to control transmission and reception by the antenna in a simultaneous mode.

In an embodiment, the system 3105 includes a channel sounder 3158 configured to acquire data responsive to a respective characteristic or parameter of the at least two power transmission pathways 3180. For example, the acquired data may include a measured or an estimated data. In an embodiment, the channel sounder is configured to acquire real time data responsive to a respective characteristic or parameter of the at least two power transmission pathways. In an embodiment, the channel sounder includes a MIMO-type channel sounder configured to acquire data responsive to a respective characteristic or parameter of the at least two power transmission pathways. For example, see R. S. Thoma, et. al, MIMO vector channel sounder measurement for smart antenna system evaluation (last accessed Jan. 21, 2014, at http://www2.elo.utfsm.cl/~ipd481/Papers%20varios/pf01wi.021.pdf.) For example, the channel sounder may be configured to acquire the data in real time. In an embodiment, the MIMO-type channel sounder is configured to channel sound at a frequency band within the operating frequency. In an embodiment, the MIMO-type channel sounder is configured to build a numerical matrix usable by the path analysis engine in testing the at least two power transmission pathways.

In an embodiment, the antenna 3110 is operable in a time division duplex mode to both transmit power to the target device 3190 and to acquire data responsive to a respective characteristic or parameter of the at least two power transmission pathways 3180 to the target device 3190 by channel sounding. For example, the antenna radiation patterns may be time divided between power transfer and channel sounding. For example, the antenna radiation patterns may be time divided between power transfer and other communications. In an embodiment, the time divisions are dynamically allocated between power transfer and channel sounding. In an embodiment, the channel sounder 3158 is configured to acquire data responsive to a respective characteristic or parameter of the at least two power transmission pathways 3180 using a frequency division duplex mode and a time division duplex mode.

In an embodiment, the antenna 3110 is operable in a frequency division duplex mode to both transmit power to the target device 3190 and to acquire data responsive to a respective characteristic or parameter of the at least two power transmission pathways 3180 to the target device by channel sounding. For example, separate frequency bands may be allocated for power transfer and for channel sounding. For example, if the operating frequency is the 60 GHz-63 GHz frequency band, the antenna may be operated using five 500 MHz sub-band for power transfer and using one 500 MHz sub-band for channel sounding. In an embodiment, the frequency divisions are dynamically allocated between power transfer and channel sounding. In an embodiment, the antenna is operable in a frequency division duplex mode to both transmit power to the target device and to communicate with the target device For example, if the operating frequency is the 60 GHz-63 GHz frequency band, the antenna may be operated using five 500 MHz sub-band for power transfer and using one 500 MHz sub-band for communication between the antenna and the target device. In an embodiment, the frequency divisions are dynamically allocated between power transfer and communication with the target device. In an embodiment, the gain definition circuit 3154 is configured to select a first arbitrary complex radiofrequency electromagnetic field implementing the selected wireless power transmission regime and select a second arbitrary complex radiofrequency electromagnetic field facilitating channel sounding the environment 3102. In an embodiment, the channel sounder is configured to acquire data responsive to a respective characteristic or parameter of the at least two power transmission pathways using an orthogonal frequency-division multiplexing protocol.

In an embodiment, the path analysis engine 3152 is configured to respectively test the at least two power transmission pathways 3180 at least partially in response to data received from the target device 3190. In an embodiment, the data received from the target device includes data indicative of a density of radiofrequency electromagnetic radiation received by the target device. In an embodiment, the data received from the target device includes data indicative of a rate of radiofrequency electromagnetic power received by the target device from the antenna. In an embodiment, the data received from the target device includes data indicative of a signal strength received by the target device in conjunction with a channel sounding.

In an embodiment, the system 3102 includes a communications module 3162 configured to communicate with the target device 3190. In an embodiment, the communications module may communicate with the target device using the antenna 3110, or using another antenna. The communications frequency may be the same frequency used to transmit power, or may be a different frequency. In an embodiment, the communications module is configured to communicate with at least two target devices. For example, if the operating frequency is the 60 GHz-63 GHz frequency band, the system may transfer radiofrequency electromagnetic power to target device 3190A using five 500 MHz sub-bands, and communicate with target device 3190A using one 500 MHz focused sub-band for feedback; and the system may communicate with target device 3190B using another 500 MHz sub-band in an omni direction-mode for non-line of sight communications. In an embodiment, the communications module is configured to receive a communication from the target device requesting a power transfer. For example, the target device may communicate an indication that they need power, how much power, or a preferred power reception spectrum.

In an embodiment, the path analysis engine 3152 is configured to respectively test the at least two power transmission pathways 3180 at least partially in response to a signal transmitted by or reflected from another device carried by the human being 3198. In an embodiment, the path analysis engine is further configured to respectively test the at least two power transmission pathways at least partially in response to data indicative of a characteristic or parameter of the environment acquired by a sensor.

In an embodiment, the system 3102 includes a locater circuit 3164 configured to determine a location of the human being 3198 in the radiateable space 3102. In an embodiment, the locater circuit is configured to determine a location of the human being in the radiateable space in response to a sensor acquired data. For example, the sensor acquired data may include data acquired by an infrared, ultrasound imaging, radio frequency imaging, radar, lidar, audio, thermal, or motion sensor. In an embodiment, the locater circuit is configured to determine a location of the human being in the space in response to a signal reflected by the human being or transmitted by another device physically associated with the human being 3198. For example, the signal may be transmitted by a cellular device carried by the human being. In an embodiment, the optimization circuit 3154 is configured to select a wireless power transmission regime responsive to (i) the tested at least two power transmission pathways and (ii) the determined location of the human being within the space.

In an embodiment, the system 3102 includes an update manager 3166 configured to initiate an update of the selected wireless power transmission regime. In an embodiment, the update manager is configured to continuously initiate an update of the selected wireless power transmission regime. In an embodiment, the update manager is configured to periodically initiate an update of the selected wireless power transmission regime. In an embodiment, the update manager is configured to initiate an update of the selected wireless power transmission regime in response to a schedule. In an embodiment, the update manager is configured to initiate an update of the selected wireless power transmission regime in response to an event. For example, the event may include a movement by target device 3190, a movement by the human being 3198, or an entry of another human into the radiateable space 3102. In an embodiment, the update manager is configured to initiate an update of the selected wireless power transmission regime in response to change in electromagnetic radiation received by the target device. In an embodiment, the update manager is configured to initiate an update of the selected wireless power transmission regime in response to a change of location of the human being in the environment. In an embodiment, the update manager is configured to initiate an update cycle by the path analysis engine, the optimization circuit, the gain definition circuit, and the antenna controller.

In an embodiment, the system 3102 includes a power transfer manager 3168 configured to initiate, modify, or terminate a transfer of radiofrequency electromagnetic energy from the antenna 3110 to the target device 3190. In an embodiment, the initiate includes initiate a transfer in response to a request originated by the target device or in response to a schedule. In an embodiment, the modify includes modify an ongoing transfer in response to a request originated by the target device. In an embodiment, the terminate includes terminate a transfer in response to a request originated by the target device or in response to a schedule.

FIGS. 16-17 also illustrate an alternative embodiment of the system 3105. The alternative embodiment of the system includes an antenna 3110 having a sub-Nyquist holographic aperture 3130 configured to define at least two selectable, arbitrary complex radiofrequency electromagnetic fields on a surface 3124 over an operating frequency. The system includes a path analysis engine 3152 configured to respectively test at least two power transmission pathways from the antenna to a target device 3190 located in an environment 3100 within a space 3102 radiateable by the antenna. An optimization circuit 3154 is configured to select responsive to the tested at least two power transmission pathways a wireless power transmission regime. The selected wireless power transmission regime including an electromagnetic radiation pattern shaped to wirelessly transfer radiofrequency electromagnetic power from the antenna to the target device without exceeding anywhere in the space a radiofrequency electromagnetic wave radiation exposure limit for a human being 3198. The system includes a gain definition circuit 3154 configured to select a complex electromagnetic field from the at least two selectable arbitrary complex electromagnetic fields implementing the selected wireless power transmission regime. The system includes an antenna controller 3156 configured to define the selected arbitrary complex electromagnetic field 3134 in the sub-Nyquist holographic aperture.

Figure 18:
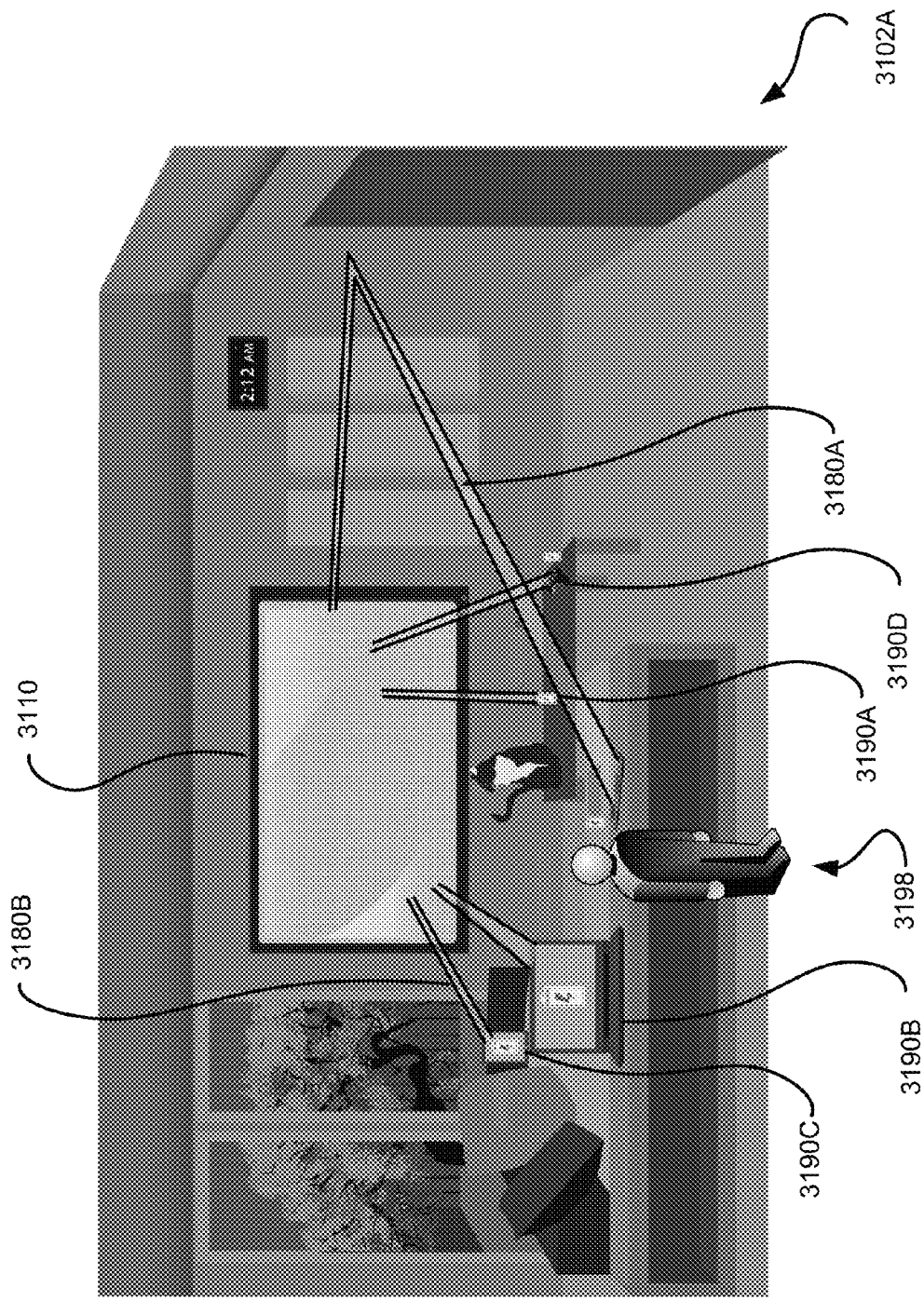
FIG. 18 illustrates an alternative embodiment 3102A of the radiateable space 3102 of FIG. 16.

FIG. 18 illustrates an alternative embodiment 3102A of the radiateable space 3102 of FIG. 16. For example, the radiateable space may include living room, a conference room, an office, or a hotel room. In this alternative embodiment, the antenna 3110 is incorporated in a frame or screen of a flat screen display, such as may be used to display television programs, videos, or computer generated displays. In this alternative embodiment, the system 3102 of FIG. 16 wirelessly detects and transfers radiofrequency electromagnetic power to a target device 3190, illustrated by target devices 3190A-3190D, while reducing or minimizing the power received by the human being 3198 or animals.

Figure 19:
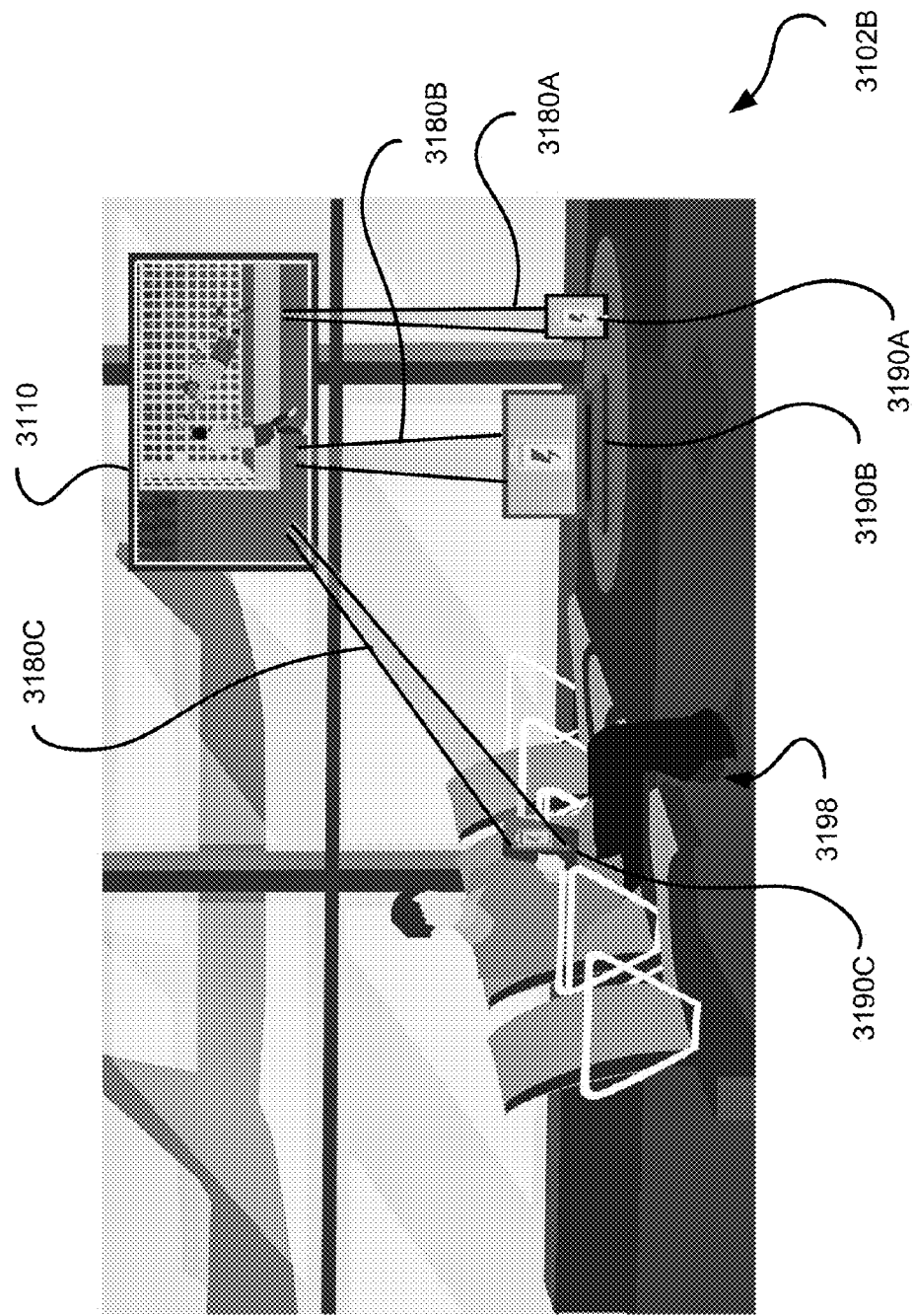
FIG. 19 illustrates an alternative embodiment 3102B of the radiateable space 3102 of FIG. 16.

FIG. 19 illustrates an alternative embodiment 3102B of the radiateable space 3102 of FIG. 16. For example, the radiateable space may include a public space, such as an airport waiting area, coffee shop, or store. In this alternative embodiment, the antenna 3110 is incorporated in a frame or screen of a flat screen display, such as may be used to display television programs, videos, or computer generated displays. In this alternative embodiment, the system 3102 of FIG. 16 wirelessly detects and transfers radiofrequency electromagnetic power to a target device 3190, illustrated by target devices 3190A-3190D, while reducing or minimizing the power received by the human 3198.

FIG. 20 illustrates alternative embodiments 3110A and 3110 B of the antenna 3110 illustrated in conjunction with FIGS. 18-19. In the alternative embodiment of the antenna 3110A, the sub-Nyquist holographic aperture includes the elements 1300 carried by at least one side of a frame around a flat screen display. In the alternative embodiment of the antenna 3110B, the sub-Nyquist holographic aperture includes the elements 1300 carried by or incorporated in the screen of the flat screen display. For example, the elements may be small enough not to be readily noticeable by the human eye, or may be fabricated by a transparent material such as a thin layer of indium tin oxide.

FIG. 21 illustrates an example operational flow 3200. After a start operation, the operational flow includes an investigation operation 3210. The investigation operation includes testing at least two respective power transmission pathways from an antenna to a target device located within a space radiateable by the antenna. In an embodiment, the investigation operation may be implemented using the path analysis engine 3152 to test at least two respective power transmission pathways, such as the pathways 3180A and 3180B described in conjunction with FIGS. 32 and 33. An optimization operation 3220 includes selecting responsive to the tested at least two power transmission pathways a wireless power transmission regime. The selected wireless power transmission regime including an electromagnetic radiation pattern shaped to wirelessly transfer radiofrequency electromagnetic power from the antenna to a target device without exceeding anywhere in the space a radiofrequency electromagnetic wave radiation exposure limit for a human being. In an embodiment, the optimization operation may be implemented using the optimization circuit 3154 described in conjunction with FIGS. 16 and 17. A gain selection operation 3230 includes selecting a complex radiofrequency electromagnetic field implementing the selected wireless power transmission regime from at least two selectable arbitrary complex electromagnetic fields. In an embodiment, the gain selection operation may be implemented using the gain definition circuit 3154 described in conjunction with FIGS. 16 and 17. A reception operation 3240 includes receiving radiofrequency electromagnetic waves at the surface. A reconstruction operation 3250 includes coherently reconstructing the received radiofrequency electromagnetic waves with the selected arbitrary complex radiofrequency electromagnetic field defined on the surface. In an embodiment, the reconstruction operation may be implemented using the antenna controller circuit 3156 described in conjunction with FIGS. 16 and 17 and the sub-Nyquist holographic aperture of the antenna to define the selected arbitrary complex radiofrequency electromagnetic field. A radiation operation 3260 includes wirelessly transmitting the coherently reconstructed radiofrequency electromagnetic waves to the target device. In an embodiment, the radiation operation may be implemented using the antenna 3110, the sub-Nyquist holographic aperture 3130, and the selected arbitrary complex electromagnetic field 3134 described in conjunction with FIGS. 16 and 17. The operational flow includes an end operation.

In an embodiment of the gain selection operation 3250, the at least two selectable, arbitrary complex radiofrequency electromagnetic fields are definable on a surface of the antenna by a sub-Nyquist holographic aperture over an operating frequency. In an embodiment of the gain selection operation, the at least two selectable, arbitrary complex radiofrequency electromagnetic fields are definable on a surface and have tangential wavenumbers up to the free-space wavenumber ($k_0$). In an embodiment of the gain selection operation, the at least two selectable, arbitrary complex radiofrequency electromagnetic fields are definable on a surface and have tangential wavenumbers up to $2\pi$ over the aperture spacing (k_apt=$2\pi/a$).

In an embodiment, the operational flow 3200 further includes defining the selected arbitrary complex radiofrequency electromagnetic field on the surface. In an embodiment, the operational flow further includes communicating with the target device related to its radiofrequency electromagnetic power requirements. In an embodiment, the operational flow further includes initiating an update of the selected wireless power transmission regime. In an embodiment, the operational flow includes initiating, modifying, or terminating a transfer of radiofrequency electromagnetic energy from the antenna to the target device in response to a request originated by the target device or in response to a schedule.

FIG. 22 illustrates an example apparatus 3300. The apparatus includes means 3352 for testing at least two respective power transmission pathways from an antenna to a target device located within a space radiateable by the antenna. The apparatus includes means 3354 for selecting responsive to the tested at least two power transmission pathways a wireless power transmission regime. The wireless power transmission regime including an electromagnetic radiation pattern shaped to wirelessly transfer radiofrequency electromagnetic power from the antenna to a target device without exceeding a radiofrequency electromagnetic wave radiation exposure limit for a human being. The apparatus includes means 3356 for selecting a complex radiofrequency electromagnetic field implementing the selected wireless power transmission regime from at least two selectable, arbitrary complex radiofrequency electromagnetic fields definable on a surface of the antenna over an operating frequency. The apparatus includes means 3358 for receiving radiofrequency electromagnetic waves incident to the surface. The apparatus includes means 3362 for defining the selected complex radiofrequency electromagnetic field on the surface. The apparatus includes means 3364 for coherently reconstructing the received radiofrequency electromagnetic waves with the selected arbitrary complex radiofrequency electromagnetic field defined on the surface. The apparatus includes means 3366 for delivering wirelessly transmitting the coherently reconstructed radiofrequency electromagnetic waves.

In an embodiment, the apparatus 3300 further includes means for communicating with the target device related to its radiofrequency electromagnetic power requirements. In an embodiment, the apparatus further includes means for initiating an update of the selected wireless power transmission regime. In an embodiment, the apparatus further includes means initiating, modifying, or terminating a transfer of radiofrequency electromagnetic energy from the antenna to the target device in response to a request originated by the target device or in response to a schedule.

Figure 23:
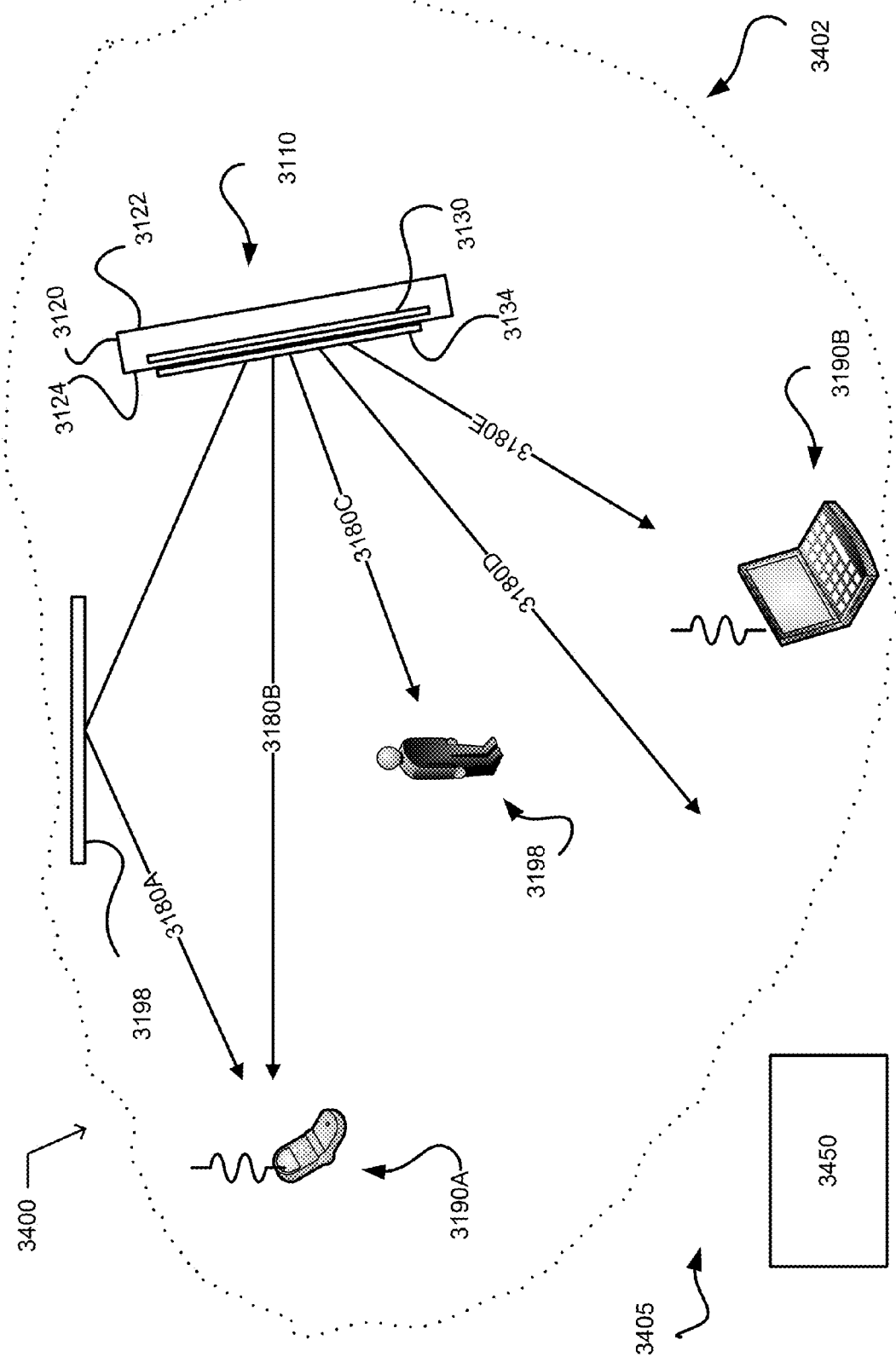
FIG. 23 illustrates certain aspects of an environment 3400.
Figure 24:
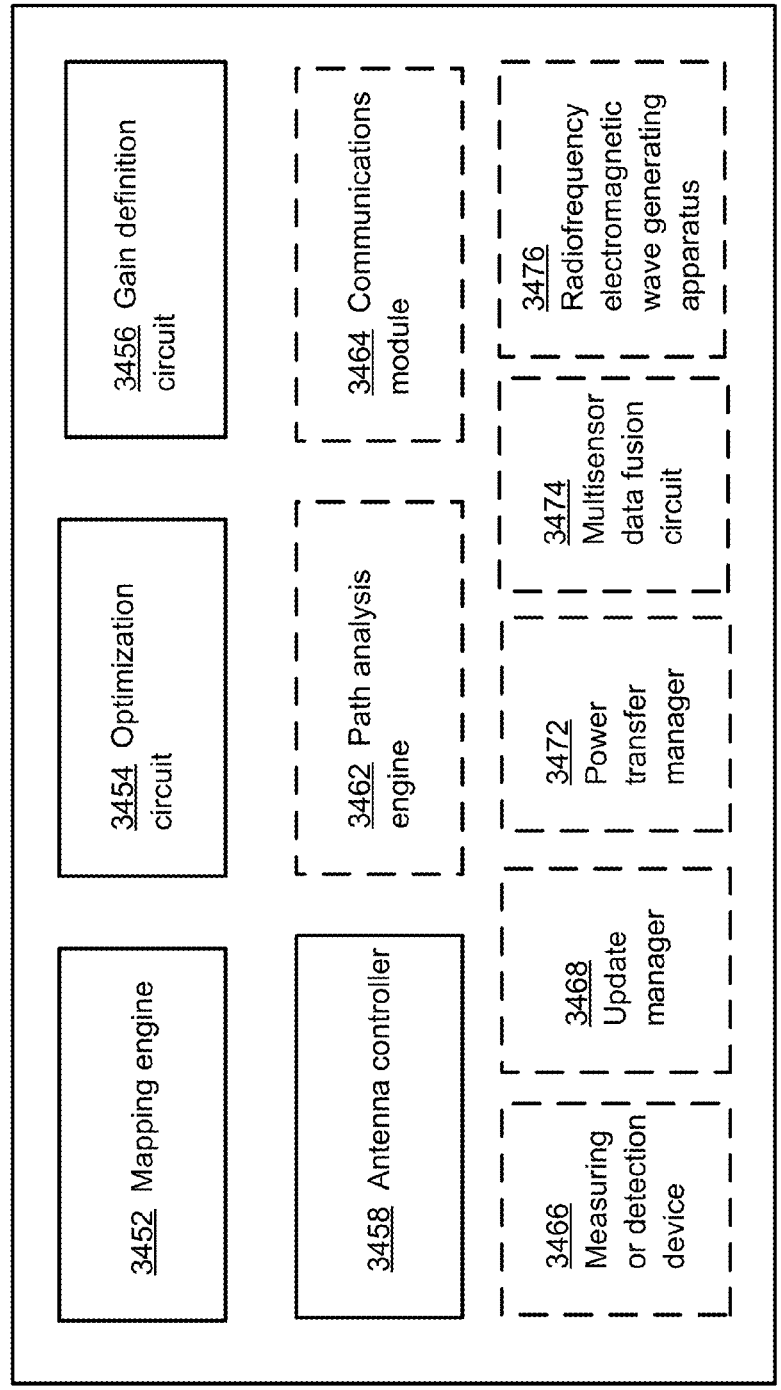
FIG. 24 illustrates an embodiment of the associated system apparatus 3450.

FIGS. 23 and 24 illustrate an embodiment. FIG. 23 illustrates certain aspects of an environment 3400. The environment includes a target device 3190 and a human being 3198. In an embodiment, the environment also includes things that may affect radiofrequency transmission characteristics. In an embodiment, the environment includes tables, walls, window glass, floor coverings, or other absorbent or reflective materials. The embodiment includes the antenna 3110 and associated system apparatus 3450. The antenna includes the sub-Nyquist holographic aperture 3130 configured to define at least two selectable, arbitrary complex radiofrequency electromagnetic fields on the surface 3124 of the antenna over an operating frequency.

FIG. 24 illustrates an embodiment of the associated system apparatus 3450. The system apparatus includes a mapping engine 3452 configured to model the environment 3400 within a radiateable space 3402 by the antenna 3110. In an embodiment, the mapping engine is configured to model a location of the human being 3198. An optimization circuit 3454 is configured to select responsive to the model of the environment a wireless power transmission regime. The wireless power transmission regime including an electromagnetic radiation pattern shaped to wirelessly transfer radiofrequency electromagnetic power from the antenna to the target device without exceeding a radiofrequency electromagnetic wave radiation exposure limit for human beings. For example, the transmission regime may include a directionally shaped antenna gain pattern maximizing electromagnetic radiation delivered to the target device and minimizing electromagnetic radiation delivered to the human being. A gain definition circuit 3456 is configured to select a complex radiofrequency electromagnetic field implementing the selected wireless power transmission regime from the at least two selectable, arbitrary complex radiofrequency electromagnetic fields. An antenna controller 3458 is configured to define the selected arbitrary complex electromagnetic field 3134 in the sub-Nyquist holographic aperture 3130.

In an embodiment, the sub-Nyquist holographic aperture 3130 and the surface 3124 are cooperatively structured so that radiofrequency electromagnetic waves incident upon the surface are coherently reconstructed by the selected arbitrary complex radiofrequency electromagnetic field 3134 and transmitted to the target device 3190. In an embodiment, the sub-Nyquist holographic aperture and the surface are structured to cooperatively transmit electromagnetic waves into free space. The transmitted electromagnetic waves are coherently reconstructed by the sub-Nyquist holographic aperture from received incident waves and have a radiation pattern defined by the selected arbitrary complex radiofrequency electromagnetic field. In an embodiment, the sub-Nyquist holographic aperture and the surface are surface are structured to cooperatively transmit electromagnetic waves into free space, the transmitted electromagnetic waves coherently reflected by the sub-Nyquist holographic aperture from received incident waves and having a radiation pattern defined by the selected arbitrary complex radiofrequency electromagnetic field.

In an embodiment, the system apparatus 3450 further includes a radiofrequency electromagnetic wave generating apparatus 3476 configured to generate and deliver radiofrequency electromagnetic waves to the surface 3124 of the antenna 3110. The frequency of the radiofrequency electromagnetic waves are within at least a portion of the operating frequency of the antenna.

In an embodiment, the sub-Nyquist holographic aperture 3130 is configured to define at least two selectable, arbitrary complex radiofrequency electromagnetic fields on the surface 3124 with tangential wavenumbers up to the free-space wavenumber ($k_o$). In an embodiment, the sub-Nyquist holographic aperture is configured to define at least two selectable, arbitrary complex radiofrequency electromagnetic fields on a surface with tangential wavenumbers up to $2\pi$ over the aperture spacing (k_apt=$2\pi/a$).

In an embodiment, the antenna 3110 is appropriately dimensioned to be incorporated into or mounted on a consumer device. For example, the consumer device may include a wall panel, a flat screen display (such as the display surface described in conjunction with FIG. 1 or FIG. 2), or a wall hanging. In an embodiment, the antenna is appropriately dimensioned to be incorporated into or mounted on a wall panel, a flat screen display, or a wall hanging. In an embodiment, the antenna is appropriately dimensioned to be incorporated into or mounted on a picture frame or a mirror frame. In an embodiment, the antenna is appropriately dimensioned to be incorporated into or removeably mounted on a wall of a residence, hotel, office space, or public space. In an embodiment, the antenna is configured to be supported by a surface. In an embodiment, the antenna includes an at least substantially planar arrangement of at least two antenna segments. For example, the antenna may be incorporated into two segments of a frame surrounding a display device, such as flat screen display. For example, the two segments may include perpendicular or parallel segments of a frame surrounding the display device. In an embodiment, the antenna includes a first substantially planar antenna segment physically spaced apart from a second substantially planar antenna segment. In an embodiment, the antenna controller 3458 is configured to define the selected arbitrary complex radiofrequency electromagnetic field using the at least two antenna segments.

In an embodiment, the antenna 3110 includes a radiofrequency electromagnetic wave radiating element and an electronically controllable or tunable reflective surface. For example, the electronically controllable or tunable reflective surface may include a reconfigurable electronically controllable or tunable reflective surface. In an embodiment, the radiating element and the reflective surface are physically integrated. In an embodiment, the radiating element and the reflective surface are physically spaced apart.

In an embodiment, the antenna 3110 includes an electronically controllable or tunable lens configured to define the at least two selectable, arbitrary complex radiofrequency electromagnetic fields on a surface of the lens. In an embodiment, the lens includes an electronically tunable or MEMS tunable refracting or diffracting lens. In an embodiment, the lens includes an electronically tunable metamaterial-based refracting or diffracting lens. In an embodiment, the metamaterial-based refracting or diffracting lens including at least one layer of a plurality of individual electromagnetic wave scattering elements electronically operable in combination to define at least two selectable, arbitrary complex radiofrequency electromagnetic fields on a surface over an operating frequency. In an embodiment, the lens includes a metasurface lens. For example, a metasurface lens may include a two-dimensional metamaterial pattern consisting of an array of subwavelength-spaced optical nanoantennas on a flat silicon surface providing an aberration-free focusing lens. In an embodiment the antenna controller 3458 is configured to define the selected arbitrary complex radiofrequency electromagnetic field in the electronically controllable or tunable lens.

In an embodiment, the target device 3190 includes a relatively stationary target device. In an embodiment, the target device includes a moving target device. In an embodiment, the target device is configured to receive the radiofrequency electromagnetic power wirelessly transmitted by the antenna. In an embodiment, the target device includes a target device antenna configured to receive wirelessly transmitted radiofrequency electromagnetic power. In an embodiment, the target device includes at least two target devices. In an embodiment, the target device includes an energy storage device rechargeable at least in part using wirelessly transmitted radiofrequency electromagnetic power received from the antenna 3110. In an embodiment, the target device is operable at least in part using wirelessly transmitted radiofrequency electromagnetic power received from the antenna. For example, the target device may include a mobile phone, smart phone, tablet, laptop computing device, or remote control. In an embodiment, the target device is configured to consume less than an average of one watt per hour. For example, the target device may include a watch, smoke detector sensor, remote control, keyboard, mouse, Bluetooth device, clock, security sensor, or cell or smart phone. For example, the target device may include emergency lighting, door locks, e-ink picture frame, live wall calendar, or reminders.

In an embodiment, the human 3198 includes a relatively stationary human being. In an embodiment, the human includes a human being in motion. In an embodiment, the human being includes at least two humans.

In an embodiment, the mapping engine 3452 is configured to two or three-dimensionally model the environment 3400 within the space 3402 radiateable by the antenna 3110. In an embodiment, the mapping engine is configured to periodically update the model of the environment within the radiateable space 3402. In an embodiment, the mapping engine is configured to automatically update the model of the environment within the radiateable space. In an embodiment, the mapping engine is configured to update the model of the environment at least once a second. In an embodiment, the mapping engine is configured to update the model of the environment at least once each five seconds. In an embodiment, the mapping engine is configured to update the model of the environment at least once each ten seconds. In an embodiment, the mapping engine is further configured to predictively model the environment. In an embodiment, the predictive model includes a predicted future location of the target device in the environment. For example, the future location of the target device may be predictively modeled three or five seconds ahead. In an embodiment, the predictive model includes a predicted future location of the human being 3198 in the environment. In an embodiment, the mapping engine is configured to at least partially model the location of the target device in response to a signal transmitted by the target. In an embodiment, the mapping engine is configured to at least partially model the location of the target device in response to a signal reflected by the target device. In an embodiment, the mapping engine is configured to at least partially model the location of the target device in response to a characteristic or parameter of the environment within the space. In an embodiment, the mapping engine is configured to at least partially model the environment in response to data generated using a channel sounding technique. In an embodiment, the model of the environment includes an electromagnetic wave reflecting surface within the radiateable space. For example, the electromagnetic wave reflecting surface may include a wall, mirror, or a reflector. In an embodiment, the model of the environment includes a model of a power transmission pathway between the antenna and the target device. For example, the model may include a model of an optimal power transmission pathway. For example, the model may be continuously updated. In an embodiment, the model of the power transmission pathway includes a line-of-sight transmission pathway between the antenna and the target device. In an embodiment, the model of the power transmission pathway includes a transmission pathway reflecting off an electromagnetic reflecting surface located within the space. In an embodiment, the model of the power transmission pathway includes a multipath power transmission pathway.

In an embodiment, the mapping engine 3452 is configured to at least partially model the environment 3400 in response to sensor-acquired data indicative of a characteristic or parameter or a parameter of the environment. In an embodiment, the mapping engine is configured to at least partially model the environment in response to radio-frequency acquired data indicative of a characteristic or parameter of the environment. In an embodiment, the mapping engine is configured to model a location of the human being 3198 in the environment. In an embodiment, the mapping engine is configured to initiate operation of the antenna in a radar mode, acquire radar-based data indicative of a characteristic or parameter of the environment, and model the environment at least partially in response to the radar-based data. In an embodiment, the mapping engine is configured to at least partially model the environment in response to lidar-acquired data indicative of a characteristic or parameter of the environment. In an embodiment, the mapping engine is configured to at least partially model the environment in response to data integrated using a multisensor data fusion technique. In an embodiment, the mapping engine is configured to three-dimensionally model the environment within the space at least partially in response to data received from the target device 3180. For example, the data may be received by a communications module 3464.

In an embodiment, the associated system apparatus 3450 includes a path analysis engine 3462 is configured to respectively test the at least two power transmission pathways 3180. In an embodiment, the path analysis engine is configured to respectively test the at least two power transmission pathways at least partially based on sensor-acquired 3466 data indicative of a characteristic or parameter of the environment 3400. In an embodiment, the path analysis engine is further configured to respectively test the at least two power transmission pathways at least partially in response to data assembled by multi-sensor fusion technique or process.

In an embodiment, the gain definition circuit 3456 is configured to select the wireless power transmission regime responsive to (i) the wireless power transmission regime or (ii) a result of the test of the at least two power transmission pathways. In an embodiment, the gain definition circuit is configured to determine a matrix representation of a transfer function responsive to the wireless power transmission regime, and to select a complex radiofrequency electromagnetic field implementing the matrix representation of the transfer function from the at least two selectable arbitrary complex radiofrequency electromagnetic fields. In an embodiment, the gain definition engine is configured to select a best available complex radiofrequency electromagnetic field implementing the matrix representation of the transfer function from the at least two selectable arbitrary complex radiofrequency electromagnetic fields. In an embodiment, the gain definition circuit is configured to describe according to holographic principles an antenna radiation pattern responsive to the model of the environment, and to select a complex radiofrequency electromagnetic field implementing the described antenna radiation pattern from the at least two selectable arbitrary complex radiofrequency electromagnetic fields. In an embodiment, the gain definition circuit is configured to determine a holographic transmission function calculated to produce to the wireless power transmission regime, and to select a complex radiofrequency electromagnetic field implementing the holographic transmission function from the at least two selectable arbitrary complex radiofrequency electromagnetic fields. In an embodiment, the gain definition engine is configured to select a best available complex radiofrequency electromagnetic field implementing the holographic transmission function from the at least two selectable arbitrary complex radiofrequency electromagnetic fields.

In an embodiment, the gain definition circuit 3456 is configured to select complex radiofrequency electromagnetic field maximizing radiofrequency electromagnetic radiation delivered to the target device 3190. The selection is constrained by a radiofrequency electromagnetic wave radiation exposure limit defined for human beings. For example, the limit may include a health and safety limit defined by a government agency, such as OHSA or the FCC. For example, the limit may be expressed as a power density, such as mW/cm2. For example, the limit may include a peak or a sustained power density. For example, the limit may be expressed as a maximum permissible exposure limit. For example, the limit may be expressed as a field strength and power density limit. For example, the limit may be expressed as a specific absorption rate, such as in W/kg. In an embodiment, the complex radiofrequency electromagnetic field is selected to maximize electromagnetic radiation delivered to a power receiving antenna of the target device. In an embodiment, the complex radiofrequency electromagnetic field is selected to maximize electromagnetic radiation delivered to a field of view occupied by the target device, the selection constrained by a radiofrequency electromagnetic wave radiation limit exposure limit to a field of view occupied by a human being.

In an embodiment, the gain definition circuit 3456 is configured to select responsive to the wireless power transmission regime a complex radiofrequency electromagnetic field implementing the selected wireless power transmission regime in an antenna having at least two aperture segments.

The selected arbitrary complex radiofrequency electromagnetic field having an amplitude or phase selected to maximize the combined electromagnetic radiation delivered to the target device in view of a constraint limiting the radiofrequency electromagnetic radiation limit for human beings. In an embodiment, the gain definition circuit is configured to select responsive to the wireless power transmission regime a series of at least two complex radiofrequency electromagnetic fields from the at least two selectable, arbitrary complex radiofrequency electromagnetic fields definable by the antenna. The series of at least two radiation patterns are selected to facilitate an iterative convergence on an arbitrary complex radiofrequency electromagnetic field delivering a maximum electromagnetic radiation to the target device and constrained by a radiofrequency electromagnetic wave radiation exposure limit defined for human beings. In an embodiment, the series of the at least two complex radiofrequency electromagnetic fields is randomly selected from at least two selectable, arbitrary complex radiofrequency electromagnetic fields definable by the antenna.

In an embodiment, the gain definition circuit 3456 includes an adaptive gain definition circuit configured to select a second complex radiofrequency electromagnetic field of the at least two selectable, arbitrary complex radiofrequency electromagnetic fields. The selection of the second complex radiofrequency electromagnetic field is responsive to electromagnetic radiation received by the target device 3190 and electromagnetic radiation received by a human being 3198 with the antenna 3110 configured in a first complex radiofrequency electromagnetic field of the at least two selectable, arbitrary complex radiofrequency electromagnetic fields. In an embodiment, the adaptive gain definition circuit is configured to define the series of at least two radiation patterns in response to a selection algorithm.

In an embodiment, the antenna controller 3458 is configured to define the selected arbitrary complex radiofrequency electromagnetic field 3134 in the sub-Nyquist holographic aperture 3130 using a portion of the surface 3124 of the antenna 3110. For example, the antenna controller is configured to use less than the antenna's entire physical aperture.

In an embodiment, the associated system apparatus 3450 includes at least one device 3466 configured to detect or measure a characteristic or parameter of the environment 3400. In an embodiment, the at least one device includes an infrared sensor or a near infrared sensor. In an embodiment, the sensor includes an ultrasound sensor. In an embodiment, the at least one device includes an image acquisition device. For example, the image acquisition device may acquire still or streaming images. In an embodiment, the at least one device includes a lidar imager. In an embodiment, the at least one device includes an audio sensor. In an embodiment, the at least one device includes a radio frequency imager. In an embodiment, the radio frequency imager is configured to transmit or receive radio frequency electromagnetic waves using the antenna or another antenna. In an embodiment, the at least one device includes a thermal sensor. In an embodiment, the sensor includes an image sensor. For example, the image sensor may include a video tracking device, such as a Kinect device. In an embodiment, the at least one device includes an electro-optical/infrared system. For example, an electro-optical/infrared system may include a low resolution electro-optical/infrared system. For example, an electro-optical/infrared system may include a non-imaging or imaging electro-optical/infrared system. In an embodiment, the sensor includes a motion sensor.

In an embodiment, the associated system apparatus 3450 includes a multisensor data fusion circuit 3474 configured to receive data indicative of a characteristic or parameter of the environment from at least two sensors and to generate an estimate of a characteristic or parameter of the environment. For example, the data fusion circuit may include a neural network. In an embodiment, the multisensor data fusion circuit includes multisensor data fusion system employing a Bayesian filter or a Kalman filter.

In an embodiment, the associated system apparatus 3450 includes a power transfer manager 3472 configured to initiate, modify, or terminate a transfer of radiofrequency electromagnetic energy from the antenna 3110 to the target device 3190.

In an embodiment, the associated system apparatus 3450 includes the communications module 3464 configured to communicate with the target device. In an embodiment, the associated system apparatus includes an update manager 3466 configured to initiate an update of the selected wireless power transmission regime.

Figure 25:
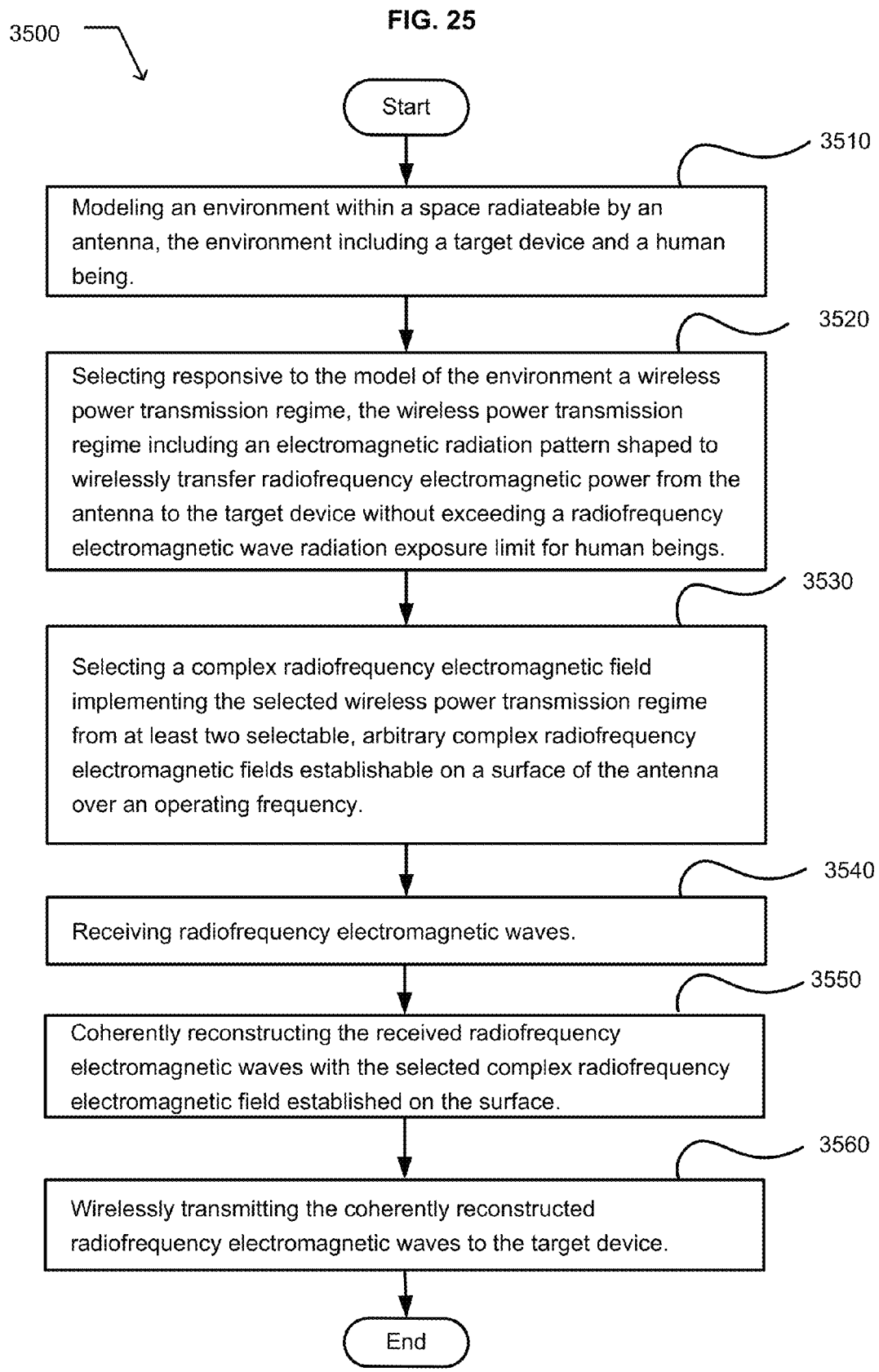
FIG. 25 illustrates an example operational flow 3500.

FIG. 25 illustrates an example operational flow 3500. After a start operation, the operational flow includes a simulation operation 3510. The simulation operation includes modeling an environment within a space radiateable by an antenna. The environment includes a target device and a human being. In an embodiment, the simulation operation may be implemented using the mapping engine 3452 described in conjunction with FIG. 24. An optimization operation 3520 selecting responsive to the model of the environment a wireless power transmission regime, the wireless power transmission regime including an electromagnetic radiation pattern shaped to wirelessly transfer radiofrequency electromagnetic power from the antenna to the target device without exceeding a radiofrequency electromagnetic wave radiation exposure limit for human beings. In an embodiment, the optimization operation may be implemented using the optimization circuit 3454 described in conjunction with FIG. 24. A gain selection operation 3530 includes selecting a complex radiofrequency electromagnetic field implementing the selected wireless power transmission regime from at least two selectable, arbitrary complex radiofrequency electromagnetic fields definable on a surface of the antenna over an operating frequency. In an embodiment, the gain selection operation may be implemented using the gain definition circuit described in conjunction with FIG. 24. A reception operation 3540 includes receiving radiofrequency electromagnetic waves. A reconstruction operation 3560 includes coherently reconstructing the received radiofrequency electromagnetic waves with the selected arbitrary complex radiofrequency electromagnetic field defined on the surface. In an embodiment, the reconstruction operation may be implemented using the antenna controller 3458 described in conjunction with FIG. 24 to cause the sub-Nyquist holographic aperture of the antenna to define the selected arbitrary complex radiofrequency electromagnetic field on the surface. A radiation operation 3560 includes wirelessly transmitting radiofrequency electromagnetic power to the target device in accordance with the identified wireless power transmission regime. In an embodiment, the radiation operation may be implemented using the antenna 3110, the sub-Nyquist holographic aperture 3130, and the selected arbitrary complex electromagnetic field 3134 described in conjunction with FIGS. 23 and 24. The operational flow includes an end operation.

In an embodiment of the operational flow 3500, the at least two selectable, arbitrary complex radiofrequency electromagnetic fields are definable on a surface of the antenna by a sub-Nyquist holographic aperture over an operating frequency. In an embodiment, the at least two selectable, arbitrary complex radiofrequency electromagnetic fields definable on a surface have tangential wavenumbers up to the free-space wavenumber ($k_0$). In an embodiment, the at least two selectable, arbitrary complex radiofrequency electromagnetic fields definable on a surface have tangential wavenumbers up to $2\pi$ over the aperture spacing (k_apt=$2\pi$/a).

In an embodiment, the operational flow 3500 further includes defining the selected arbitrary complex radiofrequency electromagnetic field on the surface. In an embodiment of the simulation operation 3510, the modeling includes iteratively updating the modeling of the environment within a space radiateable by the antenna. In an embodiment, the operational flow 3500 further includes testing the respective at least two power transmission pathways at least partially in response to sensor-acquired data indicative of a characteristic or parameter of the environment. In an embodiment, the operational flow further includes acquiring data indicative of a characteristic or parameter of the environment. In an embodiment, the operational flow further includes generating an estimate of a characteristic or parameter of the environment by multisensor data fusion responsive to data indicative of a characteristic or parameter of the environment respectively received from at least two sensors. In an embodiment, the operational flow further includes initiating an update of the selected wireless power transmission regime. In an embodiment, the operational flow further includes initiating, modifying, or terminating a transfer of radiofrequency electromagnetic energy from the antenna to the target device in response to a request originated by the target device or in response to a schedule.

FIG. 26 illustrates an example apparatus 3600. The apparatus includes means 3610 for modeling an environment within a space radiateable by an antenna, the environment including a target device and a human being.

The apparatus includes means 3520 for selecting responsive to the model of the environment a wireless power transmission regime. The wireless power transmission regime including an electromagnetic radiation pattern shaped to wirelessly transfer radiofrequency electromagnetic power from the antenna to the target device without exceeding a radiofrequency electromagnetic wave radiation exposure limit for human beings. The apparatus includes means 3530 for selecting a complex radiofrequency electromagnetic field implementing the selected wireless power transmission regime from at least two selectable, arbitrary complex radiofrequency electromagnetic fields definable on a surface of the antenna over an operating frequency. The apparatus includes means 3540 for receiving radiofrequency electromagnetic waves. The apparatus includes means 3550 for coherently reconstructing the received radiofrequency electromagnetic waves with the selected arbitrary complex radiofrequency electromagnetic field defined on the surface. The apparatus includes means 3560 for wirelessly transmitting the coherently reconstructed radiofrequency electromagnetic waves to the target device.

In an embodiment, the apparatus 3600 includes means for testing the respectively at least two power transmission pathways at least partially in response to data indicative of a characteristic or parameter of the environment acquired by a sensor. In an embodiment, the apparatus includes means for acquiring data indicative of a characteristic or parameter of the environment. In an embodiment, the apparatus includes means for defining the selected arbitrary complex radiofrequency electromagnetic field on the surface.

In an embodiment, the apparatus includes means for initiating an update of the selected arbitrary complex electromagnetic field from the at least two selectable arbitrary complex electromagnetic fields implementing identified wireless power transmission regime. In an embodiment, the apparatus includes means for initiating, modifying, or terminating a transfer of radiofrequency electromagnetic energy from the antenna to the target device in response to a request originated by the target device or in response to a schedule.

FIGS. 16-20 and FIGS. 23-24 illustrate an additional embodiment. For example, the system 3105 includes an antenna 3110 comprising a sub-Nyquist holographic aperture 3130 configured to define at least two selectable, arbitrary complex radiofrequency electromagnetic fields on a surface 3124 of the antenna over an operating frequency. The system includes a path analysis engine 3152 configured to respectively test at least two power transmission pathways from the antenna to a target device 3190 located in an environment 3100 within a space 3102 radiateable by the antenna. The target device includes a target device antenna comprising a sub-Nyquist holographic aperture configured to define at least two selectable, arbitrary complex radiofrequency electromagnetic fields on a surface of the target device over the operating frequency. The system includes a communications module 3162 configured to receive data originated by the target device and indicative of a respective signal strength received for each of the at least two power transmission pathways 3180. The system includes an optimization circuit 3154 configured to select responsive to the tested at least two power transmission pathways a wireless power transmission regime optimizing wireless transfer of radiofrequency electromagnetic power from the antenna to a target device. The selection is responsive to data gathered by the path analysis engine and the data originated by the target device. The system includes a gain definition circuit 3154 configured to select a complex electromagnetic field from the at least two selectable arbitrary complex electromagnetic fields implementing the selected wireless power transmission regime. The system includes an antenna controller 3156 configured to define the selected arbitrary complex electromagnetic field in the sub-Nyquist holographic aperture. In an embodiment, the target device includes a smart aperture configured to define its aperture to maximize power reception and communicate with the system to coordinate their respective apertures for optimizing or maximizing power transfer.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   an antenna comprising a sub-Nyquist holographic aperture configured to define at least two selectable, arbitrary complex radiofrequency electromagnetic fields on a surface of the antenna over an operating frequency;
   a mapping engine configured to model an environment within a space radiateable by the antenna, the environment including a target device and a human being;
   an optimization circuit configured to select responsive to the model of the environment a wireless power transmission regime, the wireless power transmission regime including an electromagnetic radiation pattern shaped to wirelessly transfer radiofrequency electromagnetic power from the antenna to the target device without exceeding a radiofrequency electromagnetic wave radiation exposure limit for human beings;
   a gain definition circuit configured to select a complex radiofrequency electromagnetic field implementing the selected wireless power transmission regime from the at least two selectable, arbitrary complex radiofrequency electromagnetic fields; and
   an antenna controller configured to define the selected, arbitrary complex radiofrequency electromagnetic field in the sub-Nyquist holographic aperture.

2. The system of claim 1, wherein the sub-Nyquist holographic aperture and the surface are cooperatively structured so that radiofrequency electromagnetic waves incident upon the surface are coherently reconstructed by the selected arbitrary complex radiofrequency electromagnetic field and transmitted to the target device.

3. The system of claim 1, wherein the sub-Nyquist holographic aperture and the surface are structured to cooperatively transmit an electromagnetic waves into free space, the transmitted electromagnetic waves coherently reconstructed by the sub-Nyquist holographic aperture from received incident waves and having a radiation pattern defined by the selected arbitrary complex radiofrequency electromagnetic field.

4. The system of claim 1, further comprising:
a radiofrequency electromagnetic wave generating apparatus configured to generate and deliver radiofrequency electromagnetic waves to the surface of the antenna, the frequency of the radiofrequency electromagnetic waves within at least a portion of the operating frequency of the antenna.

5. The system of claim 1, wherein the sub-Nyquist holographic aperture is configured to define at least two selectable, arbitrary complex radiofrequency electromagnetic fields on a surface with tangential wavenumbers up to the free-space wavenumber ($k_o$).

6. The system of claim 1, wherein the sub-Nyquist holographic aperture is configured to define at least two selectable, arbitrary complex radiofrequency electromagnetic fields on a surface with tangential wavenumbers up to $2\pi$ over the aperture spacing ($k\_apt=2\pi/a$).

7. The system of claim 1, wherein the sub-Nyquist holographic aperture and the surface are structured to cooperatively transmit electromagnetic waves into free space, the transmitted electromagnetic waves coherently reflected by the sub-Nyquist holographic aperture from received incident waves and having a radiation pattern defined by the selected arbitrary complex radiofrequency electromagnetic field.

8. The system of claim 1, wherein the antenna includes a substantially planar arrangement of at least two antenna segments.

9. The system of claim 1, wherein the antenna includes a radiofrequency electromagnetic wave radiating element and an electronically controllable or tunable reflective surface.

10. The system of claim 1, wherein the antenna includes an electronically controllable or tunable lens configured to define the at least two selectable, arbitrary complex radiofrequency electromagnetic fields on a surface of the lens.

11. The system of claim 1, wherein the target device is configured to receive the radiofrequency electromagnetic power wirelessly transmitted by the antenna.

12. The system of claim 1, wherein the human being includes a stationary human being or a human being in motion.

13. The system of claim 1, wherein the mapping engine is configured to three-dimensionally model the environment within the space radiateable by the antenna.

14. The system of claim 1, wherein the mapping engine is configured to periodically update the model of the environment within the space radiateable by the antenna.

15. The system of claim 1, wherein the mapping engine is configured to automatically update the model of the environment within the space radiateable by the antenna.

16. The system of claim 1, wherein the mapping engine is configured to at least partially model the location of the target device in response to a signal transmitted by the target device or in response to a signal reflected by the target device.

17. The system of claim 1, wherein the mapping engine is configured to at least partially model the environment in response to data generated using a channel sounding technique.

18. The system of claim 1, wherein the model of the environment includes a model of a power transmission pathway between the antenna and the target device.

19. The system of claim 1, wherein the mapping engine is configured to at least partially model the environment in response to sensor-acquired data indicative of a characteristic or parameter of the environment or in response to radio-frequency acquired data indicative of a characteristic or parameter of the environment.

20. The system of claim 1, wherein the mapping engine is configured to model a location of the human being in the environment.

21. The system of claim 1, wherein the mapping engine is configured to at least partially model the environment in response to data integrated using a multisensor data fusion technique or process.

22. The system of claim 1, wherein the mapping engine is configured to three-dimensionally model the environment within the space at least partially in response to data received from the target device.

23. The system of claim 1, further comprising:
a path analysis engine configured to test the selected wireless power transmission regime.

24. The system of claim 1, wherein the gain definition circuit is configured to determine a matrix representation of a transfer function responsive to the wireless power transmission regime, and to select a complex radiofrequency electromagnetic field implementing the matrix representation of the transfer function from the at least two selectable arbitrary complex radiofrequency electromagnetic fields.

25. The system of claim 1, wherein the gain definition circuit is configured to describe according to holographic principles an antenna radiation pattern responsive to the model of the environment, and to select a complex radiofrequency electromagnetic field implementing the described antenna radiation pattern from the at least two selectable arbitrary complex radiofrequency electromagnetic fields.

26. The system of claim 1, wherein the gain definition circuit is configured to determine a holographic transmission function calculated to produce to the wireless power transmission regime, and to select a complex radiofrequency electromagnetic field implementing the holographic transmission function from the at least two selectable arbitrary complex radiofrequency electromagnetic fields.

27. The system of claim 1, wherein the gain definition circuit is configured to select complex radiofrequency electromagnetic field maximizing radiofrequency electromagnetic radiation delivered to the target device, the selection constrained by a radiofrequency electromagnetic wave radiation exposure limit defined for human beings.

28. The system of claim 1, wherein the gain definition circuit is configured to select responsive to the wireless power transmission regime a complex radiofrequency electromagnetic field implementing the selected wireless power transmission regime in an antenna having at least two aperture segments, the selected complex radiofrequency electromagnetic field having an amplitude or phase selected to maximize the combined electromagnetic radiation delivered to the target device in view of a constraint limiting the radiofrequency electromagnetic radiation limit for human beings.

29. The system of claim 1, wherein the gain definition circuit is configured to select responsive to the wireless power transmission regime a series of at least two complex radiofrequency electromagnetic fields from the at least two selectable, arbitrary complex radiofrequency electromagnetic fields definable by the antenna, the series of at least two radiation patterns selected to facilitate an iterative convergence on an arbitrary complex radiofrequency electromagnetic field delivering a maximum electromagnetic radiation to the target device and constrained by a radiofrequency electromagnetic wave radiation exposure limit defined for human beings.

30. The system of claim 1, wherein the gain definition circuit includes an adaptive gain definition circuit configured to select a second complex radiofrequency electromagnetic field of the at least two selectable, arbitrary complex radiofrequency electromagnetic fields, the selection of the second complex radiofrequency electromagnetic field responsive to electromagnetic radiation received by the target device and electromagnetic radiation received by a human being with the antenna configured in a first complex radiofrequency electromagnetic field of the at least two selectable, arbitrary complex radiofrequency electromagnetic fields.

31. The system of claim 1, further comprising at least one device configured to detect or measure a characteristic or parameter of the environment.

32. The system of claim 31, further comprising a multi-sensor data fusion system configured to receive data indicative of a characteristic or parameter of the environment from at least two devices, and to generate an estimate of a characteristic or parameter of the environment.

33. The system of claim 1, further comprising:
a power transfer manager configured to initiate, modify, or terminate a transfer of radiofrequency electromagnetic energy from the antenna to the target device.

34. The system of claim 1, further comprising:
a communications module configured to communicate with the target device.

35. The system of claim 1, further comprising;
an update manager configured to initiate an update of the selected wireless power transmission regime.

36. A method comprising:
modeling an environment within a space radiateable by an antenna, the environment including a target device and a human being;
selecting responsive to the model of the environment a wireless power transmission regime, the wireless power transmission regime including an electromagnetic radiation pattern shaped to wirelessly transfer radiofrequency electromagnetic power from the antenna to the target device without exceeding a radiofrequency electromagnetic wave radiation exposure limit for human beings;
selecting a complex radiofrequency electromagnetic field implementing the selected wireless power transmission regime from at least two selectable, arbitrary complex radiofrequency electromagnetic fields definable on a surface of the antenna over an operating frequency;
receiving radiofrequency electromagnetic waves;
coherently reconstructing the received radiofrequency electromagnetic waves with the selected complex radiofrequency electromagnetic field defined on the surface; and
wirelessly transmitting the coherently reconstructed radiofrequency electromagnetic waves to the target device.

37. The method of claim 36, wherein the at least two selectable, arbitrary complex radiofrequency electromagnetic fields definable on a surface have tangential wavenumbers up to the free-space wavenumber ($k_0$).

38. The method of claim 36, wherein the at least two selectable, arbitrary complex radiofrequency electromagnetic fields definable on a surface have tangential wavenumbers up to $2\pi$ over the aperture spacing (k_apt=$2\pi/a$).

39. The method of claim 36, further comprising:
defining the selected complex radiofrequency electromagnetic field on the surface.

40. The method of claim 36, wherein the modeling includes iteratively updating the modeling an environment within the space radiateable by the antenna.

41. The method of claim 36, further comprising:
testing the respective at least two power transmission pathways at least partially in response to sensor-acquired data indicative of a characteristic or parameter of the environment.

42. The method of claim 36, further comprising:
initiating an update of the selected wireless power transmission regime.

43. The method of claim 36, further comprising:
initiating, modifying, or terminating a transfer of radiofrequency electromagnetic energy from the antenna to the target device in response to a request originated by the target device or in response to a schedule.

* * * * *

UNITED STATES PATENT AND TRADEMARK OFFICE
CERTIFICATE OF CORRECTION

PATENT NO. : 9,825,358 B2  
APPLICATION NO. : 14/257415  
DATED : November 21, 2017  
INVENTOR(S) : Pai-Yen Chen et al.

Page 1 of 1

It is certified that error appears in the above-identified patent and that said Letters Patent is hereby corrected as shown below:

In the Claims

Column 48, Line 62, Claim 3:
"are structured to cooperatively transmit an electromagnetic waves into free space" should read --are structured to cooperatively transmit electromagnetic waves into free space--

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*